(12) United States Patent
Giuliano et al.

(10) Patent No.: US 11,664,727 B2
(45) Date of Patent: May 30, 2023

(54) SWITCHED-CAPACITOR POWER CONVERTERS

(71) Applicant: pSemi Corporation, San Diego, CA (US)

(72) Inventors: David Giuliano, Brookline, MA (US); Gregory Szczeszynski, Hollis, NH (US)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 16/883,872

(22) Filed: May 26, 2020

(65) Prior Publication Data

US 2021/0083571 A1  Mar. 18, 2021

Related U.S. Application Data

(63) Continuation of application No. 15/742,660, filed as application No. PCT/US2016/041448 on Jul. 8, 2016, now abandoned.

(60) Provisional application No. 62/189,909, filed on Jul. 8, 2015.

(51) Int. Cl.
*H02M 3/07* (2006.01)
*H02M 1/00* (2006.01)

(52) U.S. Cl.
CPC ............ *H02M 3/073* (2013.01); *H02M 1/007* (2021.05); *H02M 3/075* (2021.05); *H02M 3/077* (2021.05)

(58) Field of Classification Search
CPC ......... H02M 3/07; H02M 3/073; H02M 3/075
See application file for complete search history.

(56) References Cited

U.S. PATENT DOCUMENTS

| | | | | |
|---|---|---|---|---|
| 4,713,742 A | * | 12/1987 | Parsley | H02M 3/158 323/272 |
| 6,362,986 B1 | * | 3/2002 | Schultz | H02M 3/158 363/132 |
| 9,887,622 B2 | | 2/2018 | Low et al. | |
| 2012/0268030 A1 | * | 10/2012 | Riesebosch | H05B 45/3725 315/276 |
| 2013/0154491 A1 | * | 6/2013 | Hawley | H05B 45/44 315/200 R |

(Continued)

FOREIGN PATENT DOCUMENTS

CN  103650313 A  3/2014

OTHER PUBLICATIONS

1st Office Action dated Jan. 19, 2020, by the Chinese Patent Office in counterpart Chinese Application No. 201680051939.8, 33 pages.

(Continued)

*Primary Examiner* — Rafael O De Leon Domenech
(74) *Attorney, Agent, or Firm* — Finnegan, Henderson, Farabow, Garrett & Dunner, LLP

(57) ABSTRACT

An apparatus for providing electric power to a load includes a power converter that accepts electric power in a first form and provides electric power in a second form. The power converter comprises a control system, a first stage, and a second stage in series. The first stage accepts electric power in the first form. The control system controls operation of the first and second stage. The first stage is either a switching network or a regulating network. The second stage is a regulating circuit when the first stage is a switching network, and a switching network otherwise.

19 Claims, 37 Drawing Sheets

(56) References Cited

U.S. PATENT DOCUMENTS

2013/0154600 A1* 6/2013 Giuliano .................. G05F 1/10
323/304
2013/0229841 A1* 9/2013 Giuliano ............. H02M 1/4225
363/60

OTHER PUBLICATIONS $2^{nd}$ Office Action dated Aug. 19, 2020, by the Chinese Patent Office in counterpart Chinese Application No. 201680051939.8, 17 pages.
$3^{rd}$ Office Action dated Mar. 30, 2021, by the Chinese Patent Office in counterpart Chinese Application No. 201680051939.8, 18 pages.

* cited by examiner

SWITCHED-CAPACITOR POWER CONVERTERS

CROSS REFERENCE TO RELATED APPLICATION

This application claims the benefit of the priority date of U.S. Provisional Application No. 62/189,909, filed on Jul. 8, 2015, the contents of which are hereby incorporated by reference in their entirety.

FIELD OF INVENTION

This invention relates to power converters, and in particular, to dc-dc power converters.

BACKGROUND

It is known in the art that electrical devices require electric power to operate. However, some electrical devices are more omnivorous than others. For example, a tungsten filament light bulb will operate over a wide range of voltages. Although it may be dim at low voltages, and although it may burn out prematurely at high voltages, it does not simply stop operating.

Digital circuits, however, are more finicky in their requirements. A digital circuit demands power with particular characteristics. A processor that receives power falling short of these characteristics will not just compute more slowly. It will simply shut down.

Unfortunately, power is not always delivered in a form that a microprocessor-based system will find acceptable. For example, in a handheld device, the battery voltage ranges from fully charged to almost zero. Thus, most such systems require something that accepts power in raw form and delivers it to the system in a form that the system finds more palatable.

This critical but unglamorous task falls upon the power converter.

A variety of power converters are known. These include power converters described in U.S. Pat. Nos. 8,860,396, 8,743,553, 8,723,491, 8,503,203, 8,693,224, 8,724,353, 8,339,184, 8,619,445, 8,817,501, U.S. Patent Publ. 2015/0077175, and U.S. Pat. No. 9,041,459.

The contents of all the foregoing patents are herein incorporated by reference.

SUMMARY

In one aspect, the invention features an apparatus for providing electric power to a load. Such an apparatus includes a power converter that accepts electric power in a first form and provides electric power in a second form. The power converter includes a control system, and first and second stages in series. The first stage accepts electric power in the first form. The control system controls operation of the first and second stages. The first stage is either a switching network or a regulating network. The second stage is a regulating network when the first stage is a switching network. On the other hand, the second stage is a switching network when the first stage is a regulating network.

Among the embodiments are those in which the control system controls at least in part based on a voltage measured between the first and second stages.

Also among the embodiments are those in which the first stage is a regulating network, those in which the first stage is a switching network, and those in which it is the second stage that is a switching network, such as a cascade multiplier. In either case, the switching network can be a cascade multiplier.

In some embodiments, at least one of the stages includes a switching network having first and second terminals. Among these are embodiments in which these terminals are isolated, embodiments in which they have a common ground, and embodiments in which they have separate grounds.

In other embodiments, at least one of the stages includes a switching network having a first and second switching circuits, each of which has first and second terminals. In these embodiments, the first terminal of the second switching circuit connects to the second terminal of the first switching circuit. Among these are embodiments in which the two switching circuits have different voltage-transformation ratios, and embodiments in which they have the same voltage-transformation ratios.

In some embodiments, the switching network includes first and second switching circuits in series, whereas in others, it includes first and second switching circuits in series-parallel.

Some embodiments of the power converter further include a third stage in series with the first stage and the second stage so that the second stage is between the first stage and the third stage. These embodiments include those in which the first and third stages are switching networks, those in which the first and third stages are regulating networks, and those in which the third stage is operated with a duty cycle that causes the third stage to become a magnetic filter.

In some embodiments, the switching network includes a cascade multiplier. Among these are those embodiments in which the cascade multiplier is a single-phase cascade multiplier, those in which it is asymmetric, those in which it is a step-down, multiplier, and any those in which it is any combination thereof. Also among these embodiments are those in which the cascade multiplier is a dual-phase cascade multiplier. In this case, the cascade multiplier could be a symmetric cascade multiplier, or one that includes parallel pumped capacitors, or one that lacks DC capacitors.

In some of the foregoing embodiments, the cascade multiplier creates an auxiliary voltage to drive an additional circuit. Among these are embodiments that include a level shifter connected to be driven by the auxiliary voltage, and those in which a gate driver is connected to be driven by the auxiliary voltage.

In some embodiments, the switching network includes first and second dual-phase cascade multipliers, and a phase node shared by both cascade multipliers. In these embodiments, the first cascade multiplier, which is stacked on the second, is asynchronous and the second cascade multiplier is synchronous. Among these embodiments are those in which the first and second cascade multipliers operate at the same frequency, and those in which the first and second cascade multipliers operate at different frequencies.

In some embodiments, the regulating network includes a buck converter. Among these are embodiments in which the buck converter includes first and second terminals with the same reference voltage. Examples include those in which the buck converter's first and second terminals are at different reference voltages, those in which the buck converter has three terminals, and those in which the buck converter has a floating node at a floating voltage. In embodiments that have a floating node, the floating node can be between two loads or between two sources.

A variety of other regulating networks are contemplated. These include a buck-boost converter, a boost converter, and even a four-terminal non-inverting buck-boost converter.

In some embodiments that use a boost converter as a regulating network, the switching network includes a step-down single-phase asymmetric cascade multiplier. In some of these embodiments, selection switches connected to the regulating network cause the switching network to output a fraction of its normal output voltage. In others, switches are oriented so that cathodes of parasitic diodes corresponding to the switches connect to each other. Among these embodiments are those in which the first stage is a regulating network.

Embodiments include those in which those in which the regulating network regulates plural wires, those in which it regulates at most one wire, and those in which it regulates a particular one of plural wires based on an input voltage to the regulating network.

Also among the embodiments are those in which the regulating network has plural output ports and those in which it is a multi-tap boost converter. Among these are embodiments in which the switching network includes a single-phase step-down switched-capacitor circuit.

In yet other embodiments, the power converter floats above ground.

In some embodiments, the switching network is reconfigurable. In other embodiments, it is the regulating network that is reconfigurable. In yet others, both are reconfigurable. In either case, there are embodiments in which a magnetic filter connects to whichever of the two are reconfigurable. Thus, a magnetic filter could be connected to either the reconfigurable switching network or the reconfigurable regulating network.

In some embodiments, the switching network includes a dual-phase switched capacitor circuit. Among these are embodiments in which the switched capacitor circuit includes pump capacitors in series and DC capacitors in series.

In some embodiments, the switching network includes a dual-phase switching circuit including DC capacitors that store charge from the regulating network only during a dead-time transition during which the switching network is between states.

In yet other embodiments, the regulating network includes an inductor that promotes adiabatic charge transfer within the switching network.

Some embodiments also include a magnetic filter connected to the switching network to promote adiabatic charge transfer within the switching network. Among these are embodiments in which the magnetic filter is connected between the switching network and a load, those in which the magnetic filter is connected between the switching network and a source, and those in which the regulating network and the magnetic filter cooperate to promote adiabatic charge transfer within the switching network.

Embodiments further include those that have a circuit connected to the switching network to constrain current flow out of the switching network, and those that have a circuit connected to the switching network to promote adiabatic charge transfer within the switching network.

In some embodiments, the switching network includes a two-phase step-down switching network and the regulating network is a step-down network. Among these are embodiments in which the switching network includes a cascade multiplier. In those embodiments that include a cascade multiplier, the regulating network can include a buck converter. Also among these embodiments are those in which regulating network promotes adiabatic charge transfer.

In still other embodiments, the switching network includes a step-down single-phase asymmetric cascade multiplier and the regulating network includes a converter that causes voltage to step down. In some of these embodiments, it is the first stage that is a switching network.

In some embodiments, the regulating network includes a multiple-tap buck converter configured to have two operating modes. Among these are embodiments in which the switching network provides first and second voltage rails that, in operation, are maintained at different voltages.

Yet other embodiments are those in which the regulating network includes a buck converter having multiple taps and configured have three operating modes. Among these are embodiments in which the switching network provides first, second, and third voltage rails that, in operation, are maintained at different voltages.

Other embodiments of the apparatus are those in which the switching network includes a two-phase switched-capacitor circuit and the regulating network is a buck converter.

Also among the embodiments are those in which the regulating network includes parallel first and second regulating circuits.

In some embodiments, the power converter includes first and second outputs. In operation, the first output and second outputs being maintained at corresponding first and second voltage differences. The first voltage different is a difference between a first voltage and a second voltage, and the second voltage difference is a difference between a third voltage and the second voltage.

In some embodiments, the regulating network includes first, second, and third regulating circuits in parallel.

In other embodiments, the power converter includes first second, and third outputs. In operation, the first, second, and third outputs are maintained at corresponding first second, and third voltage differences. The first voltage different is a difference between a first voltage and a second voltage. The second voltage difference is a difference between a third voltage and the second voltage. And the third voltage difference is a difference between a fourth voltage and the second voltage.

In some embodiments, the power converter has a first terminal and a second terminal such that, in operation, a first voltage different is maintained across the first terminal and a second voltage difference is maintained across the second terminal. The first voltage difference is a difference between a first voltage and a second voltage, and the second voltage difference is a difference between a third voltage and the second voltage, with the second voltage being variable. Some of these embodiments also have a third stage that provides the second voltage. Also among these are embodiments in which the third stage includes a switched-mode power converter, a switched capacitor converter, a buck converter, or a cascade multiplier.

In some embodiments, the power converter is configured to provide AC output with a non-zero DC offset.

In other embodiments, the switching network includes a reconfigurable asynchronous cascade multiplier, and the regulating network is connected to the switching network to enable the switching network to cause either a step up in voltage or a step down in voltage. In some cases, the the regulating network includes a four-switch buck-boost converter.

In still other embodiments, the first stage is a switching network that includes a reconfigurable cascade multiplier that operates synchronously in a single-phase, and the regulating network includes a four switch buck boost converter. Among these are embodiments in which the regulating network connects to the switching network at a point that enables the switching network to step voltage up or step voltage down.

Embodiments also include those in which the switching network includes a cascade multiplier with a charge pump embedded therein. The charge pump can have a variety of characteristics. For example, the charge pump can be reconfigurable, or it can be a fractional charge pump. Alternatively, the embedded charge pump operates in multiple modes, each of which corresponds to a voltage transformation ratio. Or the cascade multiplier might include a reconfigurable two-phase asynchronous step-down cascade multiplier. In any of these embodiments, the regulating network could include a two-phase boost converter.

In still other embodiments, the power converter further includes a third stage in series with the first stage and the second stage, wherein the second stage is between the first stage and the third stage, both of which are switching networks. The regulating circuit includes a buck converter, and both switching networks include a single-phase asynchronous step-up cascade multiplier. These embodiments include those in that further include a stabilizing capacitor at an output of the regulating network.

In still other embodiments, the power converter further includes a third stage in series with the first stage and the second stage, with the second stage being between the first stage and the third stage. In these embodiments, the first stage and the third stage are switching networks, the regulating circuit includes a buck-boost converter, the first switching network includes a single-phase asynchronous step-up cascade multiplier, and the second switching network includes a single-phase synchronous step-up cascade multiplier. Among these embodiments are those that also have a stabilizing capacitor at an output of the regulating network.

In some embodiments, the power converter further includes a third stage in series with the first and second stage, with the second stage being between the first stage and the third stage. The first and third stage are both regulating networks. However, the first stage includes a boost converter, and the third stage includes a buck converter. The switching network includes first and second cascade multipliers having equal numbers of stages. Some of these embodiments also have a phase pump shared by the first and second cascade multipliers. In others, the first and second cascade multipliers operate 180 degrees out of phase. And in yet others, the cascade multipliers comprise corresponding first and second switch stacks, and an output of the switching network is a voltage difference between a top of the first switch stack and a top of the second switch stack.

In some embodiments, the power converter further includes a third stage in series with the first and second stages, with the second stage being between the first stage and the third stage. In these embodiments, the first stage and the third stage are regulating networks, the first stage includes a three-level boost converter, the third stage includes a buck converter, and the switching network includes first and second cascade multipliers having unequal numbers of stages.

In other embodiments, the switching network receives current that has a first portion and a second portion, wherein the first portion comes from the regulating network, and the second portion, which is greater than the first, bypasses the regulating network.

In some embodiments, the power converter further includes a third stage in series with the first stage and the second stage, the second stage being between the first stage and the third stage. The first stage is a first regulating network, the third stage is a second regulating network, and the first stage includes a boost converter. The third stage includes a buck converter. The switching network includes cascade multipliers having unequal numbers of stages. Among these embodiments are those in which the second stage includes an additional inductor connected to the first stage.

Yet other embodiments include a third stage. In these embodiments, the first stage includes a regulating network, the third stage includes a regulating network, the power converter provides a load with a first voltage difference, the first stage provides a second voltage difference to the second stage, the second stage provides a third voltage difference to the third stage, the first voltage difference is a voltage difference between a first voltage and a second voltage, the second voltage difference is a voltage difference between a third voltage and a fourth voltage, the third voltage difference is a voltage difference between a fifth voltage and a sixth voltage, the fourth voltage differs from the second voltage, and the sixth voltage differs from the second voltage. Among these embodiments are those in which the second stage includes a reconfigurable switching network.

In some embodiments, the first stage includes a switching network having a reconfigurable dual phase cascade multiplier with an embedded inductor configured to promote adiabatic charge transfer between capacitors in the cascade multiplier. In some embodiments, the inductor is embedded at a location through which a constant current passes. Also among these embodiments are those in which the second stage includes a zeta converter, and those in which the cascade multiplier includes a phase pump with the inductor being embedded therein. In others of these embodiments, the cascade multiplier includes pump capacitors, and the inductor is embedded at a location that maximizes the number of paths that pass between the inductor and a pump capacitor.

In some embodiments, the switching network includes a dual-phase cascade multiplier with pump capacitors in series. Among these are embodiments in which the switching network has a variable transfer function and embodiments in which the switching network includes a phase pump that includes an embedded charge pump. In this latter case, the embedded charge pump includes switch sets, pump capacitors, and a controller that operates the switch sets to cause transitions between a first operating mode and a second operating mode, each of which corresponds to a transfer function for the cascade multiplier. Among these cases are those in which the controller operates the switch sets so that the embedded controller causes the cascade multiplier to have a transfer function in which the cascade multiplier provides either a voltage gain or a voltage attenuation.

In another aspect, the invention features an apparatus for providing electric power to a load includes a power converter that accepts electric power in a first form and provides electric power in a second form. The power converter includes a control system, a first stage, and a second stage in series. The first stage accepts electric power in the first form. The control system controls operation of the first and second stage. The first stage is either a switching network or a regulating network. The second stage is a regulating circuit when the first stage is a switching network, and a switching network otherwise.

These and other features will be apparent from the following detailed description and the accompanying figures, in which:

DETAILED DESCRIPTION

Figure 1:
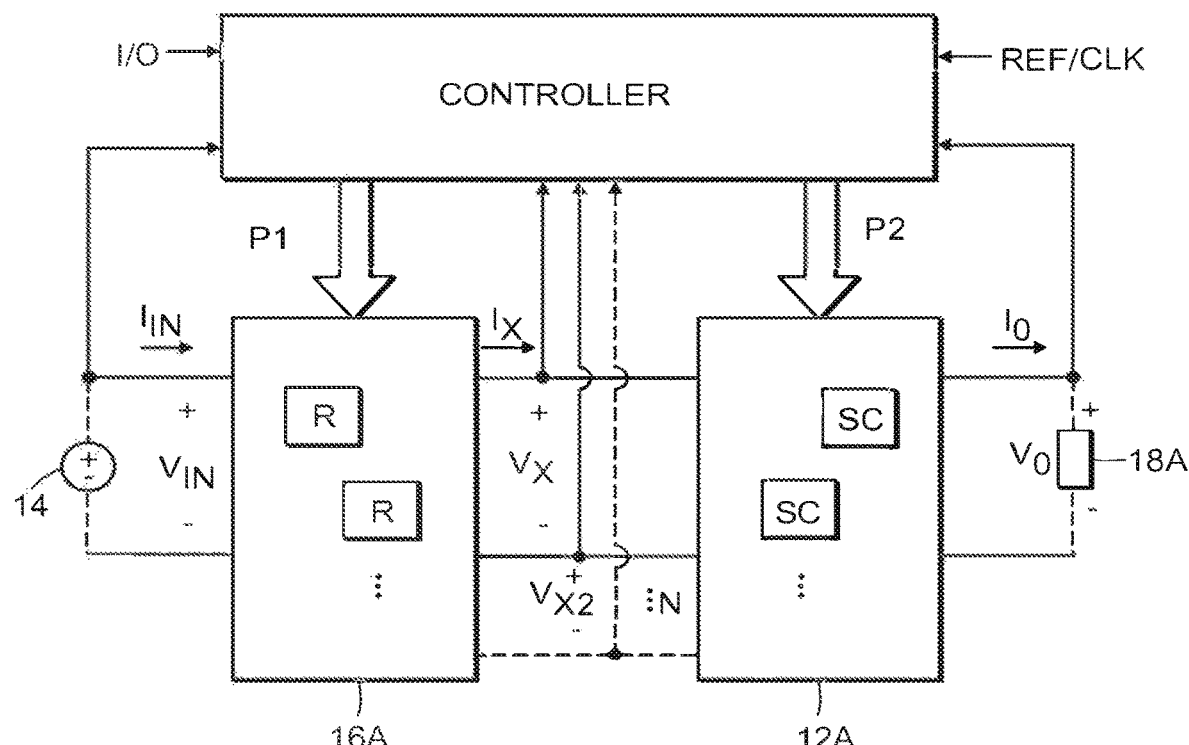
FIG. 1 shows a power converter having a regulating circuit and a switching network in series.

FIG. 1 shows a power converter having two stages in series. Depending on details of the circuitry within the two stages, and on the operation of the controller, the power converter will be a dc-dc converter, an ac-dc converter, a dc-ac converter, or an ac-ac converter.

Each stage is either a regulating network 16A or a switching network 12A. The illustrated power converter separates the function of voltage/current transformation from that of regulation. As shown in FIG. 1, it does so by providing a regulating network 16A in series with a switching network 12A. The two stages can operate at the same frequency, at different frequencies, in phase, and out of phase.

A power source 14 and a load 18A are shown only for clarity. These components are not actually part of the power converter. They merely represent the source of the power to be converted, and the ultimate consumer of that power. Dashed lines between these components and the power converter indicate that they are optional. Other components shown connected with dashed lines in this and other figures are likewise optional. For example, a dashed wire between the regulating network 16A and the switching network 12A is also optional.

In FIG. 1, the power source 14 is a voltage source. However, since power is the product of voltage and current, the power source 14 could just as easily be a current source. Examples of a suitable power source 14 include, but are not limited to, a battery, a solar panel, a fuel-cell, and a power supply.

The power source 14 need not deliver a constant stream of power. In fact, if it did, the power converter would not be nearly as necessary. After all, among the tasks of a power converter is to deliver a constant stream of power with specific characteristics to the load 18A notwithstanding variations in the power stream provided by the power source 14. The power source 14 is merely a source of power, or equivalently, since power is the time-derivative of energy, a source of energy.

The load 18A can be any type of electrical load. What is essential, is that it be a net energy consumer. Examples of a load 18A include a microprocessor, LED, RF PA, or a DSP. In fact, the load 18A might even be another power converter.

The arrows shown in the figure represent power flow, and not magnitude of power flow. Hence, each stage can be bidirectional. In such cases, if the load 18A supplies power, then the load 18A acts as a power source 14 and the power source 14 acts as a load 18A. However, in some embodiments, one or more stages are unidirectional. In addition, embodiments exist in which a stage can be a step-up stage, a step-down stage or a step-up/down stage.

The illustrated regulating network 16A can itself comprise two or more constituent regulating circuits operating as a combination in order to regulate some electrical parameter. These regulating circuits can have different voltage ratings and connect to each other in different ways. In some embodiments, the regulating circuits connect in series. In others, they connect in parallel, in series-parallel, or in parallel-series.

The regulating circuits that comprise a regulating network 16A can be of different types. For example, a regulating network 16A may comprise a buck converter in combination with a linear regulator. Examples of suitable regulating circuits include a buck converter, a boost converter, a buck-boost converter, a fly-back converter, a push-pull converter, a forward converter, a full bridge converter, a half-bridge converter, a multi-level converter (buck or boost), a resonant converter, a Cuk converter, a SEPIC converter, a Zeta converter, and a linear regulator.

Like the regulating network 16A, the switching network 12A can also be made of a combination of cooperating switching circuits. These individual switching circuits can have different transformation ratios, the same transformation ratios, and different voltage ratings. They can also be different kinds of switching circuits, such as series parallel or cascade multiplier circuits.

A cascade multipliers includes a switch stack, a phase pump, pump capacitors, and, optionally, dc capacitors. The phase pump comprises a pair of switches that cooperate to create a pump signal $V_{clk}$. In general, the two states of the clock are separated by a brief dead-time to allow transients and the like to decay. In cascade multipliers that require a complement to the clock signal, the phase pump includes another pair of switches to generate the complement. The switch stack is a series of switches connected between the input and the output of the cascade multiplier.

In those cases in which the switching circuit is a cascade multiplier, it can be asymmetric, symmetric, series-pumped, or parallel-pumped. Additional types of switching circuits include series-parallel switching circuits, parallel-series switching circuits, voltage-doubling circuits, and Fibonacci circuits. These constituent switching circuits can connect to each other in series, in parallel, in series-parallel, or in parallel-series. Some configurations of the illustrated power converter permit adiabatic charge transfer into or out of a capacitor in the switching network 12A.

Other configurations feature a reconfigurable switching network 12A that transitions between two or more states in the course of transferring charge. This charge transfer depends on the voltage across the capacitor's terminals. Reconfiguring the switching network 12A involves causing switches in the network to change state to cause this voltage to change. Reconfiguration can occur, for example, when the voltage or current transformation between the ports of the switching network 12A is to be changed.

FIG. 1 also shows a controller that controls the operation of one or more stages in the power converter. The controller operates in response to an I/O signal and a clock signal. In some embodiments, the I/O signal is a digital communication signal. The clock signal can be a signal from a clock or it can be a signal from some analog reference. This might be a signal set by the user. Alternatively, another subsystem sets this signal and sends it to the power converter.

In some embodiments, the controller receives multiple sensor inputs from the power converter and provides control signals along first and second paths P1, P2. Examples of sensor signals provided to the sensor inputs are $V_O$, $V_X$, $V_{IN}$, $I_{IN}$, $I_X$ and $I_O$. Among the foregoing sensor inputs, the negative terminals of $V_{IN}$, $V_X$, and $V_O$ can be at ground, above ground, or below ground depending upon their corresponding regulating circuits and switching networks. In fact, since voltage reflects a difference in potential energy between two points, there is nothing particularly special about ground.

The controller's function is to control both the regulating network 16A and the switching network 12A in an effort to control $V_{IN}$, $I_{IN}$, $V_O$, and $I_O$. In carrying this out, the controller can use either feed-forward control or feedback control. Feed-forward control involves choosing an output control signal based on an input, whereas feedback control involves choosing an output control signal based on an output.

Additional control methods that are applicable include voltage-mode control, current-mode control, hysteretic control, PFM control, pulse-skipping control, and ripple-based control. In embodiments that rely upon voltage-mode control, control can be linear or non-linear. In embodiments that rely upon current-mode control, current can be based on both an average value of current or a peak value of current.

It is possible to interconnect the regulating network and the switching network in a variety of ways. FIGS. 1, 2 5, and 6 show four fundamental building blocks.

In particular, FIG. 1 shows a switching network 12A in series with a regulating network 16A, with the load 18A connected to the switching network 12A and the power source connected to the regulator network 16A.

Figure 2:
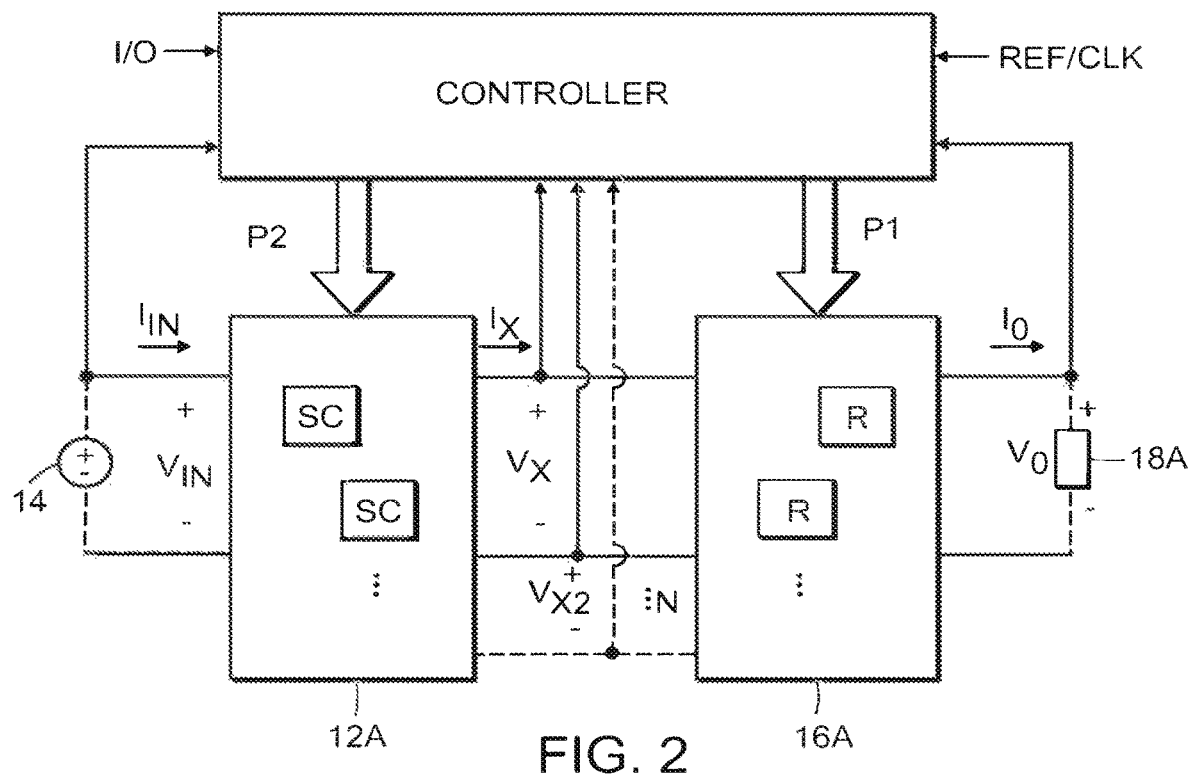
FIG. 2 shows a power converter that is the converse of that shown in FIG. 1.

FIG. 2 is similar to FIG. 1 but with the power source 14 and load 18A having been swapped. Thus, in FIG. 2, the power source 14 connects to the switching network 12A and the load 18A connects to the regulating network 16A. When power is supplied from the load 18A in the power converter shown in FIG. 1, the result is a power converter that is equivalent to that shown in FIG. 2.

Figure 3:
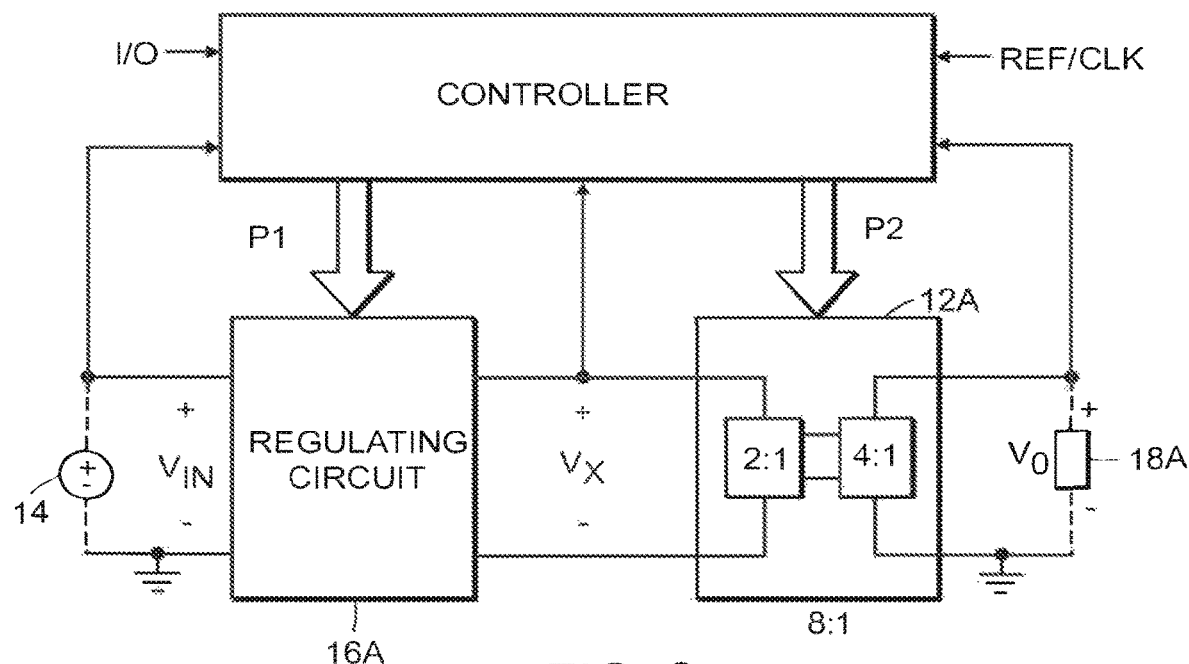
FIG. 3 shows a power converter having a switching network with two switching circuits in series.

As mentioned above, it is possible for a switching network 12A to comprise two or more switching circuits. FIG. shows a particular example in which a switching network 12A has two switching circuits in series. Each switching circuit is a stage. Assuming the same switched-capacitor topology for each stage, the resulting switching network 12A achieves a larger transformation ratio with the same number of switches and capacitors. Alternatively, the switching network 12A can achieve the same transformation ratio, but with fewer switches and capacitors. On the other hand, a disadvantage of the power converter shown in FIG. 3 is that the voltage stresses on the components in at least one of the two stages increases when compared to the single stage case.

Figure 4:
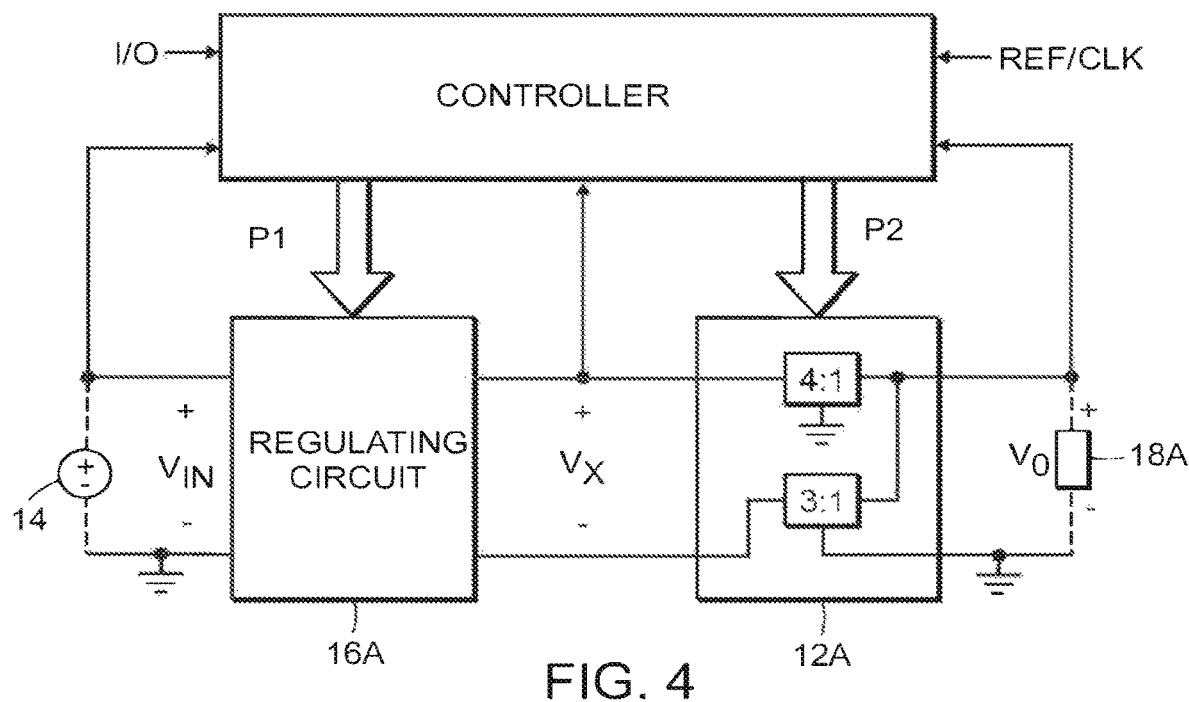
FIG. 4 shows a power converter having a switching network with two switching circuits in series-parallel.

FIG. 4 shows an embodiment in which the switching network 12A has first and second switching circuits connected in series-parallel. The first switching circuit achieves a 4:1 transformation ratio and the second switching circuit achieves a 3:1 transformation ratio. As a result, an intermediate voltage $V_X$ between the regulating network 16A and the switching network 12A can be any fraction of the output voltage $V_O$. In the illustrated power converter, the intermediate voltage $V_X$ equals the output voltage $V_O$. However, had the first switching circuit provided a 4:1 transformation ratio and had the second switching circuit provided a 2:1 transformation ratio, then the intermediate voltage VA would have been larger than the output voltage $V_O$. Similarly, had the first switching circuit provided a 4:1 transformation ratio and had the second switching circuit provided a 7:2 transformation ratio, then the intermediate voltage $V_X$ would have been smaller than the output voltage $V_O$.

Figure 5:
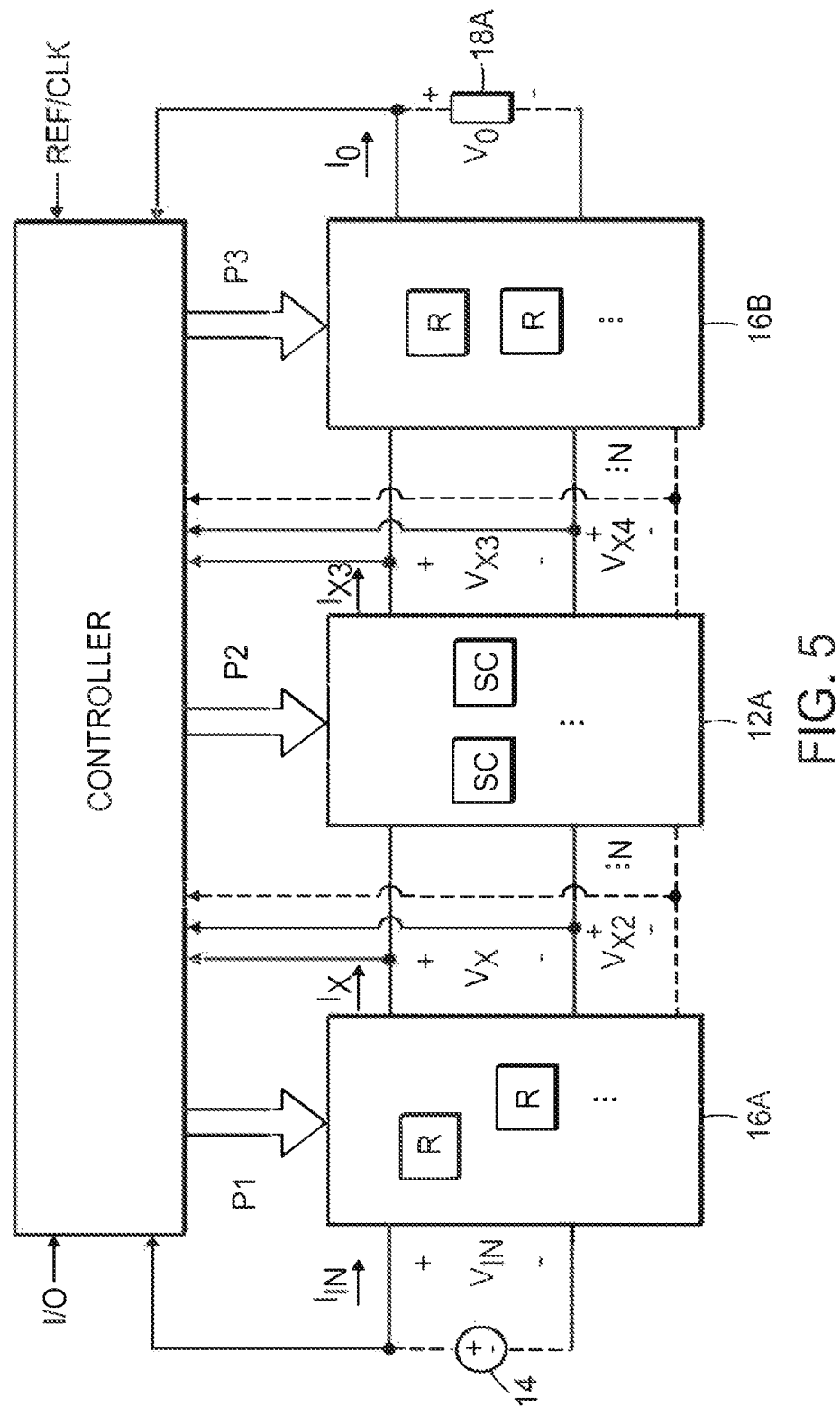
FIG. 5 shows a switching network between two regulating networks.
Figure 6:
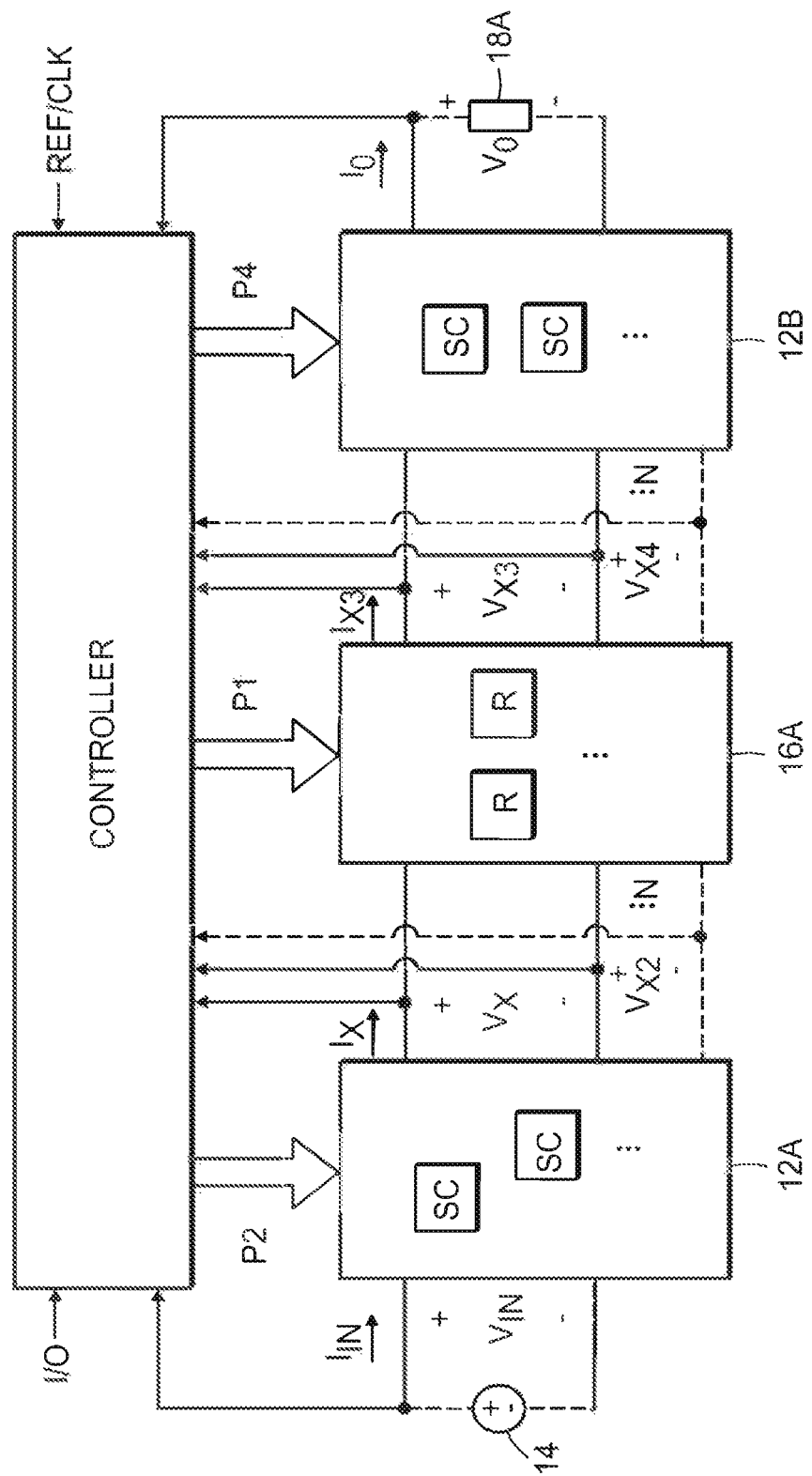
FIG. 6 shows a regulating network between two switching networks.

FIG. 5 and FIG. 6 show representative three-stage embodiments.

The embodiment of FIG. 5 is similar to that of FIG. 1, but with the inclusion of an additional regulating network 16B connected to the switching network 12A. As a result, the switching network 12A is between two regulating networks 16A, 16B.

Conversely, the embodiment of FIG. 6 is similar to that of FIG. 2, but with the inclusion of an additional switching network 12B connected to the regulating network 16A. As a result, the regulating network 16A is between two switching networks 12A, 12B.

Figure 7:
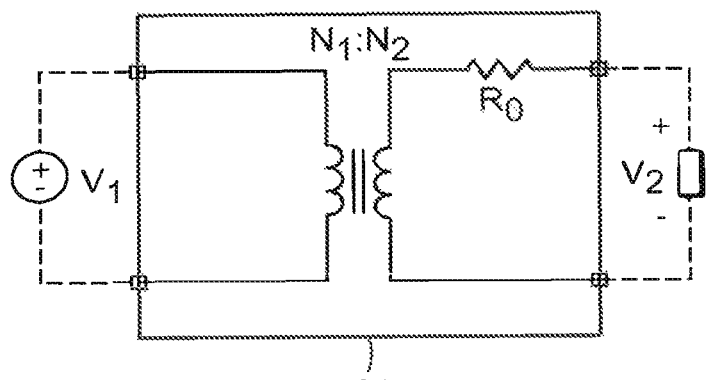
FIG. 7 shows an equivalent circuit for a switching network in which the input and output are isolated.
Figure 8:
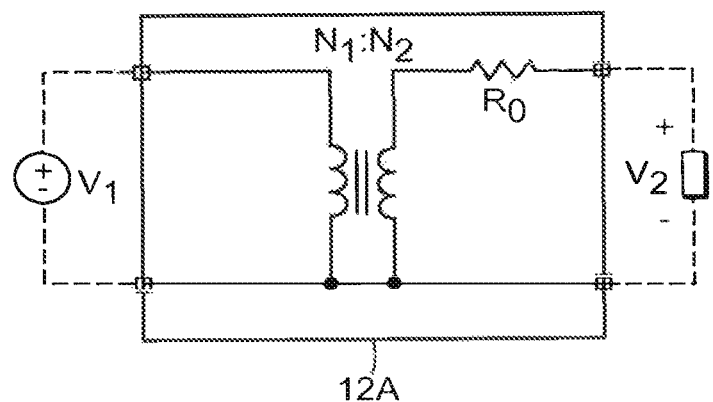
FIG. 8 shows an equivalent circuit for a switching network in which the input and output have a common ground.
Figure 9:
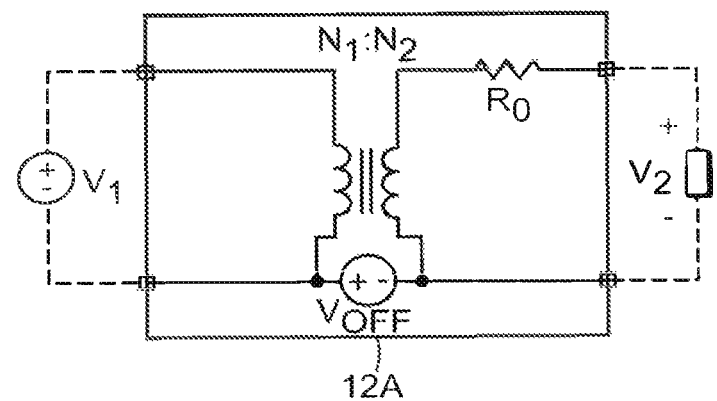
FIG. 9 shown an equivalent circuit for a switching network in which the input and output have a non-common ground.

The four building blocks described above combine in various ways. For example, combining the building block in FIG. 5 with that in FIG. 1 would result in a power converter in which a first regulating network connects to an input of a first switching network, the output of which connects to an input of a second regulating network. The output of this second regulating network leads to an input of a second switching network. In the resulting power converter, the power source 14 connects to an input of the first regulating network and the load 18A connects to an output of the second switching network. FIGS. 7-9 are circuits that are suitable for modeling the behavior of a switching network 12A. In particular, a switching network 12A provides a voltage transformation from a first voltage $V_1$ to a second voltage $V_2$, with the second voltage $V_2$ and the first voltage $V_1$ being related by a ratio of integers. Commonly used ratios are 1:3, 1:2, 1:1, 2:1, and 3:1. The output resistor R, accounts for voltage drops resulting from finite resistance of various components. For example, in a switching network 12A that is intended to provide a 1:2 transformation ratio, it would not be uncommon to have an actual transformation ratio of around 1:1.9 instead of the ideal 1:2 ratio. The model shown in FIG. 7 differs from that shown in FIGS. 8-9 because the second voltage $V_2$ can be isolated from the first voltage $V_1$. In addition, it is possible to arbitrarily separate the negative terminal of the first voltage $V_1$ and the negative terminal of the second voltage $V_2$. This can be achieved by combining a traditional switched-capacitor circuit with a capacitive isolation stage. However, this comes at the price of increased component cost, size, and a reduction of efficiency.

The model shown in FIG. 8 differs from that shown in FIG. 7 and FIG. 9 because of its common ground. A common ground is desirable in certain applications. For example, many devices that rely on a battery, such as cell-phones, tablets, and notebooks, use the same ground throughout the device.

The model shown in FIG. 9 has a non-common ground. In particular, an offset voltage $V_{off}$ separates the negative terminal of the transformer winding on the first voltage $V_1$ side and the negative terminal of the transformer winding on the second voltage $V_2$ side. The switched-capacitor topology sets the extent of the offset voltage $V_1$. This ability to set the offset voltage is advantageous in certain applications.

Figure 10:
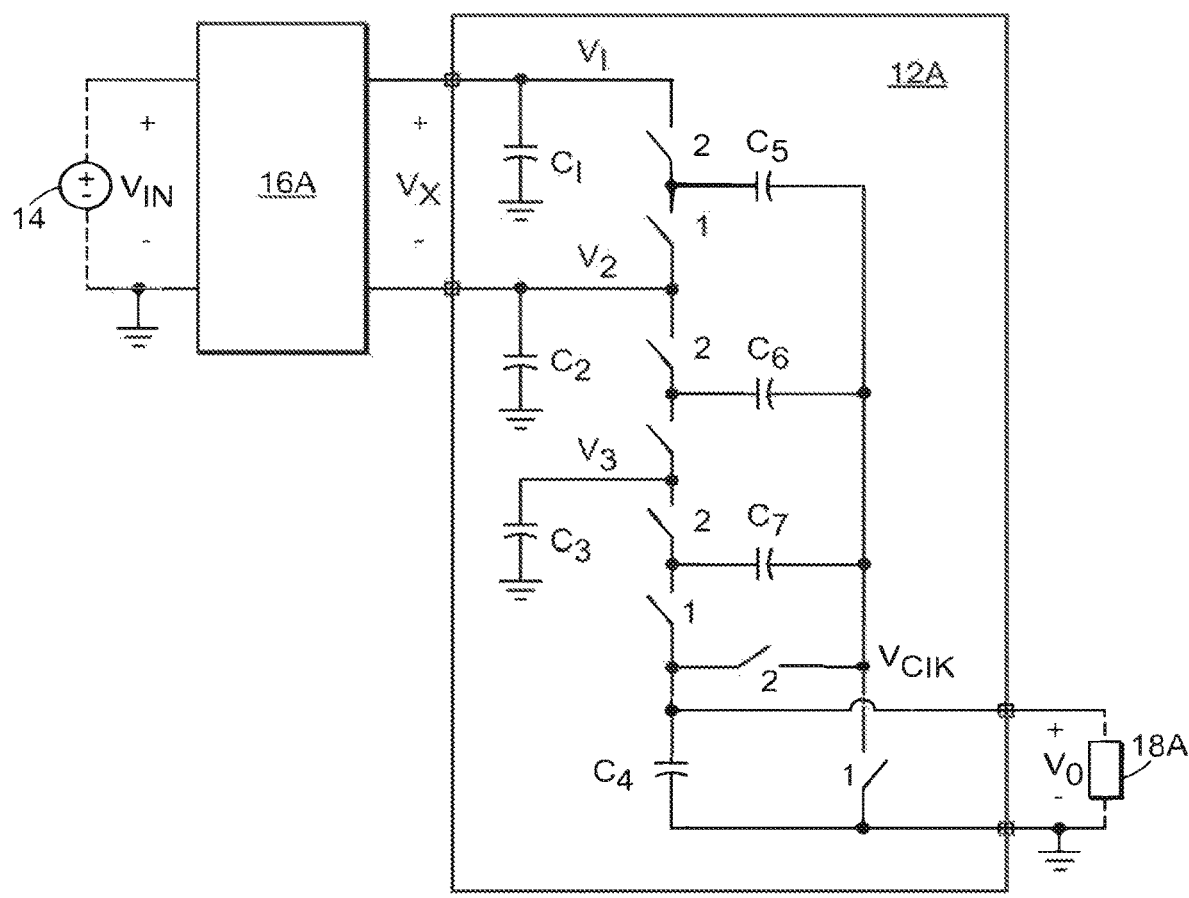
FIG. 10 shows a first implementation of the switching network in FIG. 1.

FIG. 10 shows a particular implementation of the switching network 12A in FIG. 1. In the illustrated embodiment, the switching network 12A is a step-down single-phase asymmetric cascade multiplier having first and second sets of one or more switches. These sets of switches will be herein referred to as first and second "switches" 1, 2 for convenience, with the understanding that each can be implemented by multiple switches operating in unison. The switching network 12A further includes pump capacitors C5-C7, and dc capacitors C1-C4. The pump capacitors C5-C7 are in parallel because their negative terminals all connect to a pump signal $V_{clk}$. The dc capacitors C1-C4 are in parallel because their negative terminals connect to ground. In operation, these dc capacitors C1-C4 store charge from the pump capacitors C5-C7.

During normal operation, the switching network 12A alternates between a first and second state at a specific frequency and duty cycle, such as 50%.

During the first state, the first switch 1 is closed and the second switch 2 is open. During the second state, the first switch 1 is open and the second switch 2 is closed. The frequency at which the first and second switches 1, 2 both transition between states can be the same as or different from that at which the regulating network 16A switches between states. In cases where these frequencies are the same, they can, but need not be in phase.

The pump capacitors C5-C7 swing up and down as the pump signal $V_{clk}$ alternates between zero volts and the output voltage $V_O$. At each clock cycle, charge moves between a pump capacitor C5-C7 and a dc capacitor C1-C4.

In the particular embodiment shown, charge from a dc capacitor C1 makes its way to the last dc capacitor C4 after three clock cycles. Overall, the switching network 12A can be modeled using the circuit model shown in FIG. 9 with a transformation ratio of 1:1 and an offset voltage $V_{off}$ of $3V_O$.

Figure 11:
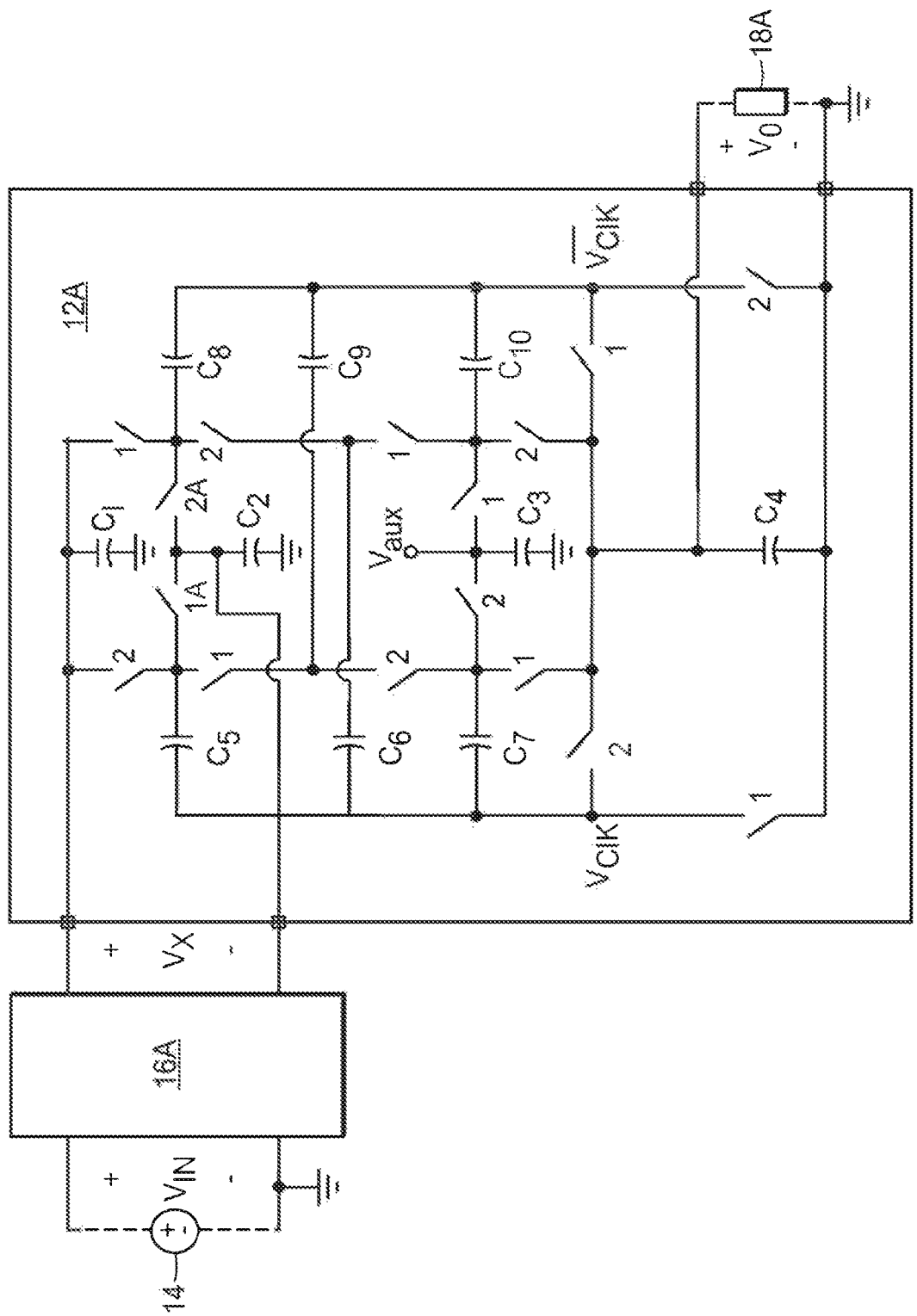
FIG. 11 shows a second implementation of the switching network in FIG. 1 in which the switching network is a dual-phase symmetric cascade multiplier having parallel pumped capacitors.

In an alternative embodiment, shown in FIG. 11, the switching network 12A is a dual-phase symmetric cascade multiplier having parallel pumped capacitors. All switches operate in the same manner already described in connection with FIG. 10. Cascade multipliers are described in connection with the description of FIG. 15 in U.S. Pat. No. 8,860,396, the contents of which are herein incorporated by reference.

A particular feature of the embodiment shown in FIG. 11 is the absence of dc capacitors inside the cascade multiplier (i.e., capacitors C1, C2 are at the input and output terminals). As a result, it is necessary to add a first switch LA, a second switch 2A, and a first dc capacitor C2. The sole function of the first dc capacitor C2 is to keep the node voltage relatively constant. As a result, the capacitance of the first dc capacitor C2 depends on the amount of charge that is expected to flow in and out of the first dc capacitor C2 as well as the voltage ripple requirement of the node voltage.

In operation, the first switch LA and the second switch 2A are never in a closed state at the same time. To as great an extent as is possible, the first switch 1A is synchronized with a first switch set 1 so that when the first switch 1A is open, so are all the switches in the first switch set 1, and when the first switch 1A is closed, so are all the switches in the first switch set 1. Similarly, to as great an extent as is possible, the second switch 2A is synchronized with the second switch set 2 so that when the second switch 2A is open, so are all the switches in a second switch set 2, and when the second switch 2A is closed, so are all the switches in the second switch set 2. As a result, when the pump signal $V_{clk}$ is high, a pump capacitor C8 connects to the first dc capacitor C2. When the pump signal $V_{clk}$ is low, a pump capacitor C5 is connected to the first dc capacitor C2.

An advantage of the embodiment shown in FIG. 11 is that it becomes possible to create additional dc voltages. For example, it is possible to create an auxiliary voltage across a second dc capacitor C3. This auxiliary voltage thus becomes available to drive other circuits, included such circuits as gate drivers and level shifters, or any other circuit that would require, during its operation, a voltage that falls between the input voltage $V_{IN}$ and the output voltage $V_O$ of the power converter.

Yet another advantage is the possibility for using charge that is stored in the second dc capacitor C3 to supply a linear regulator, thus creating a regulated voltage.

Figure 12:
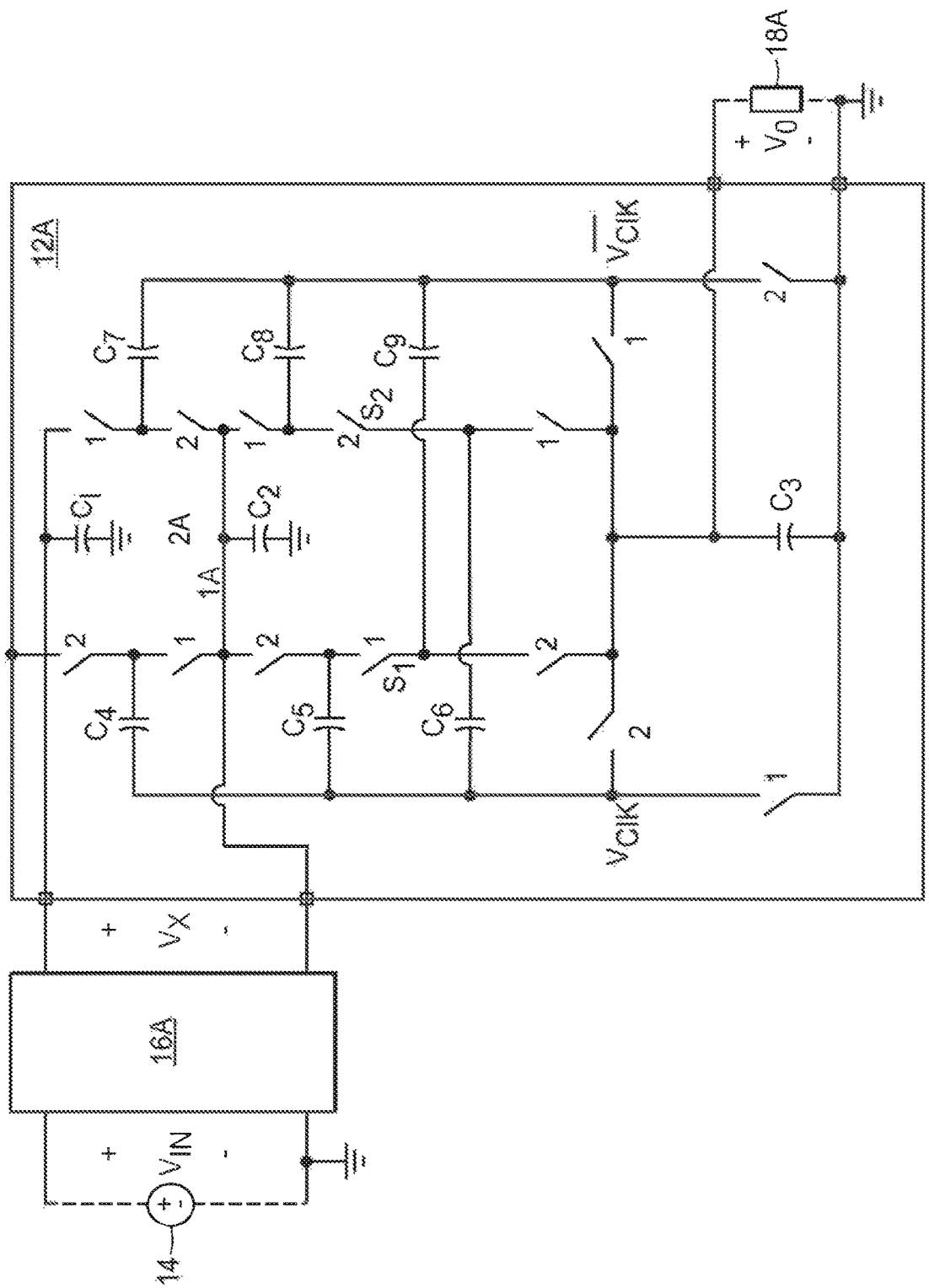
FIG. 12 shows a third implementation of the switching network in FIG. 1 in which the switching network has a dual-phase asymmetric cascade multiplier stacked on top of dual-phase symmetric cascade multiplier with shared phase nodes.

In yet another embodiment, shown in FIG. 12, the switching network 12A features a dual-phase asymmetric cascade multiplier stacked on top of dual-phase symmetric cascade multiplier with shared phase pump nodes, i.e. the pump signal $V_{clk}$ and its complement. All switches operate in the same manner already described in connection with FIG. 10.

Because the nodes are shared in the illustrated embodiment, both cascade multipliers are operated at the same frequency. However, sharing the phase pump is not required.

Additionally, in the particular embodiment shown, the transformation ratio of each stage is relatively low. However, there is no special constraint on transformation ratio. For example, it would be quite possible for the dual-phase asymmetric cascade multiplier to have a transformation ratio of 2:1, while the dual-phase symmetric cascade multiplier has a transformation ratio of 10:1.

An advantage of the structure shown in FIG. 12 is that the symmetric cascade multiplier lacks dc capacitors and has fewer switches than a corresponding asymmetric cascade multiplier. Thus, the combination of the two as shown in the figure has fewer switches and fewer dc capacitors. On the other hand, the first and second switches S1, S2 block twice the voltage as other switches.

Figure 13A:
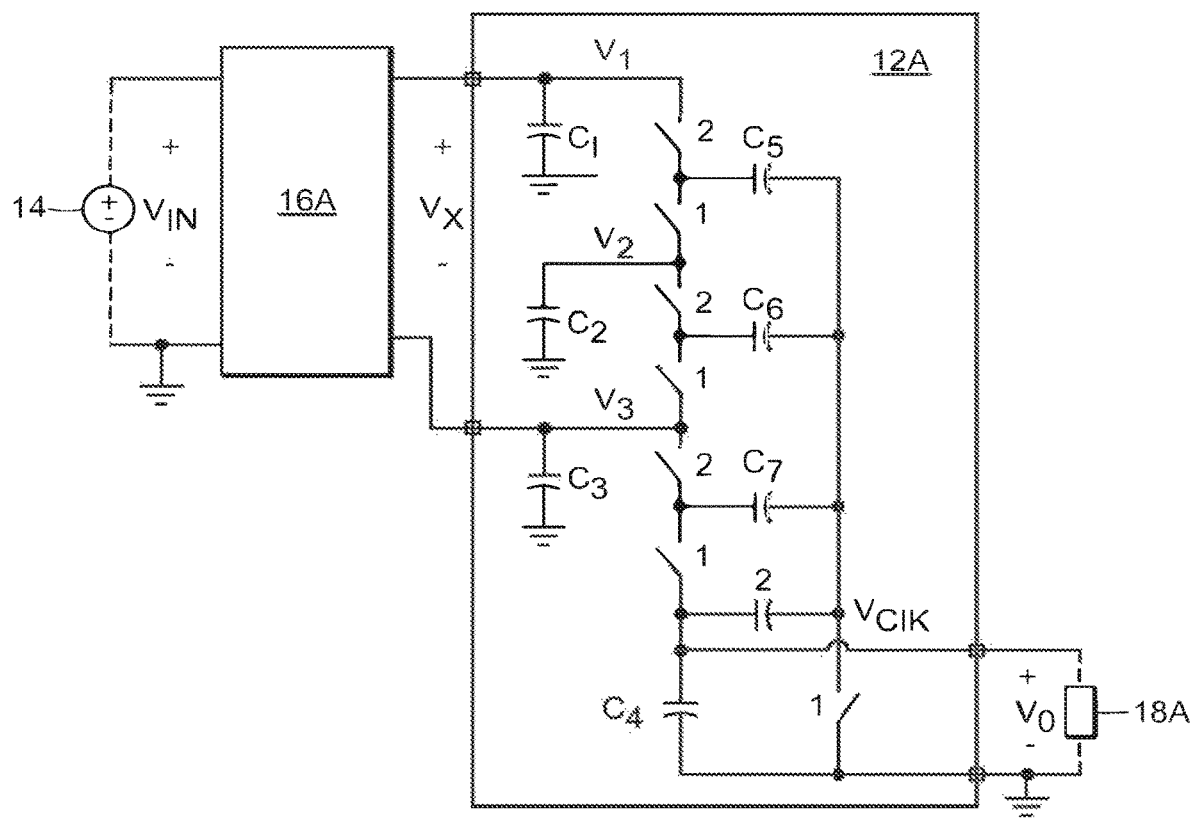
FIG. 13A shows a variant of the power converter in FIG. 10.

FIG. 13A shows a power converter that is a variant of that shown in FIG. 10. In the power converter shown in FIG. 13A, the intermediate voltage $V_X$ is applied across the dc capacitors C1, C3 instead of across the dc capacitors C1, C2 as shown in FIG. 10. The corresponding circuit model would be that shown in FIG. 9, but with a transformation ratio of 2:1 and with an offset voltage $V_{off}$ of $2V_O$. In some cases, depending on the nature of the regulating network 16A, the configuration shown in FIG. 13A permits a wider input voltage $V_{IN}$ range, than the configuration in FIG. 10.

Figure 13B:
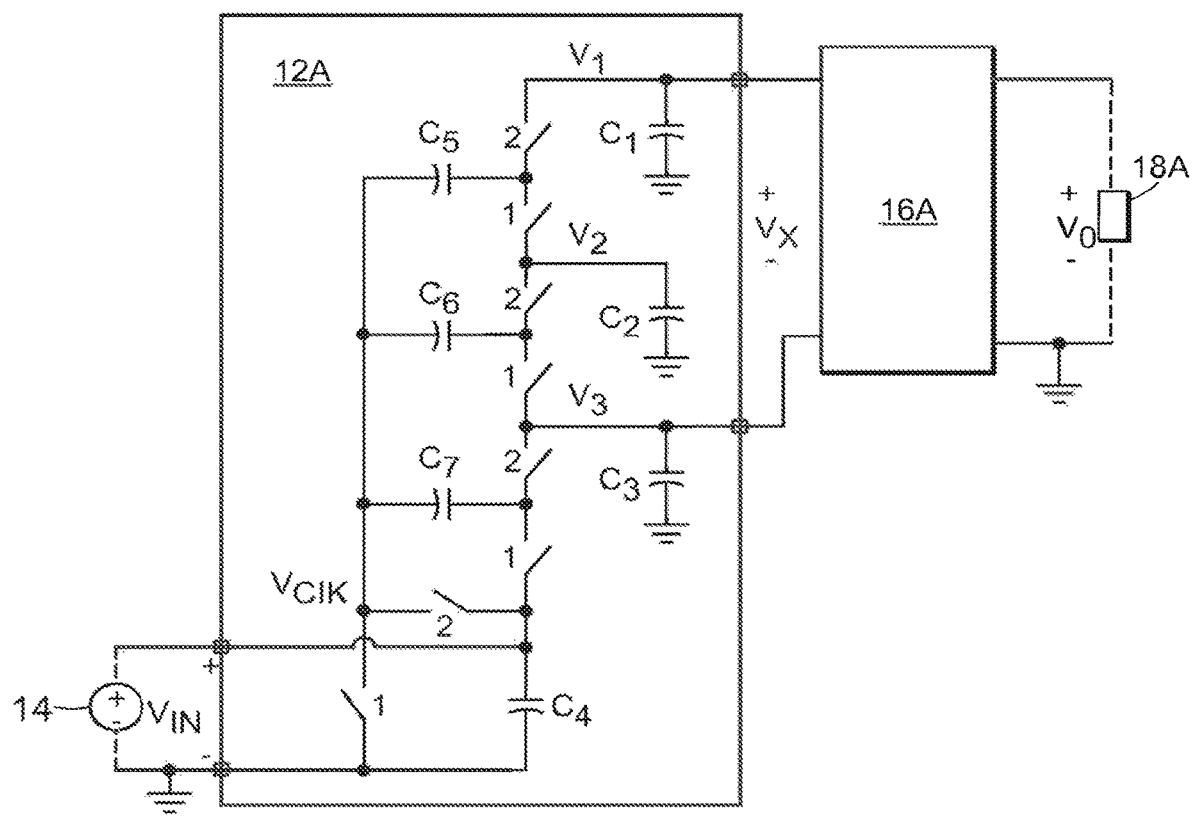
FIG. 13B shows a power converter similar to that shown in FIG. 13A, but with the order of the regulating network and the switching network having been reversed.

FIG. 13B shows a power converter similar to that shown in FIG. 13A, but with the order of the regulating network 16A and the switching network 12A having been reversed. Unlike the configuration shown in FIG. 13A, in which the switching network 12A causes the voltage to step down, in the configuration shown in FIG. 13B, the switching network 12A causes the voltage to step up.

Figure 14A:
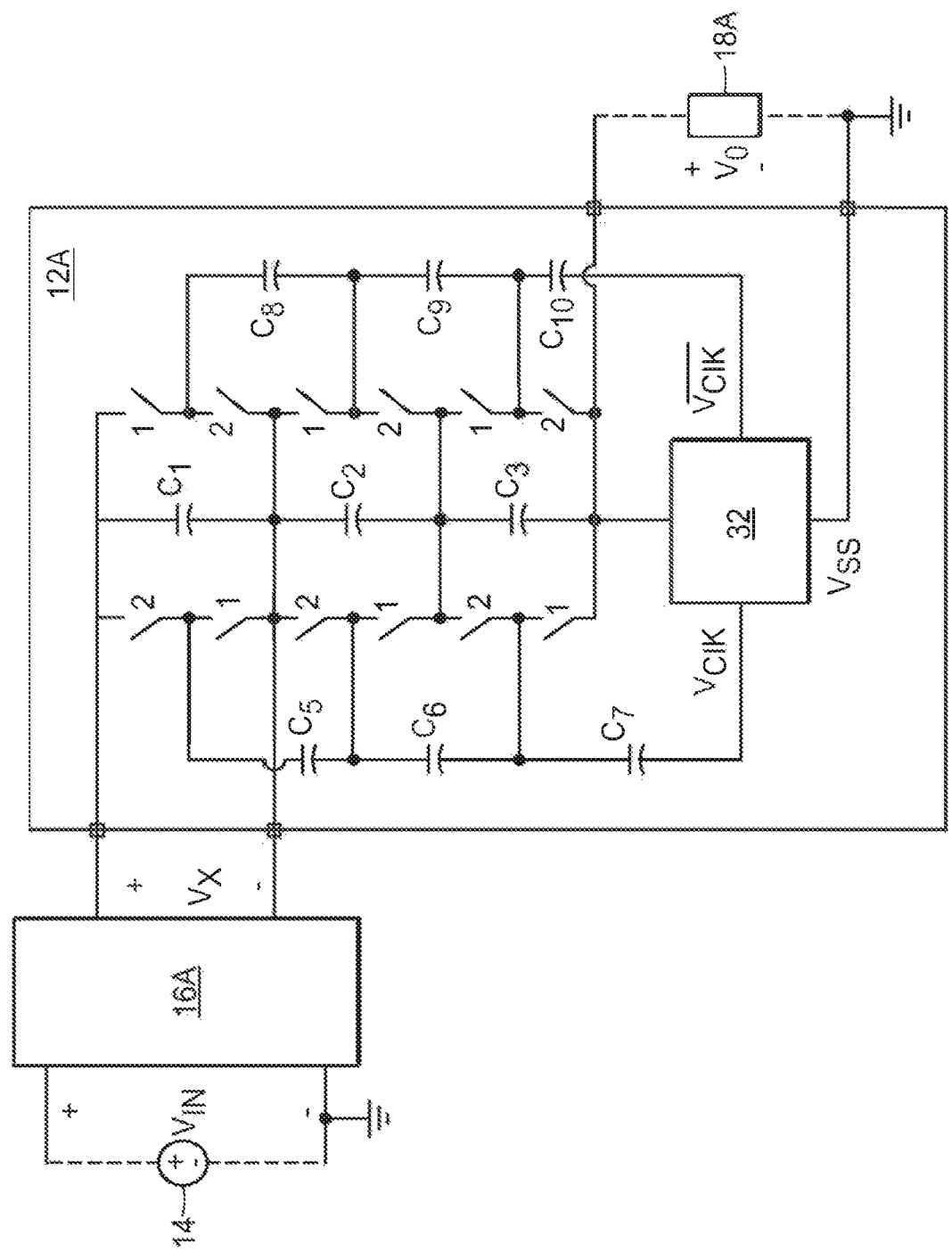
FIG. 14A shows a second implementation of the switching network in FIG. 1.

FIG. 14A shows a power converter similar to that shown in FIG. 10 with the exception that the cascade multiplier is a two-phase cascade multiplier instead of a single-phase cascade multiplier. In addition, the pump capacitors C1-C3 are in series instead of in parallel. As a result, the pump capacitors C1-C3 avoid having an excessively high voltage across them. On the other hand, the capacitance required is higher than that required in the switching network 12A shown in FIG. 10. Yet another disadvantage of connecting pump capacitors C1-C3 in series is that, when adiabatic charge transfer occurs between such capacitors during charge redistribution, the loss associated with such redistribution is greater than it would be with the switching network 12A shown in FIG. 10.

Figure 14B:
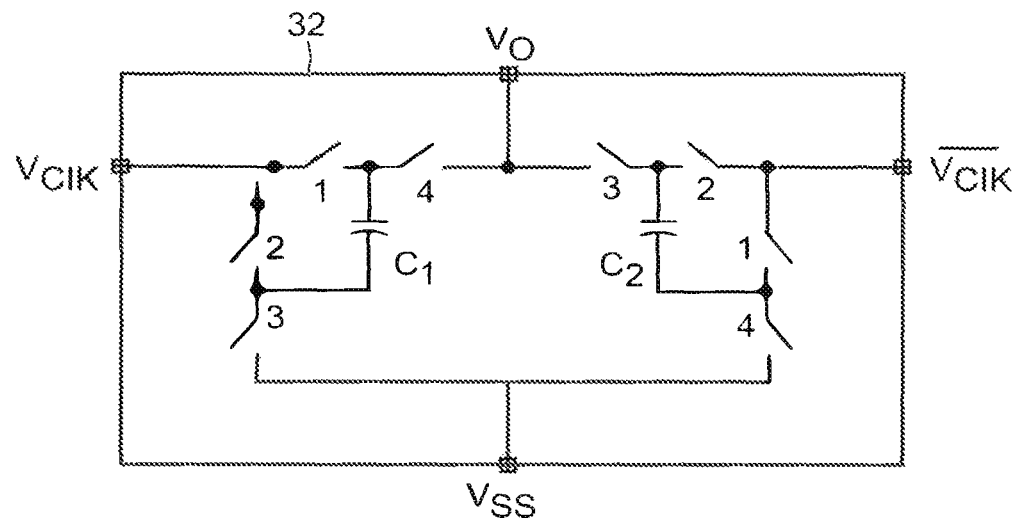
FIGS. 14B and 14C show implementations of the phase pump shown in FIG. 14A.
Figure 14C:
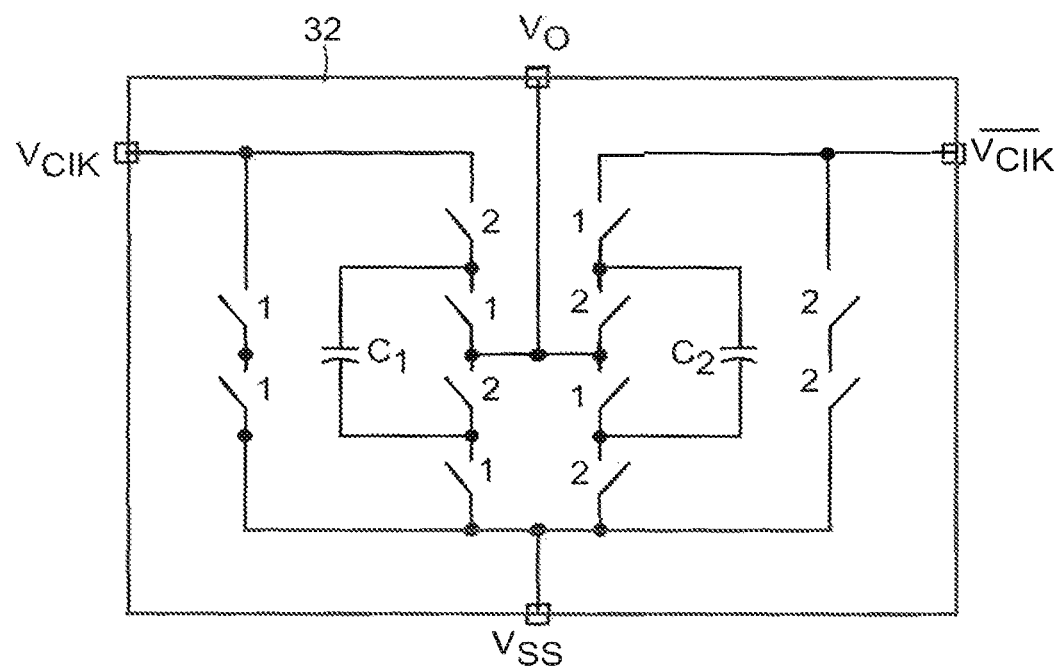

The cascade multiplier includes a phase pump 32. FIGS. 14B-14C show examples of suitable phase pumps. Unlike conventional phase pumps, those shown in FIGS. 14B-14C include embedded charge pumps. The resulting phase pumps can thus generate pump signals with variable gain. In particular, the phase pump 32 shown in FIG. 14B provides voltage attenuation; the phase pump 32 shown in FIG. 14C provides voltage gain.

The phase pump 32 shown in FIG. 14B includes a first pair of switches 1, a second pair of switches 2, a third pair of switches 3, a fourth pair of switches 4, a first pump capacitor C1, and a second pump capacitor C2. In response to receiving an output voltage $V_O$, the illustrated phase pump 32 produces a pump signal $V_{clk}$ and its complement.

In operation, the phase pump 32 operates in either a first operating mode or a second operating mode. In the first operating mode, the pump signal $V_{clk}$ alternates between 0 volts and $V_O/2$ volts. In the second operating mode, the pump signal $V_{clk}$ alternates between 0 volts and $V_O$ volts.

Operation in the first mode requires that the phase pump 32 transition between four states according to the following switching pattern in Table 1A:

TABLE 1A

| State | $V_{clk}$ | 1 | 2 | 3 | 4 |
| --- | --- | --- | --- | --- | --- |
| first | 0 V | OFF | ON | ON | OFF |
| second | $V_O/2$ | OFF | ON | OFF | ON |

TABLE 1A-continued

| State | $V_{clk}$ | 1 | 2 | 3 | 4 |
|---|---|---|---|---|---|
| third | 0 V | OFF | ON | ON | OFF |
| fourth | $V_O/2$ | ON | OFF | ON | OFF |

Operation in the second mode requires that the phase pump 32 transition between two states according to the following switching pattern in Table 1B:

TABLE 1B

| State | $V_{clk}$ | 1 | 2 | 3 | 4 |
|---|---|---|---|---|---|
| first | 0 V | OFF | ON | ON | OFF |
| second | $V_O$ | ON | OFF | OFF | ON |

Switching between the first and second mode enables the phase pump 32 to change the transfer function of the cascade multiplier. For example, if the phase pump 32 in FIG. 14A were implemented as shown FIG. 14B, then in the first mode, the transformation ratio would be 1:2 with an offset voltage $V_{off}$ of $2V_O$ volts, but in the second mode the transformation ratio would be 1:1 with an offset voltage $V_{off}$ of $3V_O$ volts.

The phase pump 32 shown in FIG. 14C includes a first set of switches 1, a second set of switches 2, a first pump capacitor C1, and a second pump capacitor C2. In response to receiving an output voltage $V_O$, the illustrated phase pump 32 produces a pump signal $V_{clk}$ and its complement.

In normal operation, the phase pump 32 transitions between a first and a second state. During the first state, the switches in the first set of switches 1 are closed while those in the second set of switches 2 are opened. During the second state, the switches in the first set of switches 1 are opened while those in the second set of switches 2 are closed.

Unlike the phase pump 32 shown in FIG. 14B, which provided an alternating signal with a peak below the output voltage $V_O$, this phase pump 32 provides an alternating signal with a peak above the output voltage $V_O$. Since the peak voltage of the pump signal $V_{clk}$ is twice that of the output voltage $V_O$, the phase pump 32 shown in FIG. 14C produces a higher transformation ratio and offset voltage $V_{off}$ than a standard phase pump that uses two pairs of switches.

For example, if the phase pump 32 shown in FIG. 14A were implemented as shown in FIG. 14C, the transformation ratio would be 2:1 with an offset voltage $V_{off}$ of $5V_O$ volts compared to 1:1 with an offset voltage $V_{off}$ of $3V_O$ volts for a standard phase pump.

Figure 15A:
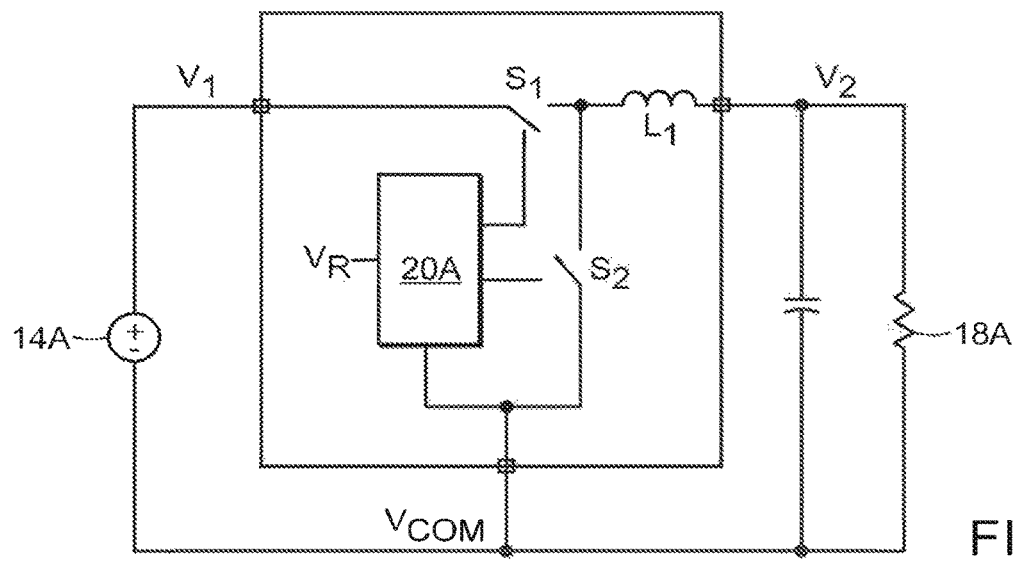
FIG. 15A shows a buck converter used to implement a regulating network.

FIG. 15A shows a buck converter that can be used in connection with implementing a regulating network 16A. The buck converter is similar to that shown as configuration "A1" in the table in the appendix.

In FIG. 15A, the buck converter has an input terminal, an output terminal, and a common negative terminal. The common negative terminal is maintained at a common voltage $V_{com}$. The input terminal is maintained at a first voltage $V_1$ that differs from the common voltage $V_{com}$ by $V_1$ volts. The output terminal is maintained at a second voltage $V_2$ that differs from the common voltage by $V_2$ volts.

The buck converter includes a first switch S1, a second switch S2, an inductor L1, and a driver circuit 20A. The driver circuit 20A receives a control signal VR and outputs suitable voltages for controlling the first and second switches S1, S2.

Figure 15B:
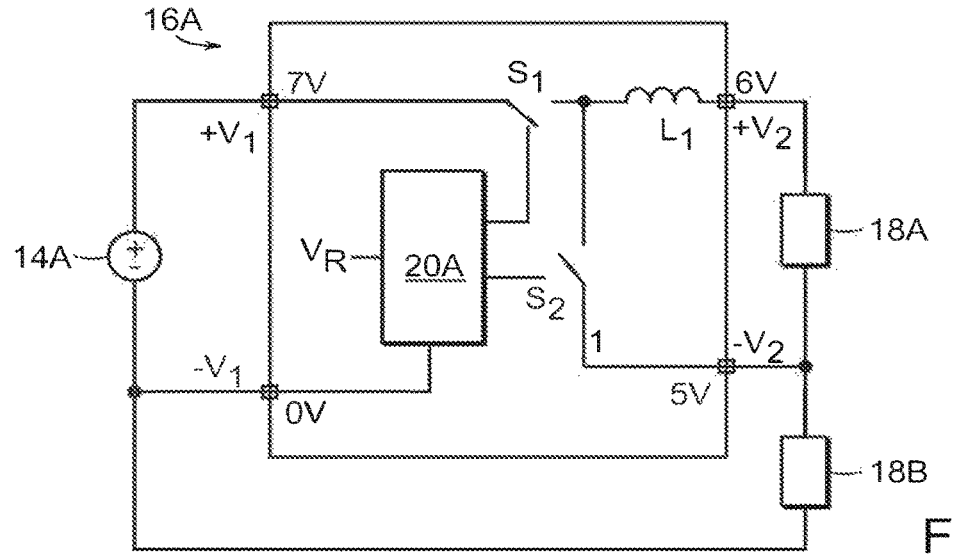
FIGS. 15B-15C show non-isolating variants of the buck converter of FIG. 15A.
Figure 15C:
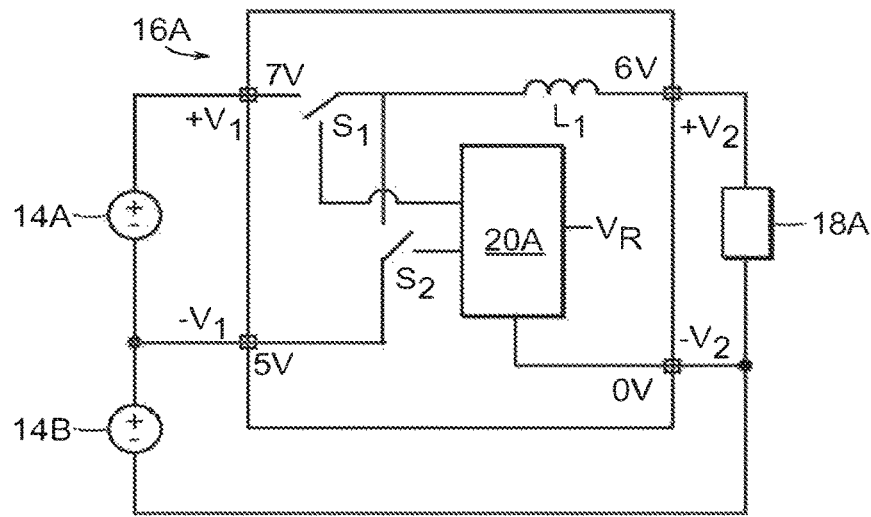
Figure 16A:
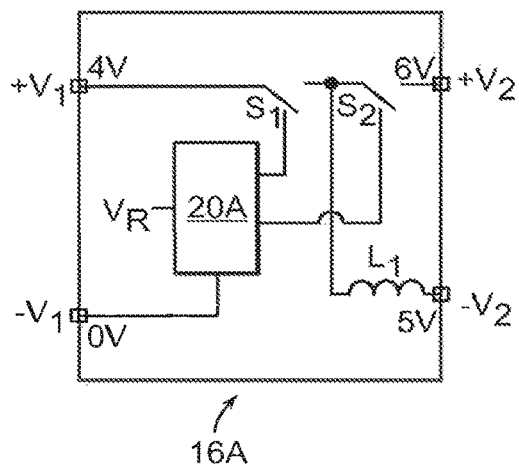
FIGS. 16A-16B show non-isolating buck-boost converters used to implement a regulating network in any of the foregoing power converters.
Figure 16B:
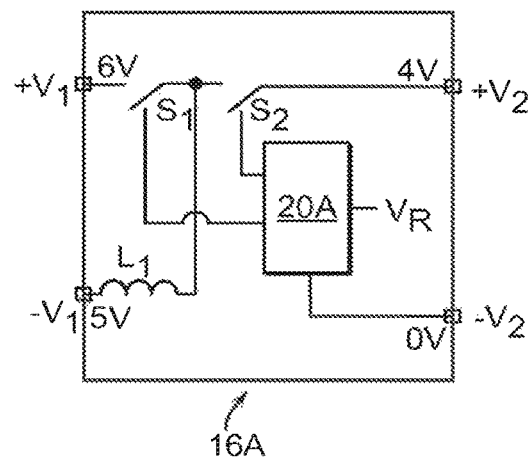
Figure 17A:
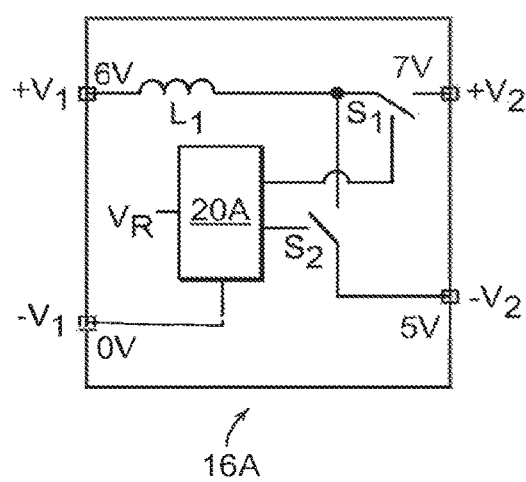
FIGS. 17A-17B show non-isolating boost converters used to implement a regulating network in any of the foregoing power converters.
Figure 17B:
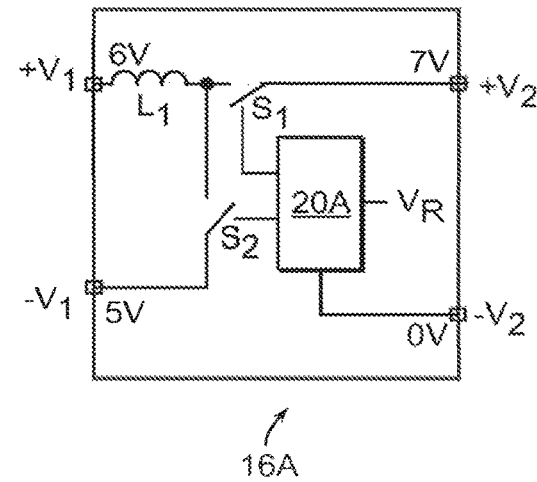
Figure 18A:
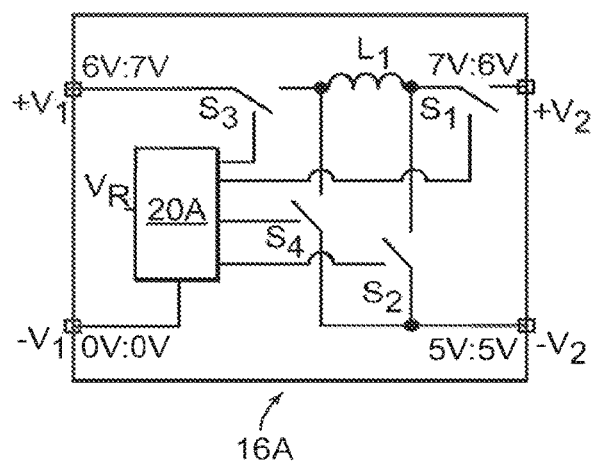
FIGS. 18A-18B show four-terminal non-inverting buck-boost converters.
Figure 18B:
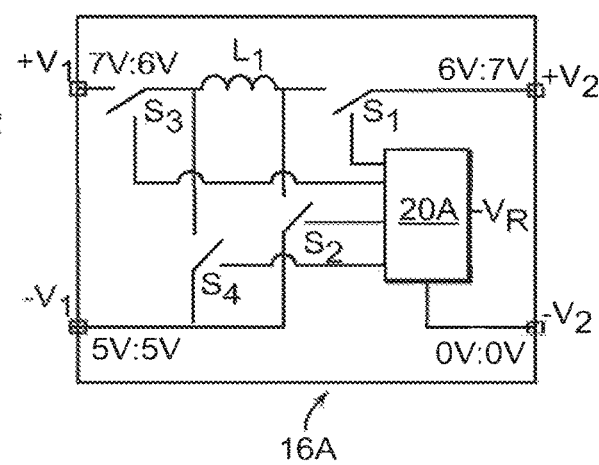

It is not actually necessary for the input terminal and the output terminal to share a common negative terminal. In fact, there are six possible configurations of non-isolated regulating circuits that have two switches S1, S2, an inductor L1, and four terminals. Two of them are buck converters. These are shown in FIGS. 15B-15C. Two are buck-boost converters, which are shown in FIGS. 16A-16B. And the remaining two are boost converters, which are shown in FIGS. 17A-17B. If one is willing to have four switches S1, S2, S3, S4, additional possibilities emerge, two of which are shown in FIGS. 18A-18B.

Examples of configurations other than those described above for regulating circuits are shown in the appendix. All of the exemplary regulating circuits shown in the appendix can be used within the regulating network 16A.

The buck converters shown in FIGS. 15B-15C each have a positive input terminal and output terminal with their own respective negative terminal. For ease of discussion, voltages at each terminal of the buck converters in FIGS. 15B-15C have been assigned names and practical values. Each buck converter has first and second switches S1, S2, an inductor L1, and a drive circuit 20A. The drive circuit 20A receives a control signal VR and, in response, outputs voltages that control the first and second switches S1, S2. The drive circuit 20A is referenced to a ground potential (i.e., 0 V), which is the negative input terminal in FIG. 15B, and the negative output terminal in FIG. 15C. A level shifter or a boot strap circuit might be required within the driver circuit 20A to provide appropriate voltage signals to control the first and second switches S1, S2.

In operation, the buck converters in FIGS. 15B-15C transition between a first state and a second state. In the first state, the first switch S1 is closed and the second switch S2 is open. In the second state, the first switch S1 is open and the second switch S2 is closed. In a power converter that uses this regulating network 16A, the voltage $+V_2$ at the positive output terminal is lower than the voltage $+V_1$ at the positive input terminal.

In the buck converter shown in FIG. 15B, the negative output terminal, which carries a floating voltage, $-V_2$, is between two loads 18A, 18B. Meanwhile, the voltage $+V_2$ is constrained to float between $+V_1$ and $-V_2$. In the buck converter shown in FIG. 15C, the negative input terminal, which carries a floating voltage, $-V_1$, is coupled between two sources 14A, 14B. Meanwhile, the voltage $+V_2$ is constrained to float between $+V_1$ and $-V_1$.

FIGS. 16A-16B show four-terminal buck-boost converters that are used to implement the regulating network 16A. In FIG. 16A, the voltage $-V_2$ floats between $+V_1$ and $+V_2$. In FIG. 16B, the voltage $-V_1$ floats between $+V_1$ and $+V_2$.

Each buck-boost converter has first and second switches S1, S2, an inductor L1, and a driver circuit 20A that receives a control signal VR and, in response, outputs voltage signals that control the switches S1, S2. The buck-boost converters transition between first and second states. In the first state, the first switch S1 is closed and the second switch S2 is open. Conversely, in the second state, the first switch S1 is open and the second switch S2 is closed. In a power converter that uses this regulating network 16A, the voltage $+V_2$ at the positive output terminal can be higher or lower than the voltage $+V_1$ at the positive input terminal.

FIGS. 17A-17B show boost converters that are used to implement the regulating network 16A. In the boost converter shown in FIG. 17A, the voltage $+V_1$ is between $+V_2$ and $-V_2$. In the boost converter shown in FIG. 17B, the voltage $+V_1$ is between $+V_2$ and $-V_1$.

Each boost converter features first and second switches S1, S2, an inductor L1, and a drive circuit 20A that receives a control signal VR and, in response, outputs voltages suitable for driving the first and second switches S1, S2.

In operation, each boost converter transitions between first and second states. In the first state, the first switch S1 is closed and the second switch S2 is open. In contrast, in the second state, the first switch S1 is open and the second switch S2 is closed. In the regulating network 16A implemented using the boost converter of FIG. 17A or 17B, the voltage $+V_2$ at the positive output terminal is higher than the voltage $+V_1$ at the positive input terminal.

The regulating network 16A can also be implemented using non-isolating regulating circuits that have a first switch S1, a second switch S2, a third switch S3, a fourth switch S4, an inductor L1, and four ports. A variety of configurations are shown in the table in the appendix.

FIGS. 18A-18B show two embodiments of such four-terminal non-inverting buck-boost converters, each of which can operate in buck mode or boost mode depending on the switch configuration. In buck mode, the regulator causes voltage to step down, whereas in boost mode, it causes voltage to step up.

When operating in buck mode, the first switch S1 is closed and the second switch S2 is opened. The remaining switches are then operated to transition between first and second states. In the first state, the third switch S3 is closed and the fourth switch S4 is open. In the second state, the third switch S3 is open and the fourth switch S4 is closed. In buck mode, $+V_2<+V_1$ while $-V_2<+V_1$.

When operating in boost mode, the third switch S3 is closed while the fourth switch S4 is open. The remaining switches are then operated to transition between first and second states. In the first state, the first switch S1 is closed and the second switch S2 is opened. In the second state, the first switch S1 is open and the second switch S2 is closed. When operated in boost mode, $+V_2>+V_1$ while $-V_2<+V_1$.

A converter along the lines shown in FIGS. 18A-18B is desirable because it widens acceptable voltage limits at its terminals. However, it does so at the cost of increased component cost and size, as well as a reduction in efficiency.

A disadvantage of the power converters shown in FIGS. 10-13 is that the offset voltage $V_{off}$ is fixed to specific fraction of the output voltage $V_O$. For example, in the power converter shown in FIG. 10, the offset voltage $V_{off}$ is $4V_O$. In the power converter shown in FIG. 13 the offset voltage $V_{off}$ is $2V_O$. This is acceptable if the input voltage $V_{IN}$ or the output voltage $V_O$ is constrained over a narrow range. However, if the input voltage $V_{IN}$ or output voltage $V_O$ varies over a range that is wider than this narrow range, this can place the regulating network 16A outside acceptable voltage limits associated with its specific implementation. This leads to gaps in the operating range or over voltage of the switches.

Figure 19:
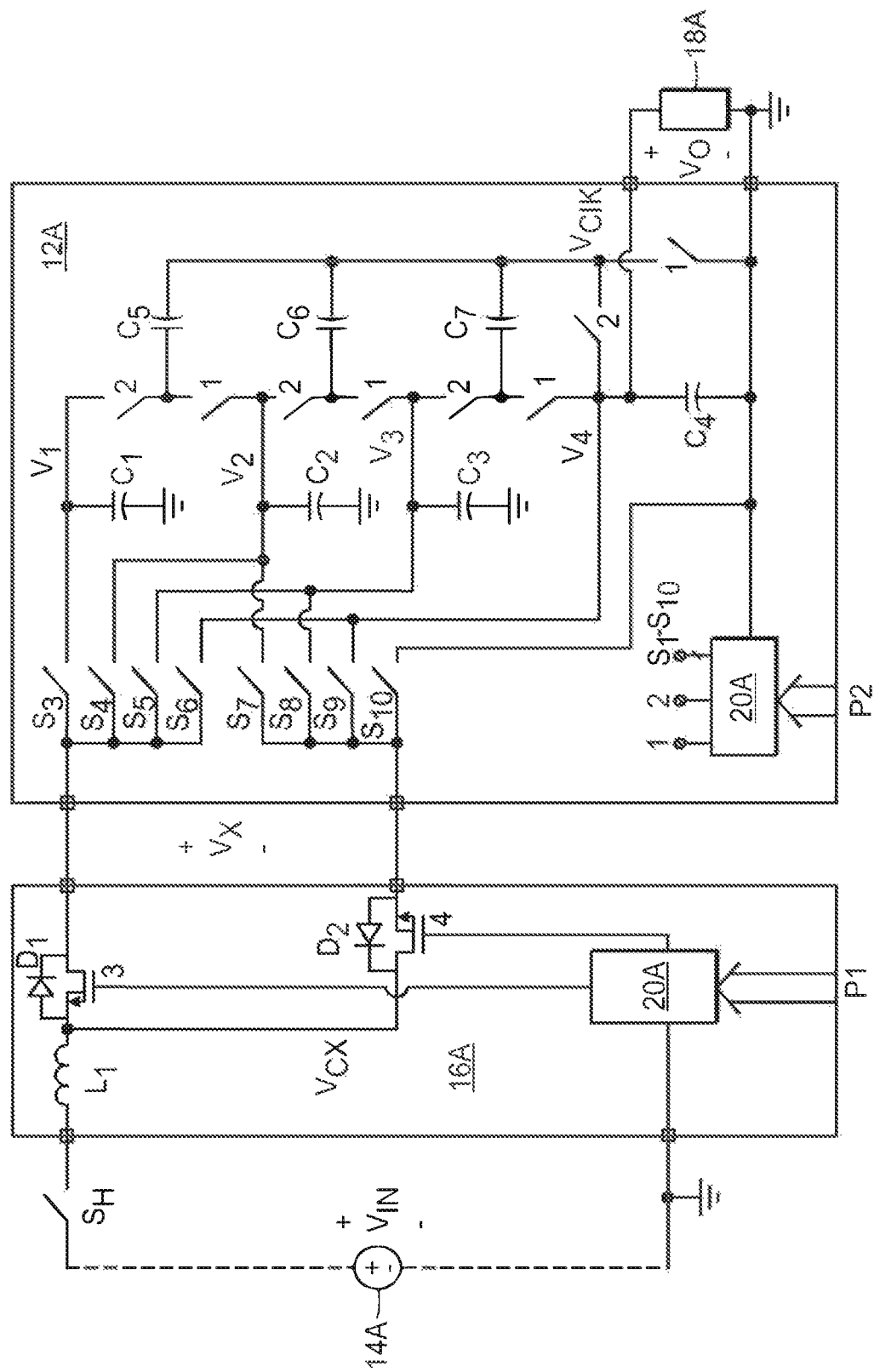
FIG. 19 shows the power converter of FIG. 1 with a reconfiguring switching network.

The power converter shown in FIG. 19 overcomes the foregoing disadvantages. The illustrated power converter is a species of that shown in FIG. 1 with the switching network 12A implemented using a step-down single-phase asymmetric cascade multiplier having selection switches S3-S10 and with the regulating network 16A implemented using the regulating circuit shown in FIG. 17A.

The illustrated switching network 12A is an example of a reconfigurable switched-capacitor network. There are many ways to implement such a reconfigurable switched-capacitor network. In fact, in principle, if one can add any number of switches, there are an infinite number of ways to implement such a reconfigurable switched-capacitor network. The regulating network 16A includes first and second active switches 3, 4 and an inductor L1. The first and second active switches 3, 4 cycle between first and second states at a particular duty cycle and frequency.

Depending on the upon the required offset voltage $V_{off}$, which is set by input voltage $V_{IN}$ and output voltage $V_O$, the offset voltage $V_{off}$ can be set to a fraction of the output voltage $V_O$ by selectively enabling and disabling the selection switches S3-S10. In particular, the state of each selection switch for the various offset voltages $V_{off}$ is shown in Table 2:

TABLE 2

| $V_{LX}$ | $V_{off}$ | S3 | S4 | S5 | S6 | S7 | S8 | S9 | S10 |
|---|---|---|---|---|---|---|---|---|---|
| $V_1/V_2$ | $3 V_4$ | ON | OFF | OFF | OFF | ON | OFF | OFF | OFF |
| $V_2/V_3$ | $2 V_4$ | OFF | ON | OFF | OFF | OFF | ON | OFF | OFF |
| $V_3/V_4$ | $1 V_4$ | OFF | OFF | ON | OFF | OFF | OFF | ON | OFF |
| $V_4$/gnd | 0 V | OFF | OFF | OFF | ON | OFF | OFF | OFF | ON |

Some of the disabled switches (i.e., OFF) will see a higher voltage than the active switches in the regulating network 16A.

For example, suppose $V_4$ equals one volt. Then $V_3$ equals two volts, $V_2$ equals three volts, and $V_4$ equals four volts. When operating in the mode described on the first line of Table 2, switches S3 and S7 are ON: switch S6 has three volts across it and switch S5 has two volts across it, while the active switches 3, 4 only have one volt across them. In general, the selection switches S3-S10 will either have to have a higher voltage rating than the active switches 3, 4 or they will need to be implemented as cascaded low-voltage switches.

Another issue with this circuit is that the voltage across the selection switches S3-S10 can change polarity. This poses a difficulty because a MOSFET has a parasitic diode in parallel with it, the polarity of which depends on where the body contact of the MOSFET is tied. For example, in one embodiment, the first active switch 3 of the regulating network 16A is a MOSFET having a parasitic diode D1 with its positive terminal connected to the inductor L1. As a result, the first active switch 3 can only block a voltage that is higher at the terminal on the output side of the active switch 3 than the voltage at the inductor side of the active switch 3. Hence, the selection switches S3-S10 must be able to block in both directions. One way to do this is to connect two switches back-to-back with their bodies tied such that the cathodes (negative terminals) of their corresponding parasitic diodes connect to each other. Another way to do this is to provide circuitry for changing polarity of the parasitic diode on the fly, for example by providing a body-snatcher circuit.

The illustrated power converter further includes a disconnect switch S11 to protect the low voltage switches in the power converter in the event of a fault (described in U.S. Pat. No. 8,619,445). The disconnect switch S11 must be a high-voltage switch to achieve this function. Since this switch is not routinely operated, it can be made large to reduce its resistance. However, doing so increases die cost.

In some practices, because a boost converter is practical only when its duty cycle is between about 5% and 95%, there will be gaps in the space of available output voltages.

There are at least two ways to fill these gaps. A first way is to press the disconnect switch S11 into service as a linear regulator at the input of the regulating network 16A. Another way is to place a linear regulator at the output of the regulating network 16A. These both come at the cost of efficiency. Of the two, placing the linear regulator at the input is preferable because doing so impairs efficiency less than placing the linear regulator at the output.

Figure 20:
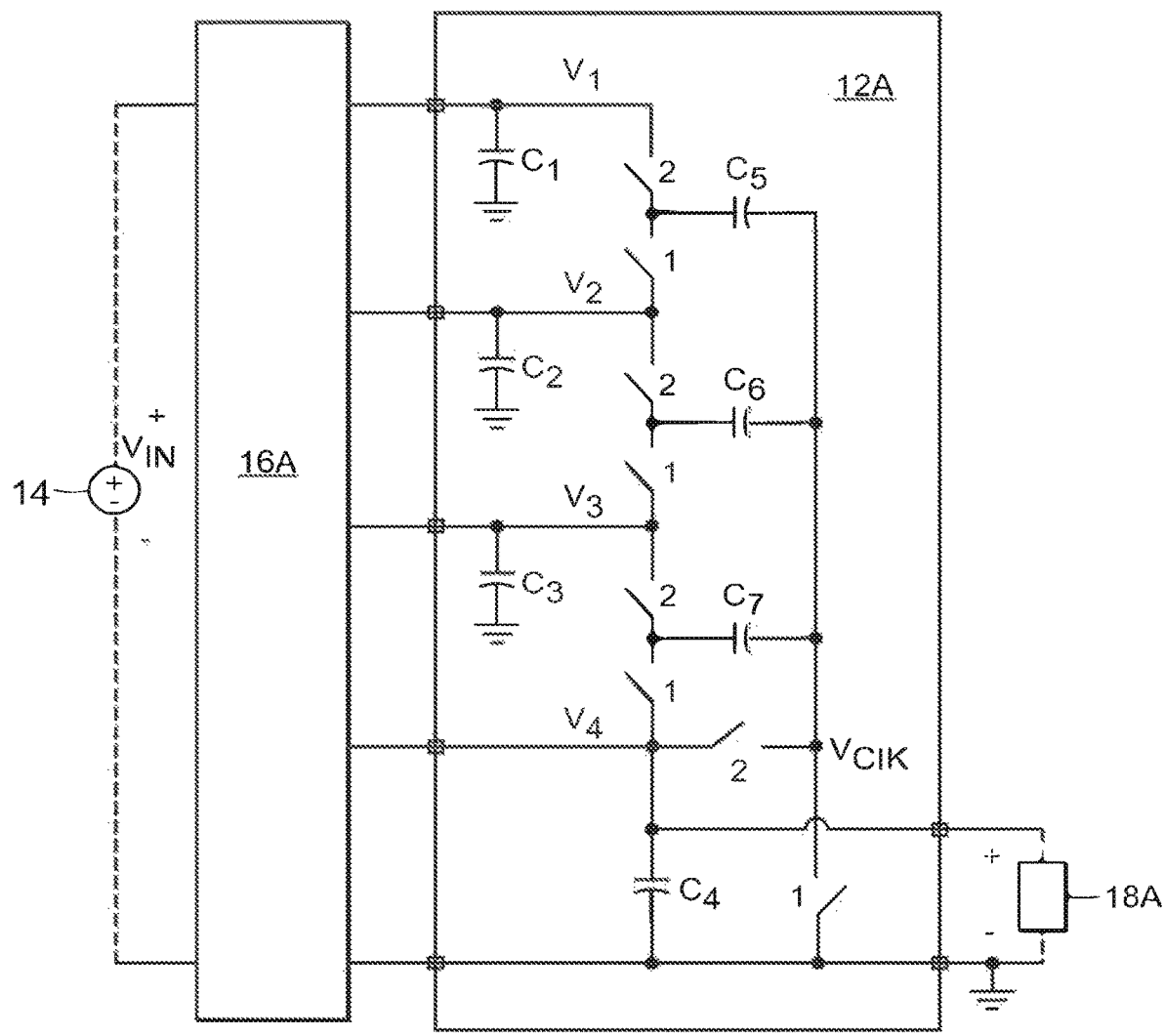
FIG. 20 shows the power converter of FIG. 1 with a reconfiguring regulating network.

In principle, it is possible to reconfigure either the regulating network 16A or the switching network 12A. FIG. 20 shows a circuit in which the regulating network 16A is configured to accept or produce, depending upon direction of power transfer, voltages $V_1$-$V_4$. In operation, the regulating network 16A regulates at least one wire. However, in some embodiments, the regulating network 16A regulates more than one wire. In those embodiments in which the regulating network 16A regulates more than one wire, it does so depending upon the value of the input voltage $V_{IN}$. For example, if the input voltage $V_{IN}$ is low, the regulating network 16A will regulate $V_3$. If the input voltage $V_{IN}$ is high the regulating network 16A will regulate $V_1$. This regulating network 16A reconfigures instead of the switching network 12A.

Figure 21:
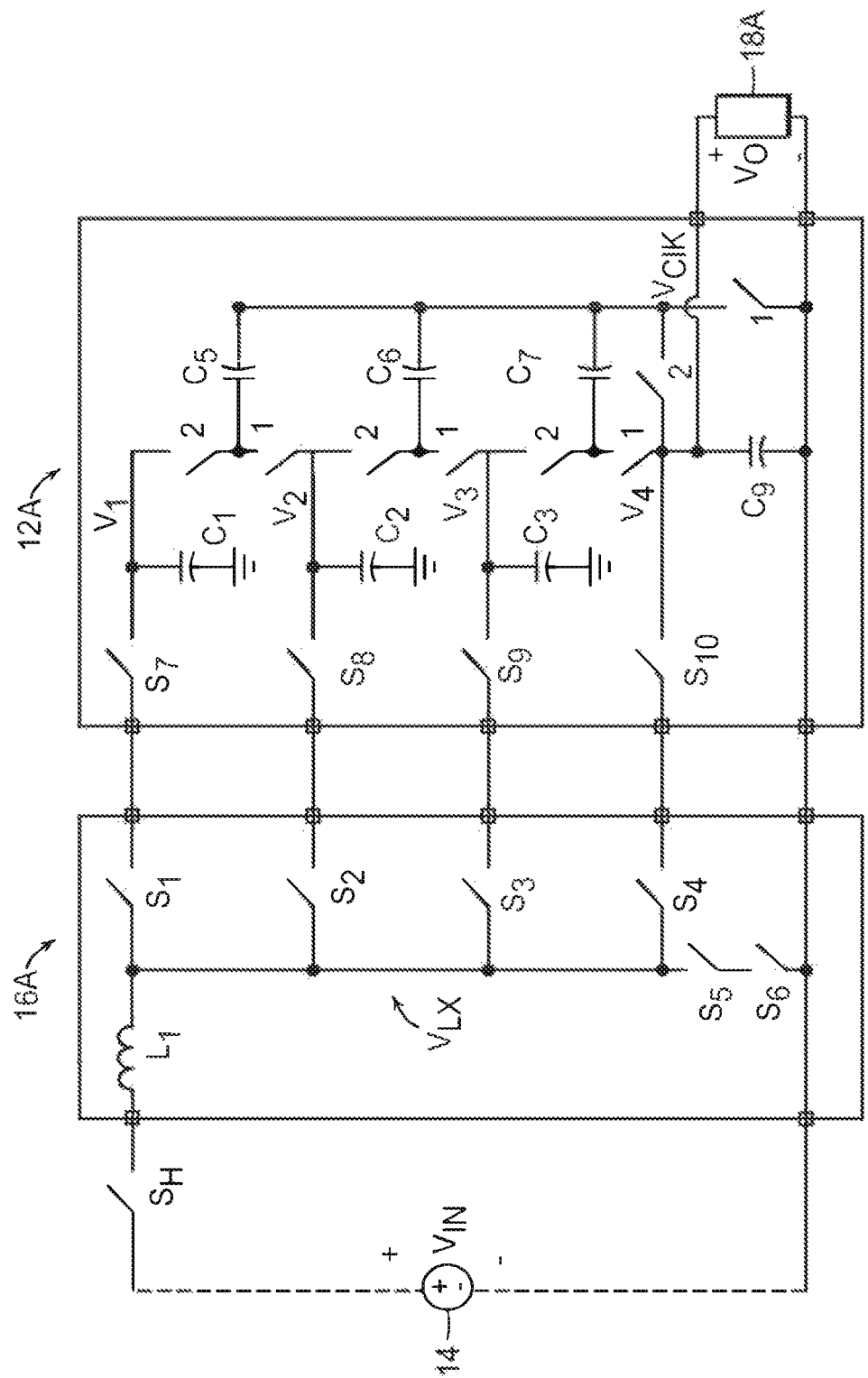
FIG. 21 shows a power converter in which the regulating circuit has more than two output ports.

Instead of using a series of selection switches to present different voltages to a regulating network 16A with two output ports, as shown FIG. 19, it is also quite possible to use a regulating network 16A with more than two output ports. FIG. 21 shows a power converter having such a configuration.

The power converter shown in FIG. 21 includes both a reconfigurable switching network 12A and a reconfigurable switching regulating network 16A. Reconfiguration is carried in both cases by reconfiguration switches. These reconfiguration switches are not involved in actual operation of the network. Their function is to select different tap points on the network.

In the power converter shown in FIG. 21, the reconfigurable switching network 12A is a single-phase step-down switched-capacitor circuit. The reconfigurable regulating network 16A is a multi-tap boost converter having active switches S1-S5, a cascode switch S6, an inductor L1, and a disconnect switch S11.

During normal operation, only two of the active switches S1-S5 are opening and closing at some specific frequency. The remaining active switches are disabled. The boost converter connected to multiple taps on the switching network 12A. This allows the boost converter to regulate the voltage difference between two dc capacitors by controlling the time ratio of the enabled active switches. Such control results in a regulated output voltage $V_O$. Since the voltage difference between two dc capacitors is the output voltage $V_O$, the active switches S1-S5 only need to support the output voltage $V_O$, which is low voltage. In the illustrated examples, each active switch S1-S5 only has to support one volt. However, the disabled switches would normally have to see a higher voltage. Selection switches S6-S10 within the switching network 12A block this voltage, thereby sparing the disabled active switches from having to endure it.

Table 3 below shows the proper configuration of the switches to achieve a particular LX signal $V_{LX}$.

output. However, it can also be used during startup, during a power to ground short, and to function as a linear regulator in the manner already discussed in connection with FIG. 19.

The power converter of FIG. 21 has the same number of switches as that shown in FIG. 19. However, it has fewer high-voltage switches. In particular, the power converter shown in FIG. 19 has eight high-voltage switches, whereas the power converter in FIG. 21 has only five. On the other hand, the power converter shown in FIG. 19 has only two active switches instead of five for the power converter of FIG. 21. This means that the power converter shown in FIG. 19 requires smaller gate drivers and fewer level shifters.

In both cases, selection switches must be able to block in both directions. Thus, both the power converter of FIG. 19 and that of FIG. 21 include bidirectional switches or body-snatchers.

One disadvantage of the power converter of FIG. 21 is that the active switches see both positive and negative polarity. This makes reconfiguring the power converter of FIG. 21 much more difficult and costly than reconfiguring the power converter shown in FIG. 19.

Figure 22:
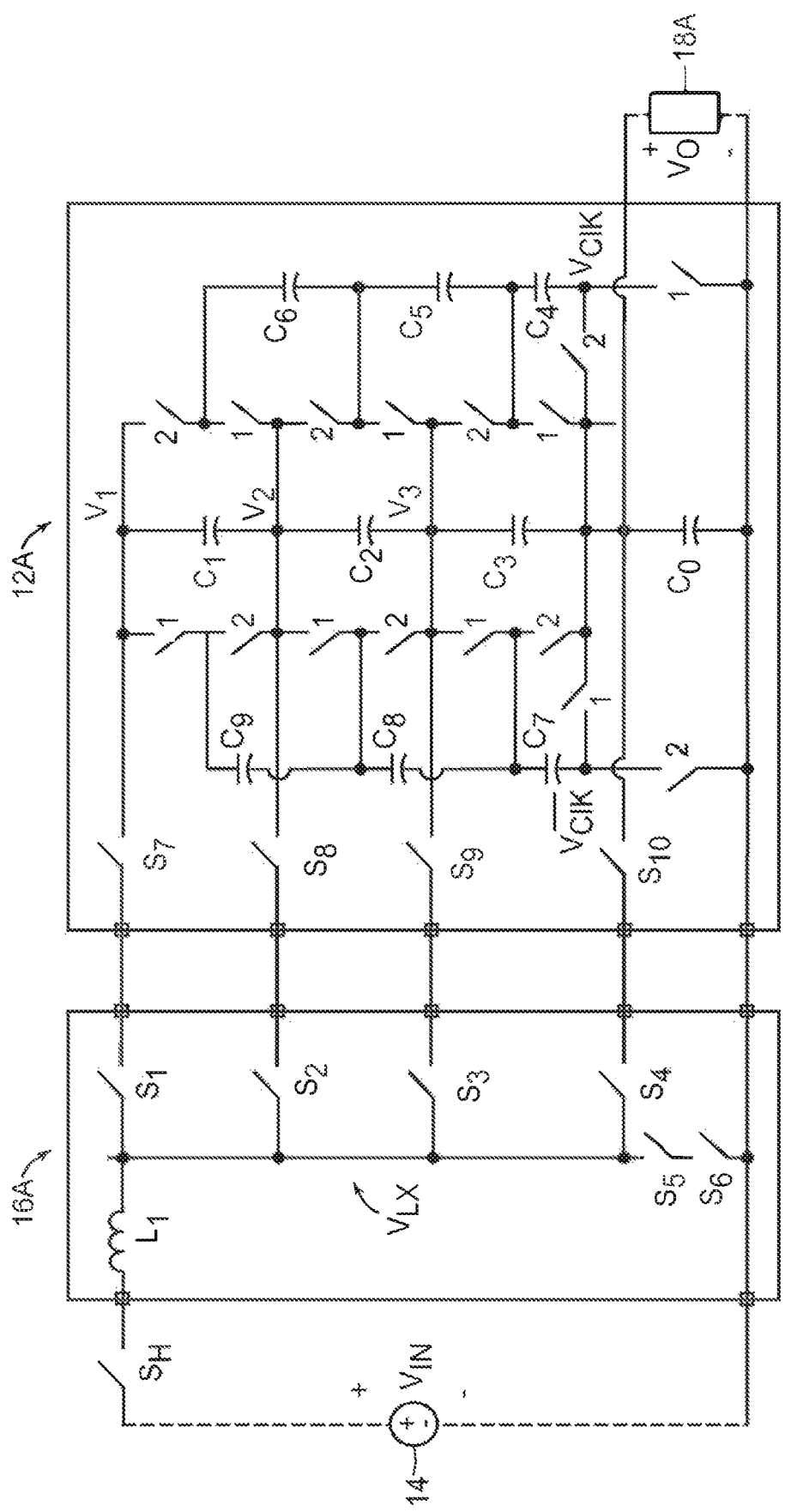
FIG. 22 shows a power converter similar to that shown in FIG. 21, but with a dual-phase switched-capacitor circuit instead of as a single-phase switched-capacitor circuit.

FIG. 22 shows a power converter similar to that shown in FIG. 21, but with the exception that the switching network 12A is implemented as a dual-phase switched-capacitor circuit instead of as a single-phase switched-capacitor circuit. In addition, both the pump capacitors C4-C9 and dc capacitors C0-C3 are in series. This means that their negative terminals are not pegged to a common voltage. Despite these differences, the power converters shown in FIGS. 21-22 operate in a similar manner.

The switching network 12A shown in FIG. 22 has more components than that shown in FIG. 21. However, each dc capacitor in the dual-phase switching network 12A shown in FIG. 22 can have a smaller capacitance than a corresponding dc capacitor in the single-phase switching network 12A shown in FIG. 21. This is because, in the single-phase switching network 12A shown in FIG. 21, the dc capacitors store charge from the pump capacitors. In contrast, in the dual-phase switching network 12A of FIG. 22, the dc capacitors only store charge from the boost converter during the dead-time during which the switching network 12A is transitioning between first and second states.

Figure 23:
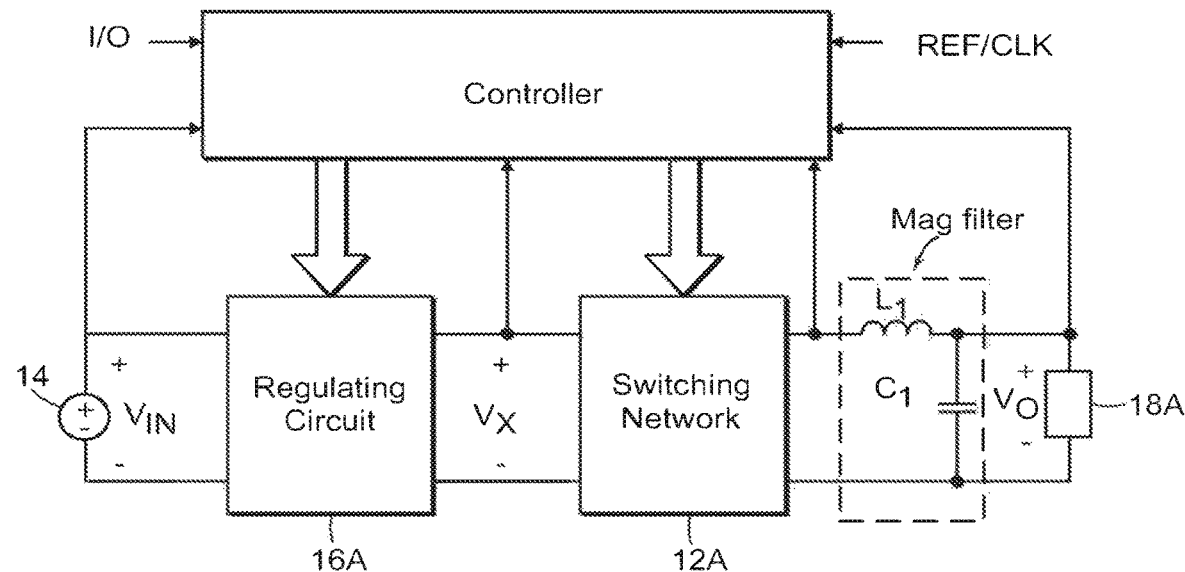
FIG. 23 shows a power converter with a magnetic filter between a switching network and a load.
Figure 24:
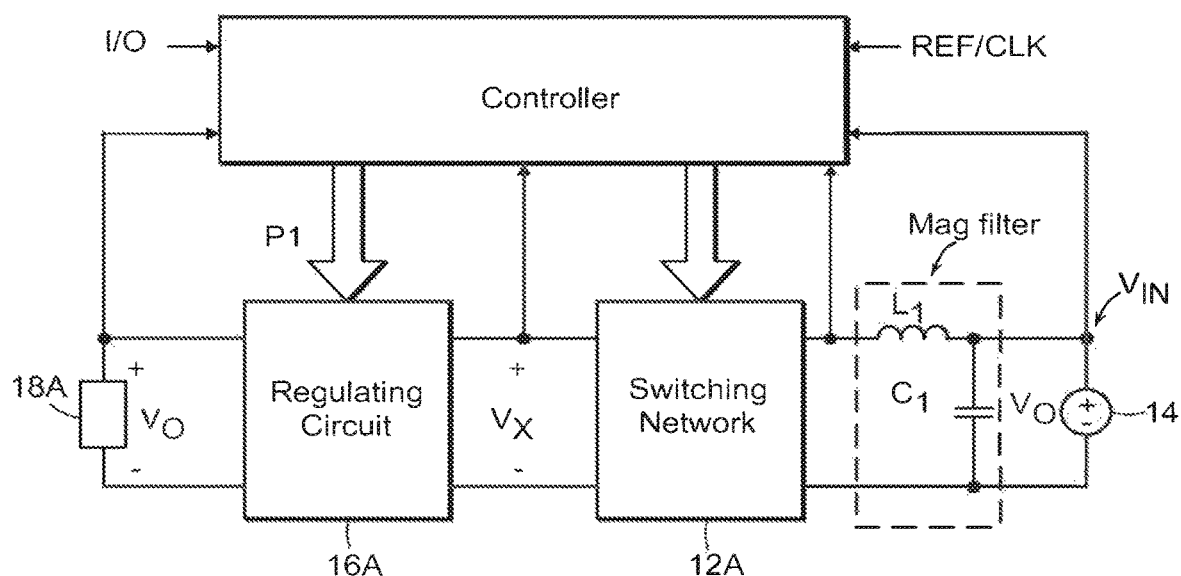
FIG. 24 shows a power converter with a magnetic filter between a switching network and a power source.

In the power converters described thus far, adiabatic charging and discharging of capacitors in the switching network 12A is made possible by an inductor in the regulating network 16A. However, it is possible to separate the function of enabling adiabatic charge transfer and regulation by providing a separate magnetic filter. In FIG. 23, the power converter of FIG. 1 is modified to include a magnetic filter between the load 18A and the switching network 12A. In FIG. 24, the power converter of FIG. 1 is modified to include a magnetic filter between the power source 14 and the switching network 12A.

It is also possible to incorporate a magnetic filter into the power converters shown in FIGS. 5-6. In fact, as the duty

TABLE 3

| $V_{LX}$ | S1 | S2 | S3 | S4 | S5 | S6 | S7 | S8 | S9 | S10 |
|---|---|---|---|---|---|---|---|---|---|---|
| $V_1/V_2$ | 3 | 4 | OFF | OFF | OFF | OFF | ON | ON | OFF | OFF |
| $V_2/V_3$ | OFF | 3 | 4 | OFF | OFF | OFF | OFF | ON | ON | OFF |
| $V_3/V_0$ | OFF | OFF | 3 | 4 | OFF | OFF | OFF | OFF | ON | ON |
| $V_0$/gnd | OFF | OFF | OFF | 3 | 4 | ON | OFF | OFF | OFF | ON |

The disconnect switch S11 is rated to handle the highest voltage. Its function is to disconnect the input from the cycle of the second regulating network 16B shown in FIG. 5 approaches 100%, the second regulating network 16B effectively becomes a magnetic filter. For a regulating network 12A implemented as shown in FIG. 15C, the second regulating network 16B can be transformed into a magnetic filter by permanently closing the first switch S1 and opening the second switch S2.

In some embodiments, the regulating network 16B participates in enabling adiabatic charge transfer even when a magnetic filter is present. For example, the magnetic filter may cause a first capacitor to charge adiabatically while the regulating network 16A causes the same first capacitor to discharge adiabatically, or vice versa.

Figure 25:
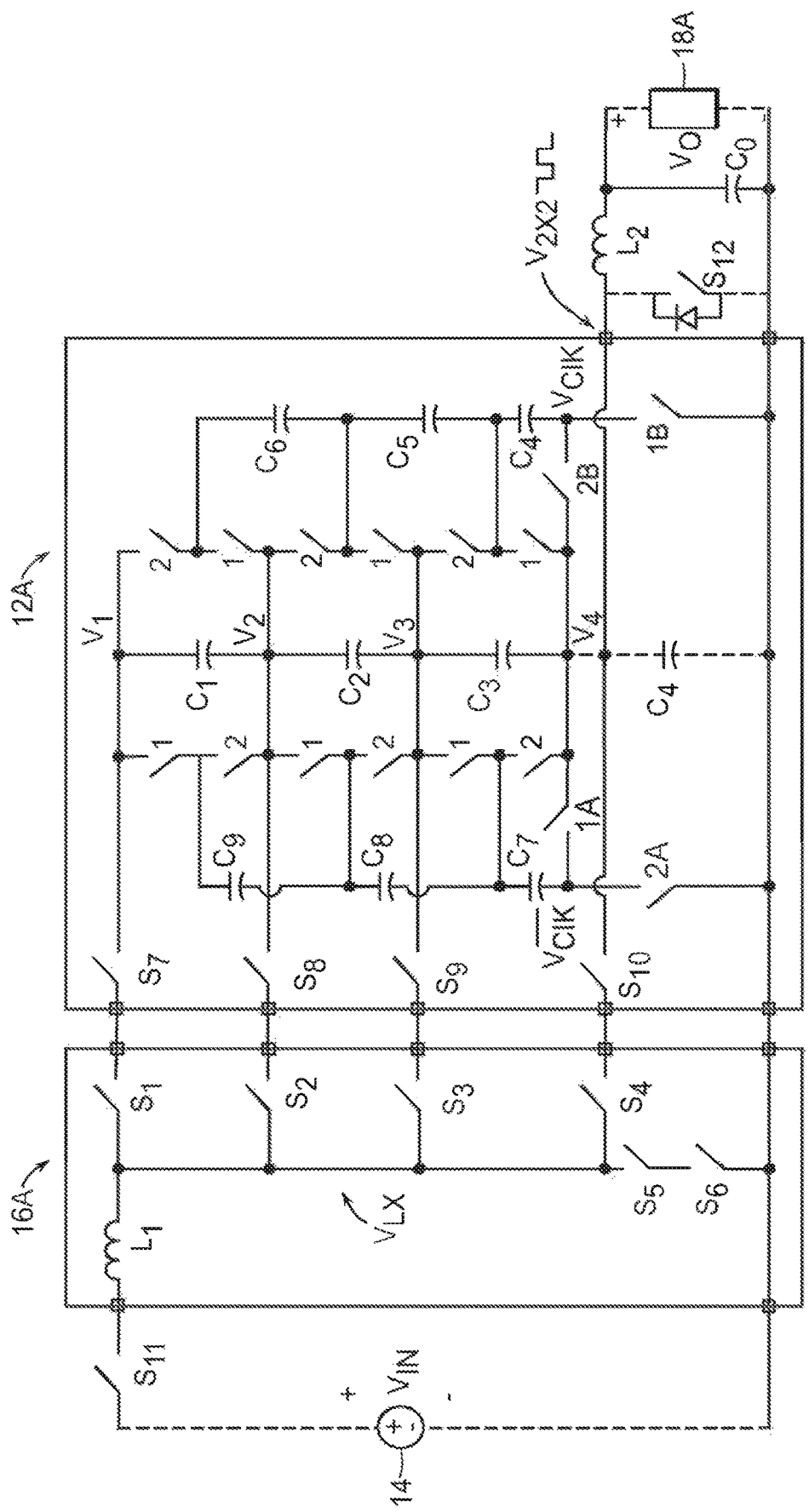
FIG. 25 shows the power converter of FIG. 22 modified to include a magnetic filter between the switching network and the load.

FIG. 25 shows the power converter of FIG. 22 modified to include a magnetic filter between the switching network 12A and the load 18A. The illustrated magnetic filter comprises an inductor L2 and a capacitor C0. As described in FIGS. 23-24, the presence of a magnetic filter provides for adiabatic charging or discharging of capacitors in the switching network 12A. The magnetic filter constrains the flow of current at the output of the switching network 12A thereby reducing the redistribution current among the capacitors in the switching network 12A, and hence loss arising from such redistribution.

The use of a magnetic filter provides another way to span the gap that arises when, in order to meet a voltage requirement, a regulating network 16A would have to operate at a duty cycle outside its permissible range of duty cycles. In embodiments without a magnetic filter, these gaps were filled by using a switch as a linear regulator. However, linear regulators are inefficient.

When a magnetic filter is made available, one can avoid using an inefficient linear regulator to span the gap by chopping the output of the switching network 12A and passing it through the magnetic filter to produce a dc output. In some embodiments, switches in the switching network 12A carry out the chopping. In other embodiments, an additional switch S12 can be added to aid in chopping. Note that elements shown connected with dotted lines are optional. In those embodiments in which a buck-boost converter implements the regulating network 16A, neither a linear regulator nor voltage chopping at the switching network 12A is required.

Table 4 below summarizes operation of two embodiments, one with and one without an additional switch S12. Option 1 of the table shows how the switches in the switching network 12A transition between first and second states to carry out chopping. Option 2 shows how the use of the additional switch S12 effectively adds a third state between the first and second states. A benefit of Option 2 is that it avoids having two series-connected switches conduct, thus reducing losses. In addition, Option 2 provides for a body diode that can conduct when the switching network 12A is transiting between states.

TABLE 4

| State 3 | 1A | 2A | 1B | 2B | 1 | 2 | S12 |
| --- | --- | --- | --- | --- | --- | --- | --- |
| OPTION 1 | ON | ON | ON | ON | OFF | OFF | — |
| OPTION 2 | OFF | OFF | OFF | OFF | OFF | OFF | ON |

Figure 26:
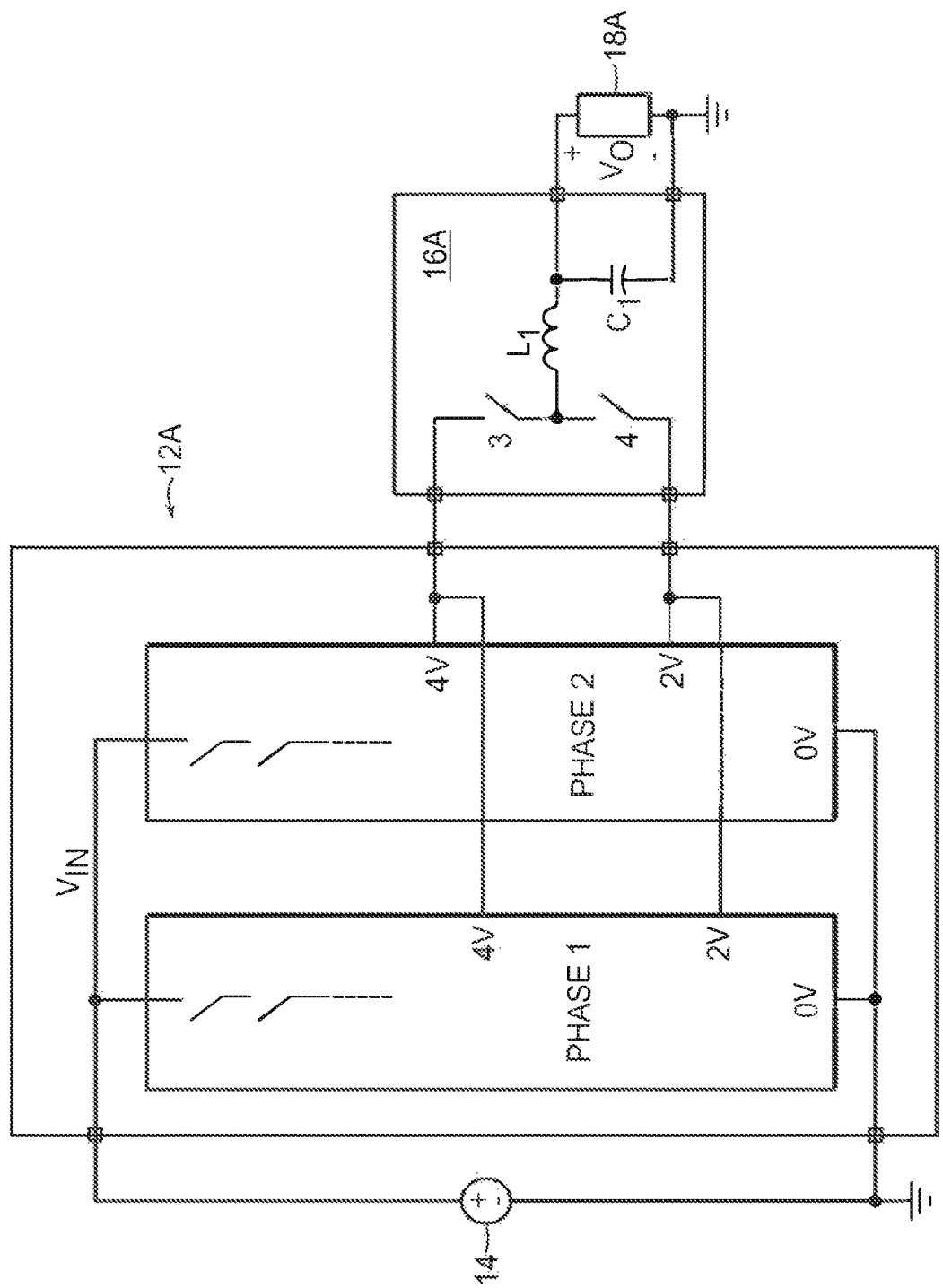
FIG. 26 shows a power converter that uses a two-phase step-down switching network connected in series with a step-down regulating network.

FIG. 26 shows a power converter that uses a two-phase step-down switching network 12A connected in series with a step-down regulating network 16A to limit an output voltage $V_O$ to be between two volts and four volts. The switching network 12A can be of any type. However, a good choice is a cascade multiplier in part because the regulating network 16A will then permit adiabatic charge transfer between capacitors in the switching network 12A. A buck converter having first and second switches 3, 4, an inductor L1, and a capacitor C1 implement the regulating network 16A.

During normal operation the regulating network 16A alternates between a first and second state at a specific frequency and duty cycle, with the duty cycle determining the transformation ratio. During the first state, the first switch 3 closes and the second switch 4 opens. During the first switch 3 opens and the second switch 4 closes.

Figure 27:
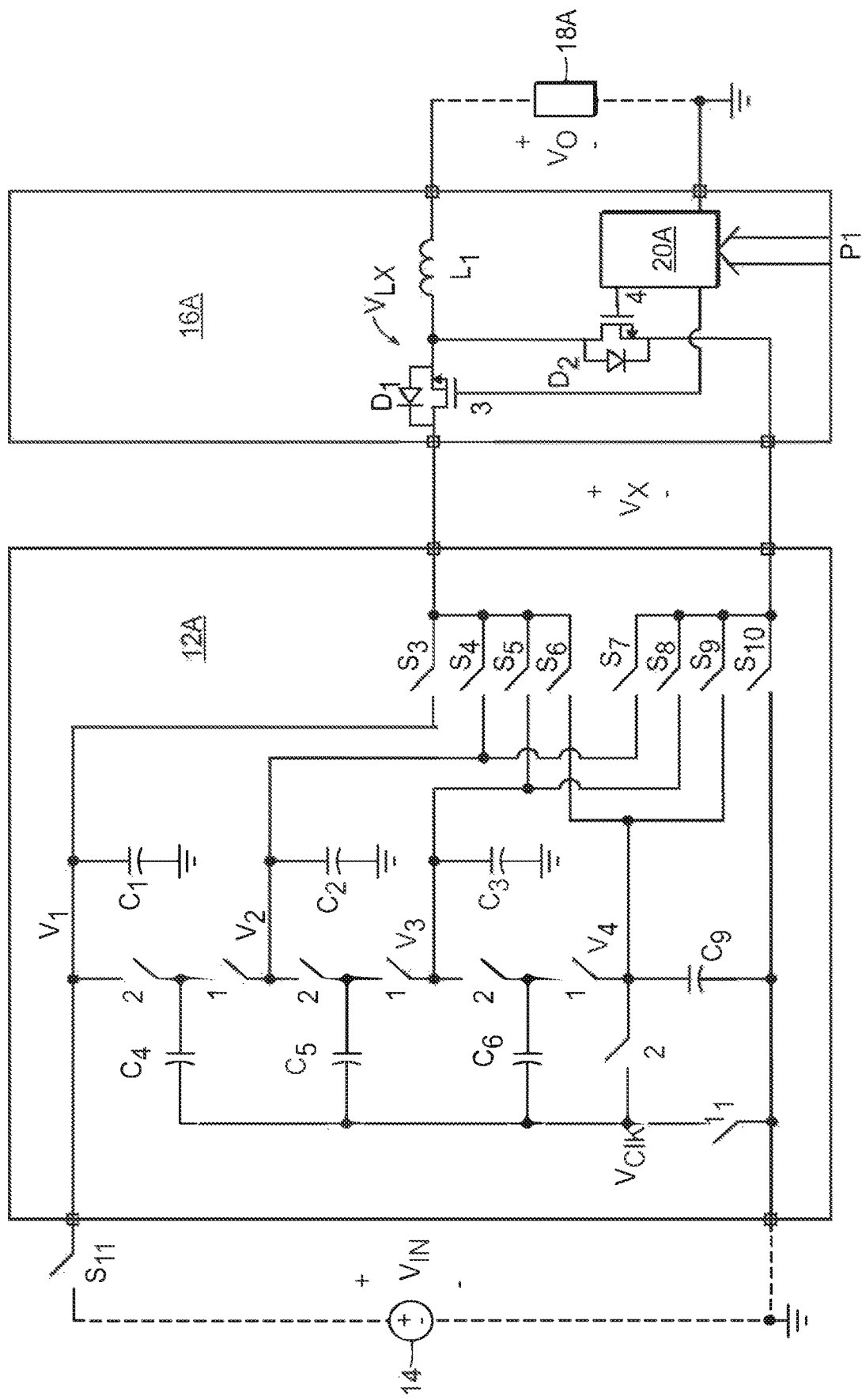
FIG. 27 shows a power converter similar to that shown in FIG. 19 but with the order of the switching network and the regulating network reversed.

FIG. 27 shows a power converter similar to that shown in FIG. 19, but with a wide output voltage $V_O$ range instead of a wide input voltage $V_{IN}$ range. Unlike the power converter in FIG. 19, the power converter of FIG. 27 has a regulating network 16A that causes voltage to step down instead of to step up. In addition, the order of the switching network 12A and the regulating network 16A are opposite to that shown in FIG. 19. The resulting configuration enables adiabatic charge transfer between at least some capacitors in the switching network 12A.

Operation of the power converter in FIG. 27 proceeds along the lines set forth in connection with FIG. 19. In particular, a controller controls the switches according to the timing pattern in Table 2.

Figure 28:
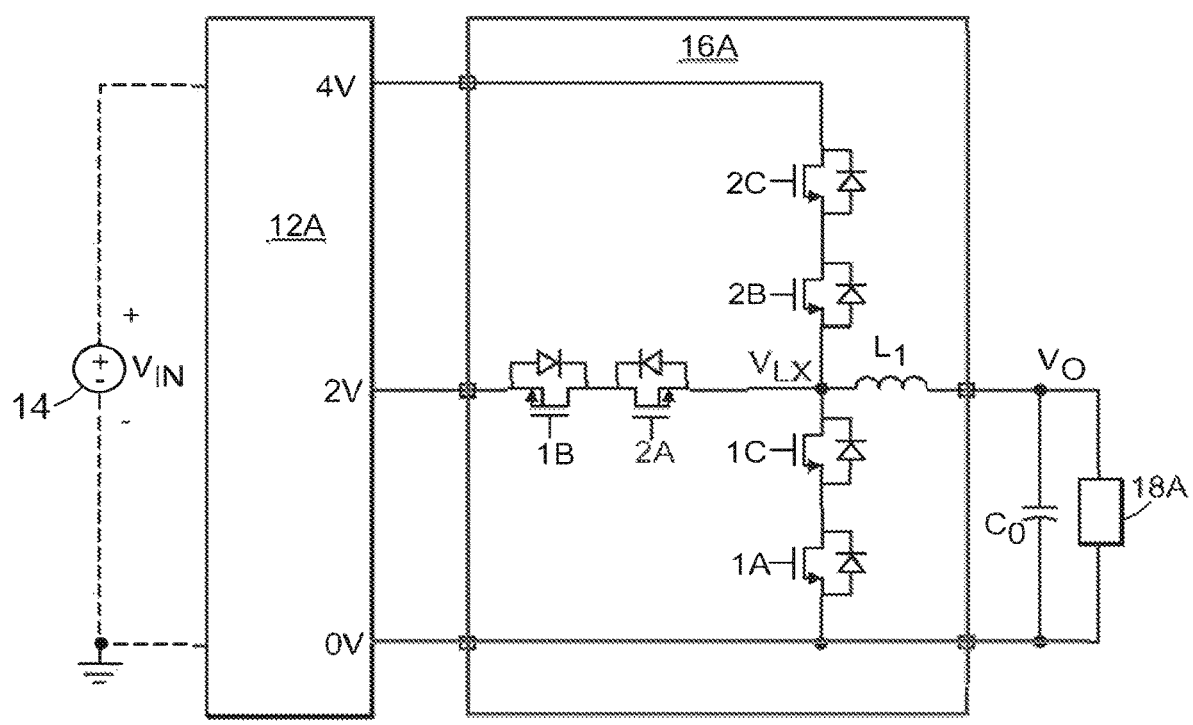
FIG. 28 shows a power converter in which the regulating network is a buck converter with multiple taps.

Another way to obtain a wide voltage range is to use a step-down switching network 12A and to implement the regulating network 16A with a buck converter with multiple taps, as shown in FIG. 28. The switching network 12A takes an input voltage $V_{IN}$ and provides two voltage rails: a first rail at two volts and a second rail at four volts. The buck converter features two modes of operation: a first mode in which the LX signal $V_{LX}$ alternates between zero volts and two volts during a switching cycle, and a second mode in which the LX signal $V_{LE}$ alternates between two volts and four volts in a switching cycle. The timing pattern for the switches is set forth in Table 5, with switches labeled "ON" being closed during the complete switching cycle and the switches labeled "OFF" being open during the complete switching cycle.

TABLE 5

| $V_{LX}$ | 1A | 2A | 1B | 2B | 1C | 2C |
| --- | --- | --- | --- | --- | --- | --- |
| 0 V/2 V | 3 | 4 | ON | OFF | ON | OFF |
| 2 V/4 V | ON | OFF | 3 | 4 | OFF | ON |

An advantage of the power converter shown in FIG. 28 is that each switch only has to support two volts. In addition, the switches are configured to avoid the need for body-snatcher circuitry. Switches 1B and 2A in particular have body diodes that point to each other and therefore block voltages with any polarity.

To obtain an even wider output range than that given by the power converter shown in FIG. 28, though at the cost of more switches, one can implement the regulating network 16A with a buck converter having three, rather than two, modes of operation. Otherwise, operation is similar to that described in connection with FIG. 28.

Figure 29:
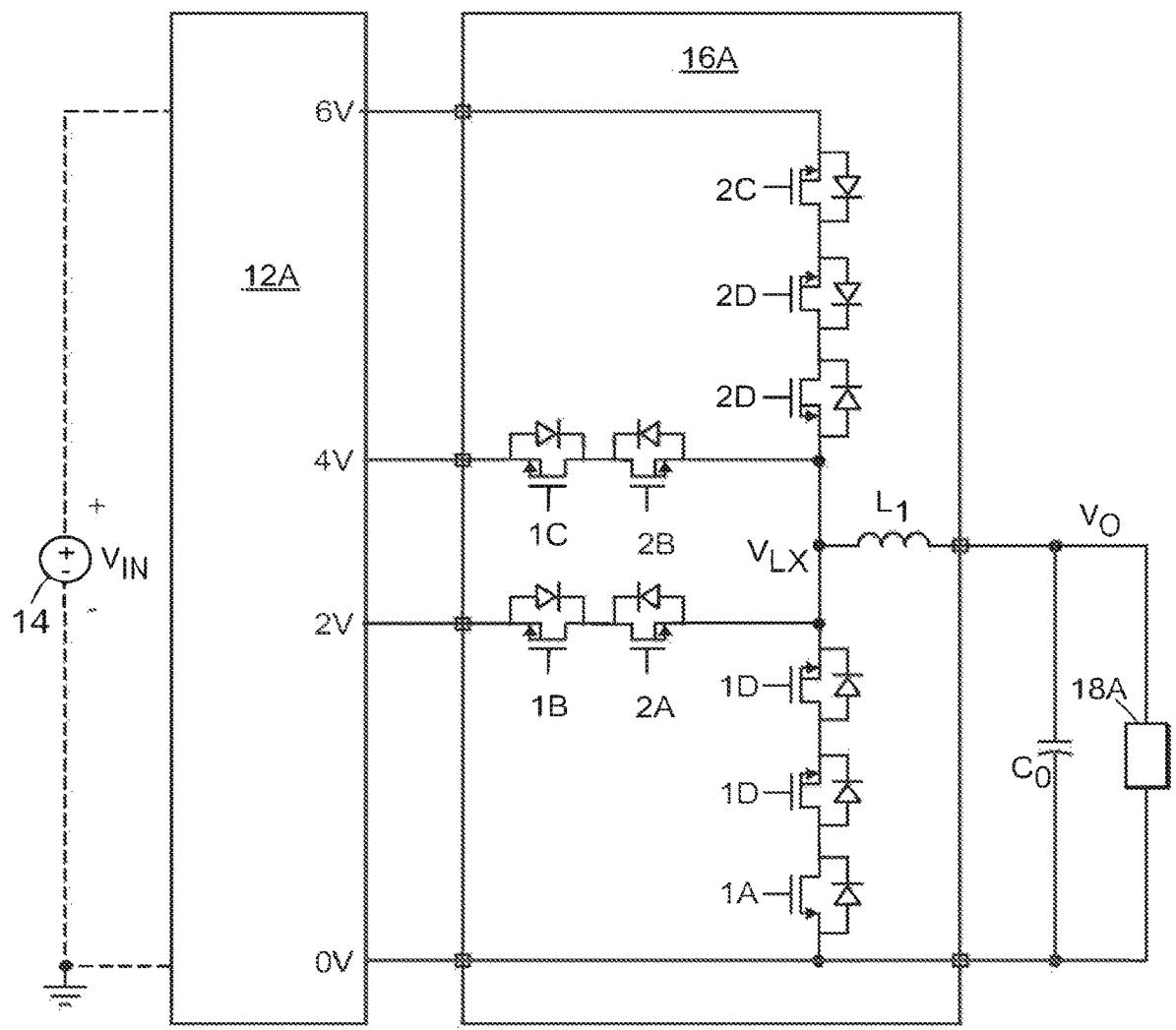
FIG. 29 shows a power converter similar to that shown in FIG. 28, but with the buck converter having four instead of three taps.

In FIG. 29, the switching network 12A maintains three voltage rails at two volts, four volts, and six volts, respectively. In the first operating modes, the LX signal $V_{LX}$ alternates between zero volts and two volts during a switching cycle. In the second operating mode, the LX signal $V_{LX}$ alternates between two volts and four volts during a switching cycle. In the third operating mode, the LX signal $V_{LX}$ alternates between four volts and six volts during a switching cycle.

The timing diagram for the three operating modes is shown in Table 6:

TABLE 6

| $V_{LX}$ | 1A | 2A | 1B | 2B | 1C | 2C | 1D | 2D |
|---|---|---|---|---|---|---|---|---|
| 0 V/2 V | 3 | 4 | ON | OFF | OFF | OFF | ON | OFF |
| 2 V/4 V | ON | OFF | 3 | 4 | ON | OFF | OFF | OFF |
| 4 V/6 V | OFF | OFF | OFF | ON | 3 | 4 | OFF | ON |

Switches labeled "ON" in Table 6 are closed during the complete switching cycle. Switches labeled "OFF" are open during the complete switching cycle. As is apparent, each switch only has to support at most two volts. In addition, the switches are properly configured such that body snatcher circuits are not required. In particular, switch pair 1B, 2A and switch pair 1C, 2B show two body diodes pointing at each other. These switch pairs can therefore block voltages of any polarity.

Figure 30:
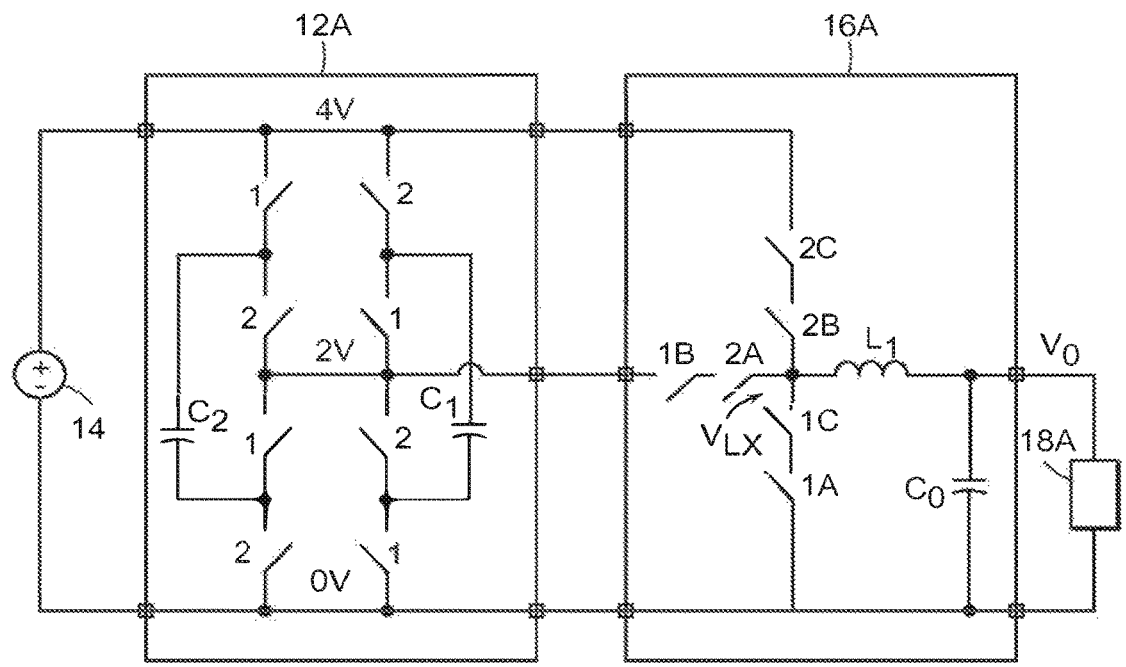
FIG. 30 shows the power converter of FIG. 26 with a two-phase switched-capacitor circuit implementing the switching network and a buck converter implementing the regulating network.

FIG. 30 shows the power converter of FIG. 26 with a two-phase switched-capacitor circuit implementing the switching network 12A and a buck converter implementing the regulating network 16A.

The buck converter, which has two modes of operation, alternates between the switch configurations shown in Table 5. In the first mode, the LX signal $V_{LX}$ alternates between zero volts and two volts during a switching cycle. In the second mode, the LX signal $V_{LX}$ alternates between two volts and four volts during a switching cycle. The switches labeled "ON" are closed during the complete switching cycle and the switches labeled "OFF" are open during the complete switching cycle. Each switch only needs to be able support two volts. During normal operation the switching network 12A alternates between the first and second states at a specific frequency and duty cycle. In some embodiments, the duty cycle is 50%.

Figure 31:
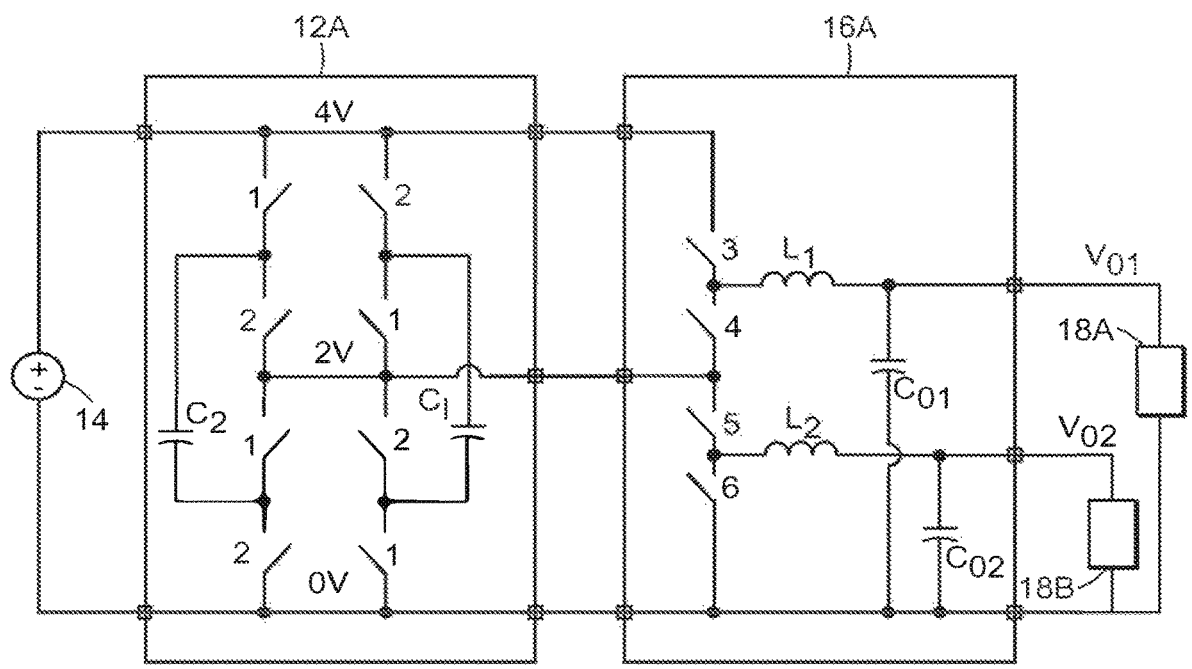
FIG. 31 shows a power converter with two voltage outputs.

FIG. 31 shows a power converter with first and second regulators in parallel. This provides first and second outputs. In the particular example shown, the first output $V_{O1}$ is between four volts and two volts while the second output $V_{O2}$ is between two volts and zero volts.

The first regulator includes first and second switches 3, 4 and a first inductor L1. The second regulator includes third and fourth switches 5, 6 and a second inductor L2.

During normal operation the first regulator alternates between a first and second state at a specific frequency and duty cycle. This duty cycle determines the transformation ratio. During the first state, the first switch 3 is closed and the second switch 4 is opened. During the second state, the states are reversed. The second regulator works in the same way with the third switch 5 replacing the first switch 3 and the fourth switch 6 replacing the second switch 4. The switching network 12A, the first regulator, and the second regulator can operate at the same or difference frequency and with any phase difference between them.

Figure 32:
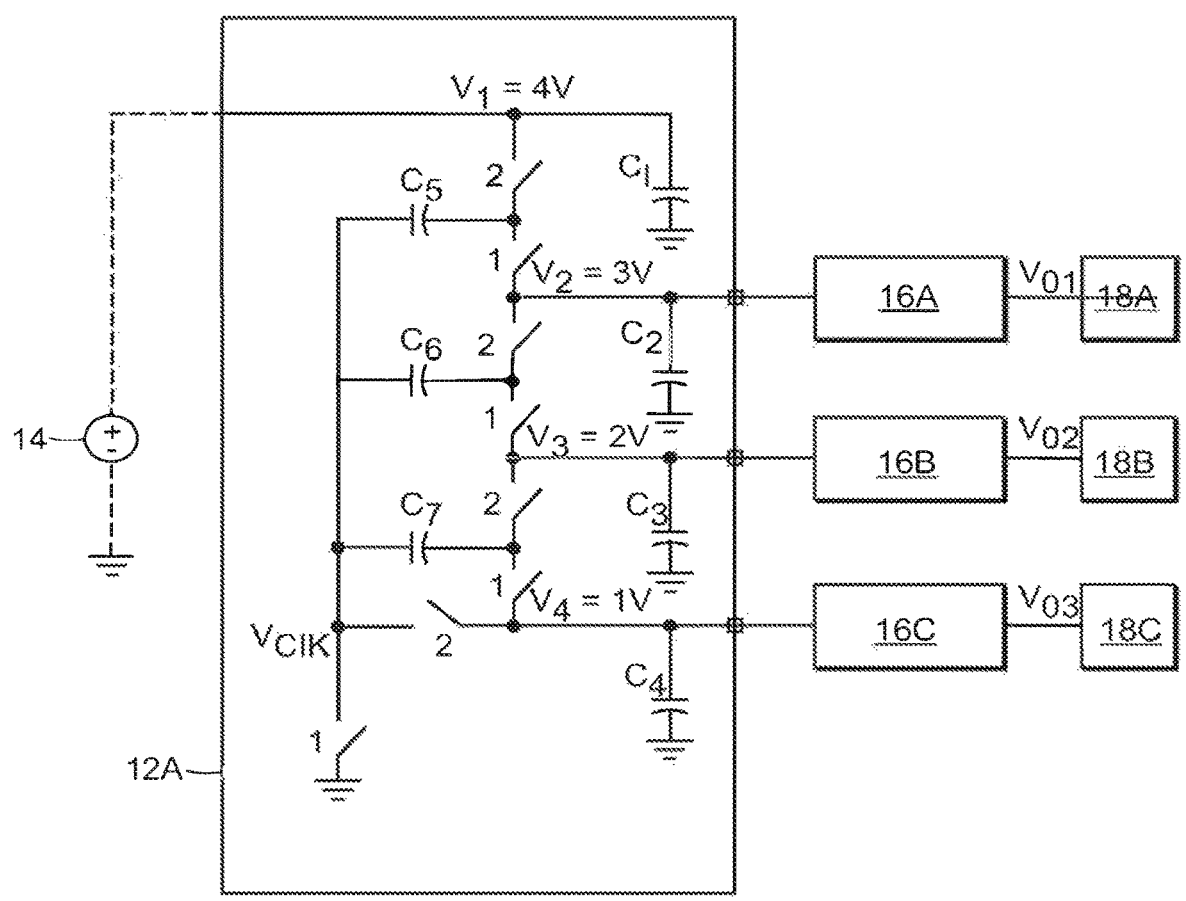
FIG. 32 shows a power converter with three voltage outputs.

FIG. 32 shows another embodiment with multiple output voltages. In this case, there are three regulating networks 16A, 16B, 16C corresponding to three output voltages, $V_{O1}$, $V_{O2}$, and $V_{O3}$. Unlike the power converter shown in FIG. 31, these voltages are less limited on the bottom end.

Figure 33:
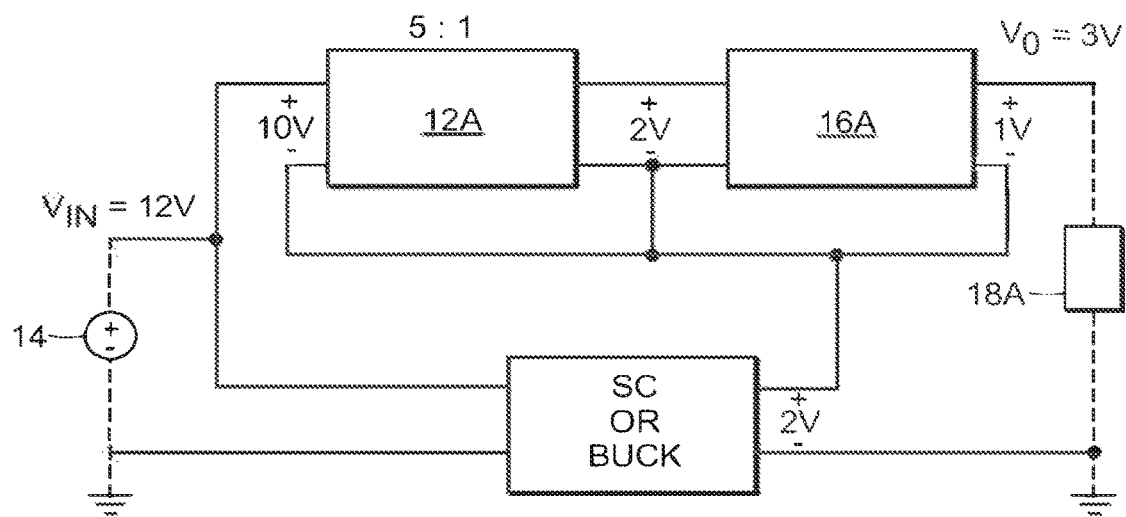
FIG. 33 shows a power converter floating above ground.

FIG. 33 shows a power converter in which a switching network 12A in series with a regulating network 16A are floated above ground. The voltage upon which the switching network 12A and regulating network 16A float comes from a third stage. This third stage can be implemented using a switch-mode power converter such as a buck converter or switched-capacitor converter such as a cascade multiplier, or any other type of power converter. The resulting series connected stages to provide a higher output voltage than they normally would be able to. Example voltages are provided in the figure. In particular, in FIG. 33, the third stage produces a two-volt rail. This effectively boosts the output voltage $V_O$ by two volts.

An advantage of the configuration shown in FIG. 33 is that only low voltages have to be applied across the terminals of the regulating network 16A. Thus, only low-voltage transistors are needed. These switch very fast. As a result, one can reduce the size of the inductor.

FIGS. 34-44 show additional embodiments with particular features to be described below. With the exception of a brief dead-time between transitions, during which all switches are open to avoid difficulties that arise from the finite switching time of a real switch, all switches in switch set 1 and switch set 2 are always in opposite states, all switches in switch set 3 and switch set 4 are always in opposite states, and all switches in switch set 5 and switch set 6 are always in opposite states.

Figure 34:
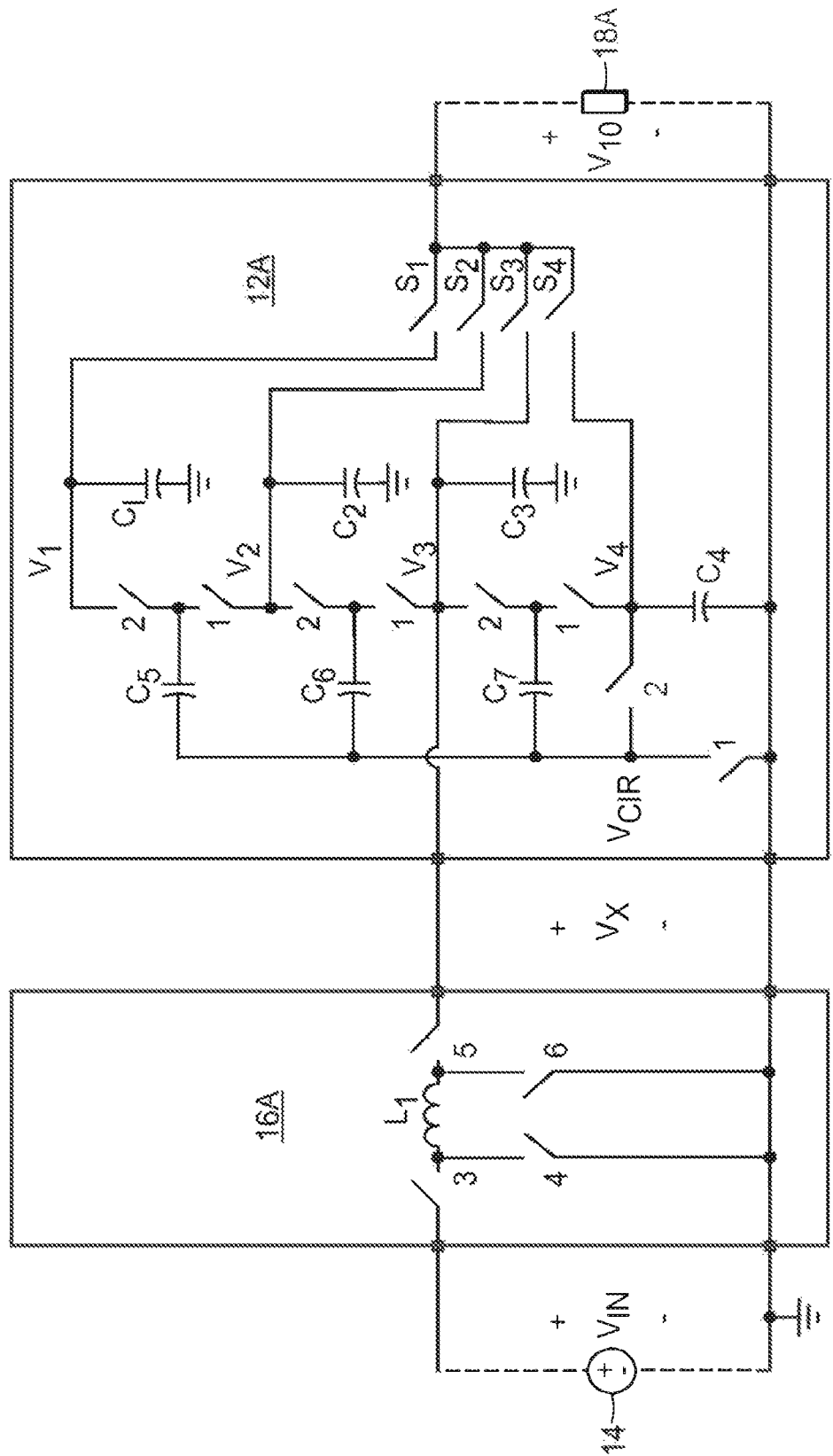
FIG. 34 is an embodiment in which a 4-switch buck-boost converter implements the regulating network and a reconfigurable single-phase asymmetric cascade multiplier implements the switching network.

FIG. 34 shows an embodiment in which a 4-switch buck-boost converter implements the regulating network 16A and a reconfigurable single-phase asymmetric cascade multiplier implements the switching network 12A. In this power converter, the regulating network 16A connects to the middle of the cascade multiplier within the switching network 12A thereby enabling the switching network 12A to cause voltage to either step-up or step-down.

The regulating network 16A includes an inductor L1, a first switch 3, a second switch 4, a third switch 5, and a fourth switch 6.

When the regulating network 16A operates in its boost mode, the intermediate voltage $V_X$ is higher than the input voltage $V_{IN}$. In this mode, the third switch 5 and the fourth switch 6 are active, the first switch 3 is closed, and the second switch 4 is open.

Conversely, when the regulating network 16A operates in its buck mode, the intermediate voltage $V_X$ is lower than the input voltage $V_{IN}$. In this mode, the first switch 3 and the second switch 4 are active, the third switch 5 is closed, and the fourth switch 6 is open.

Meanwhile, the switching network 12A includes first and second switch sets 1, 2, four selection switches S1-S4, four dc capacitors C1-C4, and three pump capacitors C5-C7. The voltages on the four dc capacitors C1-C4 are $4/2V_X$, $3/2V_X$, $2/2V_X$, and $1/2V_X$, respectively.

In operation, the four selection switches S1-S4 select different dc capacitors C1-C4 within the switching network 12A for presentation to the load 18A. By properly choreographing the enabling and disabling of the selection switches S1-S4 according to a distinct pattern, one can produce an ac output with a dc offset. This is particularly useful for envelope tracking when providing power to an RF power amplifier.

Figure 35:
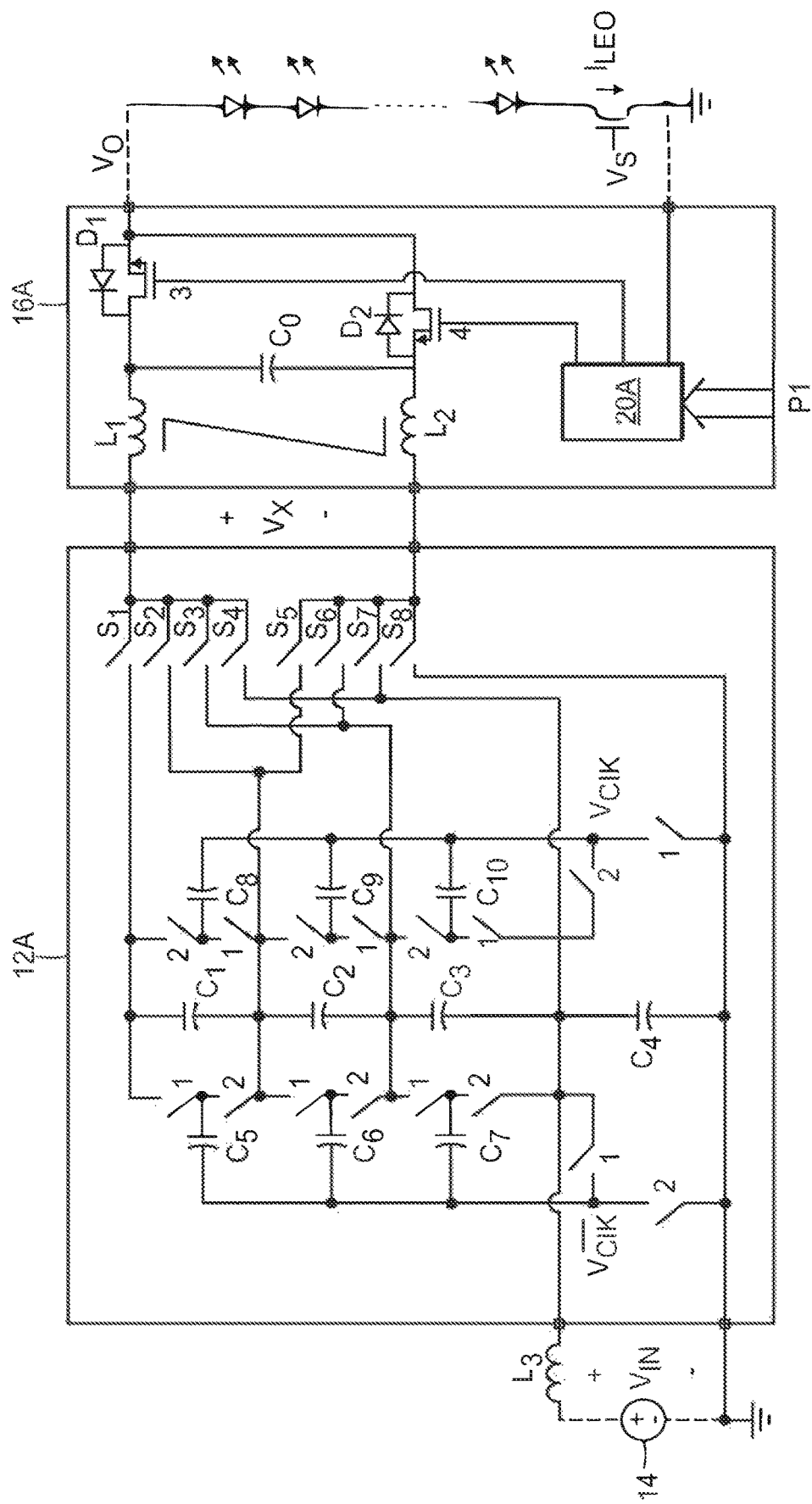
FIG. 35 is a particular embodiment of the power converter in FIG. 2 in which a dual-inductor buck converter implements the regulating network and a reconfigurable dual-phase asymmetric step-up cascade multiplier implements the switching network.

FIG. 35 illustrates a variation on the embodiment of FIG. 2 in which a dual-inductor buck converter implements the regulating network 16A and a reconfigurable dual-phase asymmetric step-up cascade multiplier implements the switching network 12A.

The regulating network 16A is a dual-inductor buck converter (shown as configuration "C1" in the table in the appendix) having a first inductor L1, a second inductor L2, a first capacitor C0, a first switch 3, and a second switch 4.

In some embodiments, the first and second inductors L1, L2 are uncoupled. In others, the first and second inductors L1, L2 are coupled. These include embodiments that use both positive and negative coupling.

Unlike in a single-inductor buck converter, the input current into the dual-inductor converter is relatively constant. This results in lower rms current through the switching network 12A. Both terminals connected to the switching network 12A draw a relatively constant current. Because of this behavior, and because a pump capacitor would always be available to feed each inductor, the dual-inductor buck converter is best used with a full-wave cascade multiplier. It is also possible to use a half-wave cascade multiplier. However, in that case, the pump capacitors would only be feeding the inductors half the time. This requires providing high capacitance dc capacitors.

The switching network 12A includes first and second switch sets 1, 2, eight selection switches S1-S8, four dc capacitors C1-C4, and six pump capacitors C5-C10.

A third inductor L3 that feeds the switching network 12A promotes adiabatic charge transfer within the switching network 12A. Because it is only filtering a voltage ripple on the capacitors seen at the input of the switching network 12A, and because it does not have a particularly large voltage across it, this third inductor L3 has a much smaller inductance than those required within the regulating network 16A.

Enabling and disabling different selection switches S1-S8 reconfigures the switching network 12A, thus enabling one to change the offset voltage $V_{off}$ of the switching network 12A. Table 7 shows switching patterns used to achieve four different offset voltages.

TABLE 7

| $V_{off}$ | S1 | S2 | S3 | S4 | S5 | S6 | S7 | S8 |
|---|---|---|---|---|---|---|---|---|
| 3 $V_4$ | ON | OFF | OFF | OFF | ON | OFF | OFF | OFF |
| 2 $V_4$ | OFF | ON | OFF | OFF | OFF | ON | OFF | OFF |
| 1 $V_4$ | OFF | OFF | ON | OFF | OFF | OFF | ON | OFF |
| 0 V | OFF | OFF | OFF | ON | OFF | OFF | OFF | ON |

In the particular example shown, the load connected to the output of the power converter comprises a plurality of light-emitting diodes connected in series with each other and with the current path through a transistor biased by a voltage $V_B$. This permits control over the LED current, thus enabling the brightness of the LED, which is proportional to the LED current $I_{LED}$, to be controlled. The combination of a power converter and a circuit to control the LED current $I_{LED}$, which amounts to a current sink, is commonly called an LED driver. In most embodiments, the current sink is somewhat more complicated than a single transistor. However, the principles illustrated in FIG. 35 are applicable to such cases as well.

Instead of using a linear regulator to fill the gaps as discussed in reference to FIG. 19, a current sink along the lines shown in FIG. 35 can be used. However, this is also a somewhat inefficient method.

Figure 36:
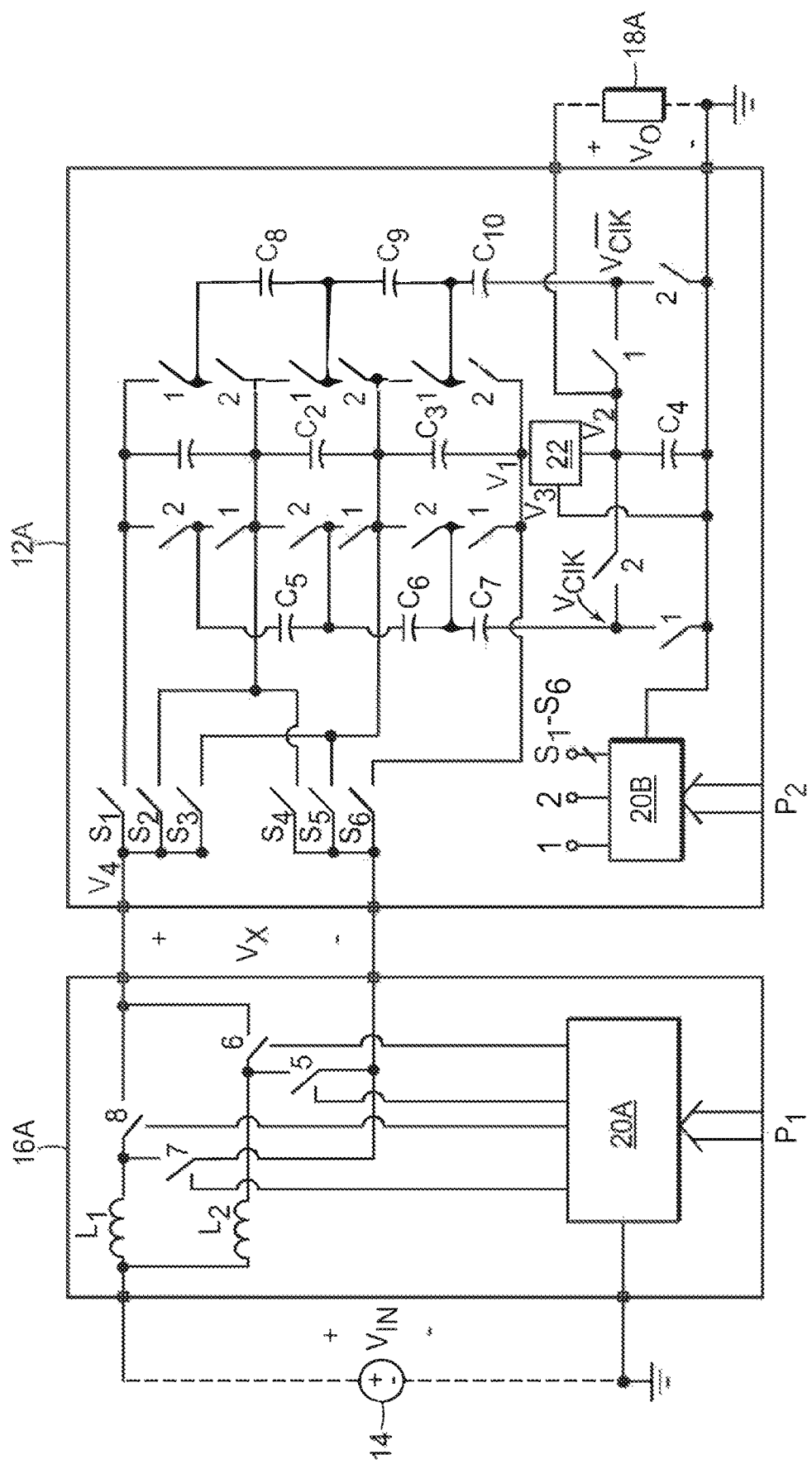
FIG. 36 shows an implementation of a power converter in which the switching network has a separate charge pump embedded within a cascade multiplier.

In another embodiment of the power converter of FIG. 1, which is shown in FIG. 36, a two-phase boost converter implements the regulating network 16A while a reconfigurable dual-phase asymmetric step-down cascade multiplier implements the switching network 12A. The particular cascade multiplier shown features an embedded reconfigurable fractional charge pump 22.

The two-phase boost converter includes a first inductor L1, a second inductor L2, a first switch 5, a second switch 6, a third switch 7 and a fourth switch 8. A circuit 20A within the regulating network 16A receives control signals from a controller via a first path P1. During normal operation, the circuit 20A provides first drive signals provided to the first and second switches 5, 6 and second drive signals to the third and fourth switches 7, 8. The first and second drive signals are in phase quadrature. Controlling the duty cycle of at which the switches 4-8 switch regulates the output voltage $V_O$.

The switching network 12A includes six selection switches S1-S6, six pump capacitors C5-C10, four dc capacitors C1-C4, first and second switch sets 1, 2, and a circuit 20B that provides drive signals to the first and second switch sets 1, 2 and to the six selection switches S1-S6 based on control signals received along a path P2 from the controller.

The reconfigurable fractional charge pump 22 has multiple modes. In the particular example described herein, the modes are a 1:1 mode and a 3:2 mode.

The reconfigurable fractional charge pump 22 enables the parent cascade multiplier in which it is embedded to output half ratios. Table 8 shows the available transformation ratios $(V_4:V_O)$ for the parent cascade multiplier, and both the switch states and the transformation ratio of the embedded reconfigurable fractional charge pump 22 that would be required to achieve those transformation ratios.

TABLE 8

| $V_4:V_0$ | S1 | S2 | S3 | S4 | S5 | S6 | 22 |
|---|---|---|---|---|---|---|---|
| 4.5:1.0 | ON | OFF | OFF | ON | OFF | OFF | 3:2 |
| 4.0:1.0 | ON | OFF | OFF | ON | OFF | OFF | 1:1 |
| 3.5:1.0 | OFF | ON | OFF | OFF | ON | OFF | 3:2 |
| 3.0:1.0 | OFF | ON | OFF | OFF | ON | OFF | 1:1 |
| 2.5:1.0 | OFF | OFF | ON | OFF | OFF | ON | 3:2 |
| 2.0:1.0 | OFF | OFF | ON | OFF | OFF | ON | 1:1 |

A particular benefit of providing half ratios is that the resulting power converter operates without the gaps described in connection with FIG. 36.

For example, suppose that the output voltage $V_O$ is one volt and that the input voltage $V_{IN}$ is 3.5 volts. The transformation ratio is 4:1. This requires a duty cycle of 50%, which is well within the permissible range for the regulating circuit (i.e., the dual-phase boost converter).

Suppose now that the input voltage $V_{IN}$, drops to 3.05 volts. At this point, the required duty cycle at the regulating circuit would drop to 5%, which is below the acceptable limit. Ordinarily, this would result in a gap. But not for the circuit shown in FIG. 36. This is because one only has to switch to a 3.5:1 transformation ratio. This raises the required duty cycle back up to 65%, which puts it back within the permissible range of the regulating circuit.

In addition, to eliminating gaps, the ability to provide half ratios enables the regulating circuit to run with a duty cycle between 25% and 75%. This has many benefits, including reducing the rms current and thus boosting the efficiency.

Figure 37:
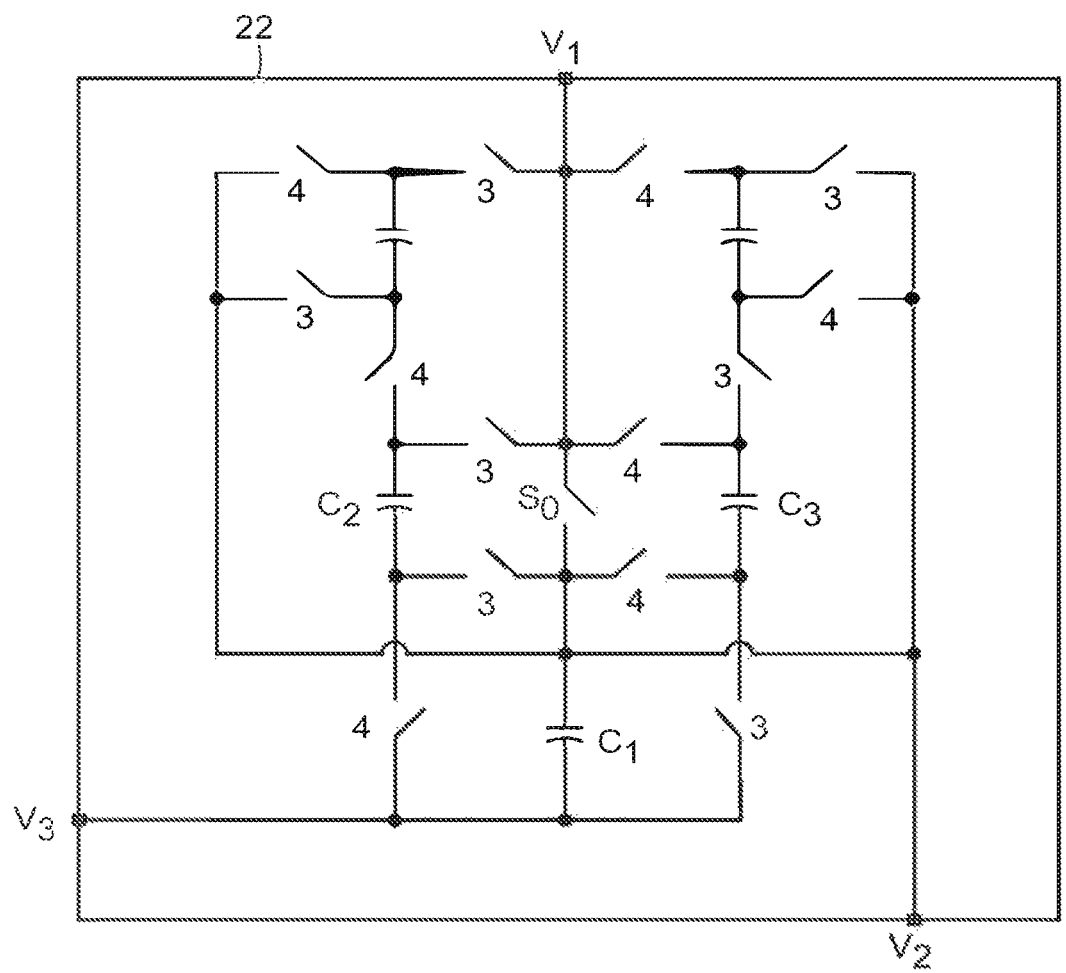
FIG. 37 shows the embedded charge pump of FIG. 36.

FIG. 37 shows details of the reconfigurable fractional charge pump 22 shown in FIG. 36. The reconfigurable charge pump 22 includes a first switch set 3, a second switch set 4, a selection switch S0, a dc capacitor C1, and first and second pump capacitors C2, C3. The reconfigurable fractional charge pump 22 is connected to have an input voltage $V_1$, an output voltage $V_2$, and a ground $V_3$.

The reconfigurable fractional charge pump 22 operates in either a first mode or a second mode. When operating in the first mode, the reconfigurable fractional charge pump 22 provides a transformation ratio $V_1:V_2$ of 3:2. When operating in the second mode, the transformation ratio is 1:1.

To operate in the first mode, the selection switch S0 opens, and the first and second switch sets 3, 4 switch open and close at some specific frequency. In some embodiments, the switches open and close with a 50% duty cycle. The first switch set 3 and the second switch set 4 are always in opposite states.

To operate in the second mode, the selection switch S0 closes, and the first and second switch sets 3, 4 open.

Figure 38:
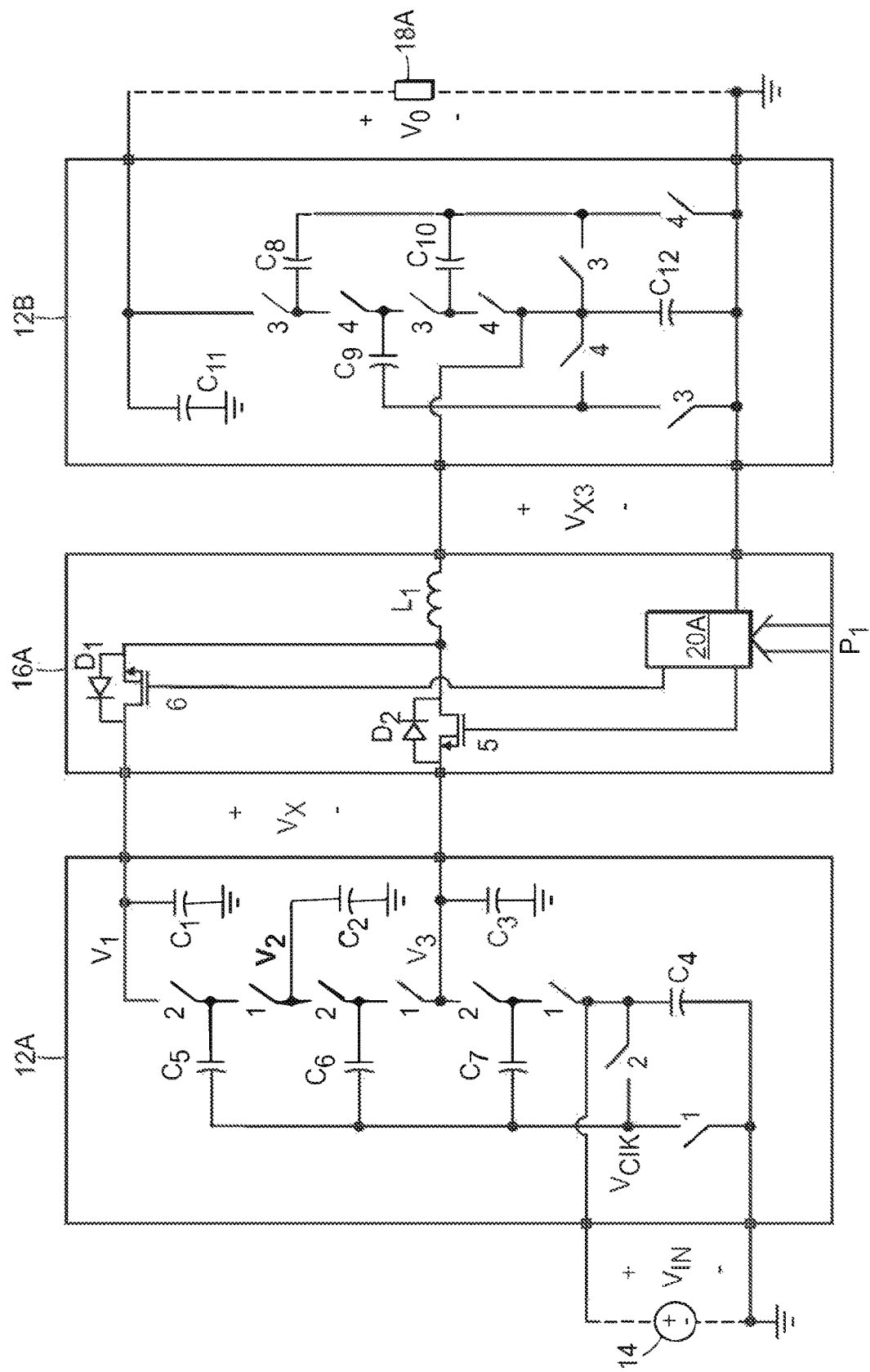
FIG. 38 shows the power converter of FIG. 6 in which a buck converter implements the regulating circuit, a single-phase asymmetric step-up cascade multiplier implements the first switching network, and a single-phase symmetric step-up cascade multiplier implements the second switching network.
Figure 39:
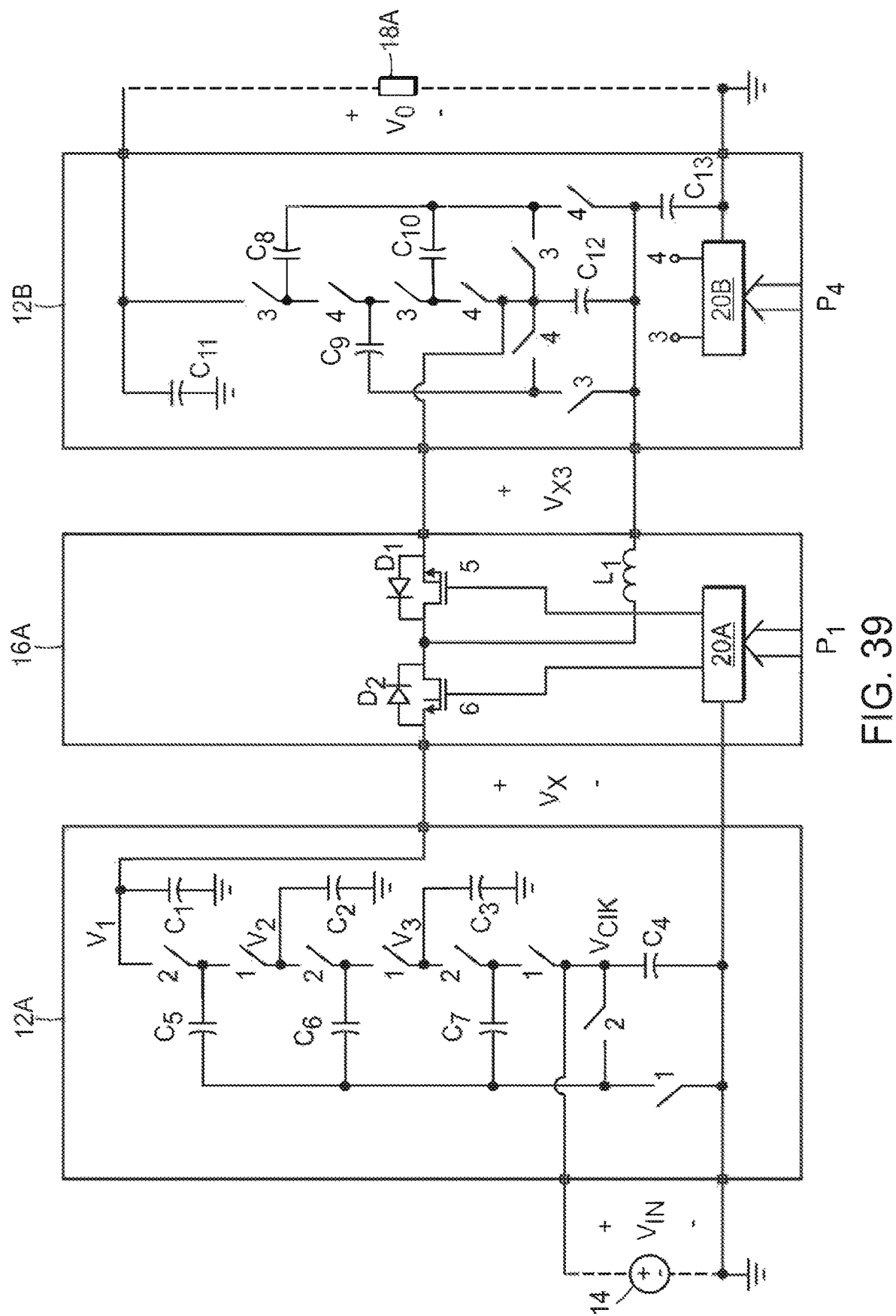
FIG. 39 shows the power converter of FIG. 38 in which the buck converter is replaced with a buck-boost converter.

FIGS. 38-39 show alternative embodiments of the power converter shown in FIG. 6 in which a regulating network 16A is between first and second switching networks 12A, 12B. This configuration enables at least one switching network 12A, 12B to be adiabatically charged. In addition, the overall transformation ratio becomes the product of the transformation ratios of the first and second switching networks 12A, 12B.

In the embodiment shown in FIG. 38, a buck converter implements the regulating network 16A, a single-phase asymmetric step-up cascade multiplier implements the first switching network 16A, and a single-phase symmetric step-up cascade multiplier implements the second switching network 16B.

The first switching network 12A includes four dc capacitors C1-C4, three pump capacitors C5-C7, and first and second switches 1, 2. In the configuration shown, the first switching network 12A is not adiabatically charged. Hence, it operates with a duty cycle of near 50%. However this is not required because stability is not an issue. In operation, the first switching network 12A provides a first voltage $V_1$ that is four times the input voltage $V_{IN}$. However, the intermediate voltage $V_X$ that the regulating network 16A receives from the first switching network 12A is twice the input voltage $V_{IN}$.

The regulating network 16A includes a first switch 5, a second switch 6, and an inductor L1. The regulating network 16A controls the duty cycle of the first and second switches 5, 6 to regulate its output voltage $V_O$.

The second switching network 12B includes first and second switch sets 3, 4, two dc capacitors C11-C12, and three pump capacitors C8-C10. Unlike the first switching network 12A, there is an inductor L1 that feeds the second switching network 12B. As a result, the second switching network 12B is adiabatically charged.

A dc capacitor C12 connected at the output of the regulating network 16A impedes adiabatic operation and is thus optional. This dc capacitor C12 is typically added only to maintain stability. As a result, its capacitance is much smaller than that of other capacitors in the network.

Since the second switching network 12B is adiabatically charged and its transformation ratio is 1:4, operating it at a duty cycle of 50% promotes stability. The overall output voltage $V_O$ of the power converter is given by $V_O=8V_{IN}(D+1)$, where the duty cycle D is equal to the duty cycle D of the second switch 6 of the regulating network 16A.

FIG. 39 shows a power converter similar to that shown in FIG. 38, except that a buck-boost converter implements the regulating network 16A and that the first and second switching networks 12A, 12B connect to the regulating network 16A differently. The result is a different input-to-output transfer function.

The regulating network 16A includes an inductor L1, a first switch 5, and a second switch 6.

The first and second switching networks 12A, 12B are the same as those shown in FIG. 38. As was the case in FIG. 38, the second switching network 12B is adiabatically charged, albeit from a different node. The second switching network 12B includes first and second dc capacitors C12, C13 that connect to an output of the regulating network 16A. These capacitors impede adiabatic operation, and are thus optional. However, they are often useful for maintaining stability. Preferably, the values of their capacitances are much smaller than those used in other capacitors within the first and second switching networks 12A, 12B.

The differences between the power converter in FIG. 39 and that in FIG. 38 enable the power converter shown in FIG. 39 to have an output voltage $V_O$ that is either positive or negative. Specifically, for a given duty cycle D, of the regulating network's second switch 6, the output voltage $V_O$ is given by where $V_O=V_{IN}(2D)/(2D-1)$. Thus, the output voltage $V_O$ is positive when the duty cycle D exceeds 0.5 and negative when the duty cycle D falls short of 0.5.

FIGS. 40-43 show embodiments of the power converter shown in FIG. 5. Each embodiment features a first regulating network 16A and a second regulating network 16B. In each embodiment, controlling the duty cycle D of the switches in both the first and second regulating networks 16A, 16B permits control over the output voltage $V_O$ of the power converter. Additionally, in each embodiment, an inductor present in the regulating network 16A permits adiabatic charge transfer between capacitors in the switching network 12A. The extent of this adiabatic charge transfer is one of the differences among the different configurations shown in FIGS. 40-43.

In the embodiments shown, the first regulating network 16A is implemented as a step-up converter while the second regulating network 16B is implemented as a step-down converter. However, this does not have to be the case. For example, the order could be reversed, with the first regulating network 16A causing a step-down in voltage, and the second regulating network 16B causing a step-up in voltage. Or, both the first and second regulating networks 16A, 16B could cause a step-up or a step-down in voltage. An advantage of the particular configuration shown in the figures is that if the switching network 12A were a reconfigurable switching network, such as that shown in FIG. 19, the illustrated configuration would permit filling-in the gaps in coverage.

The illustrated embodiments feature a controller to control operation of switches in the first and second regulating networks 16A, 16B. Such a controller can be used to implement a variety of control techniques that can be used in connection with controlling the operation of the first and second regulating networks 16A, 16B. In some embodiments, the controller implements feed-forward control over the first regulating network 16A and feedback control over the second regulating network 16B. In other embodiments, the controller implements feedback over the first regulating network 16A and feed-forward control over the second regulating network 16B.

Figure 40:
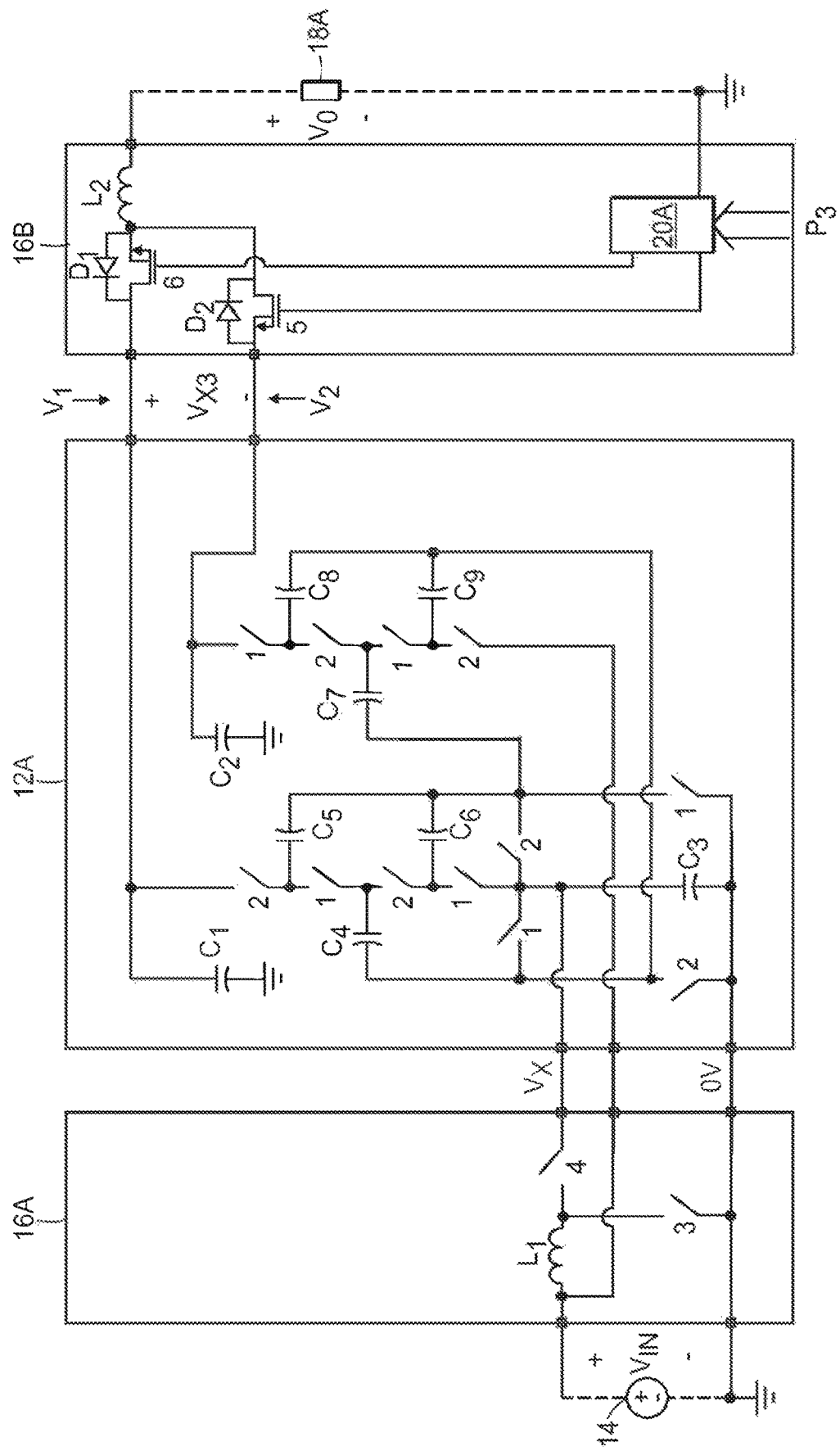
FIG. 40 shows a power converter in which two cascade multipliers with equal numbers of stages implements the switching network.

In the embodiment shown in FIG. 40, the first regulating network 16A is a boost converter and the second regulating network 16B is a buck converter. The boost converter has a boost-converter inductor L1 and first and second boost-converter switches 3, 4. The buck converter has a buck-converter inductor L2 and first and second buck-converter switches 5, 6.

The switching network 12A includes first and second switch sets 1, 2, three dc capacitors C1-C3, and six pump capacitors C4-C9 spread across two symmetric step-up cascade-multipliers. The two cascade multipliers share a common phase pump and operate 180 degrees out of phase. The operation of this switching network 12A is similar to that of a dual-phase version, or full-wave, cascade multiplier. The main distinction arises from separation of the bottom and top of the switch stacks.

Because the stack switches are separate, it is possible to create an intermediate voltage $V_{X3}$ that is a difference between the voltages present at the tops of the switch stacks. In the embodiment shown, the voltage at the top of a first switch stack is $4V_X$, whereas the voltage at the top of a second switch stack is $3V_X + V_{IN}$. Thus, the intermediate voltage $V_{X3}$ is the difference between these, which is $V_X - V_{IN}$.

Figure 41:
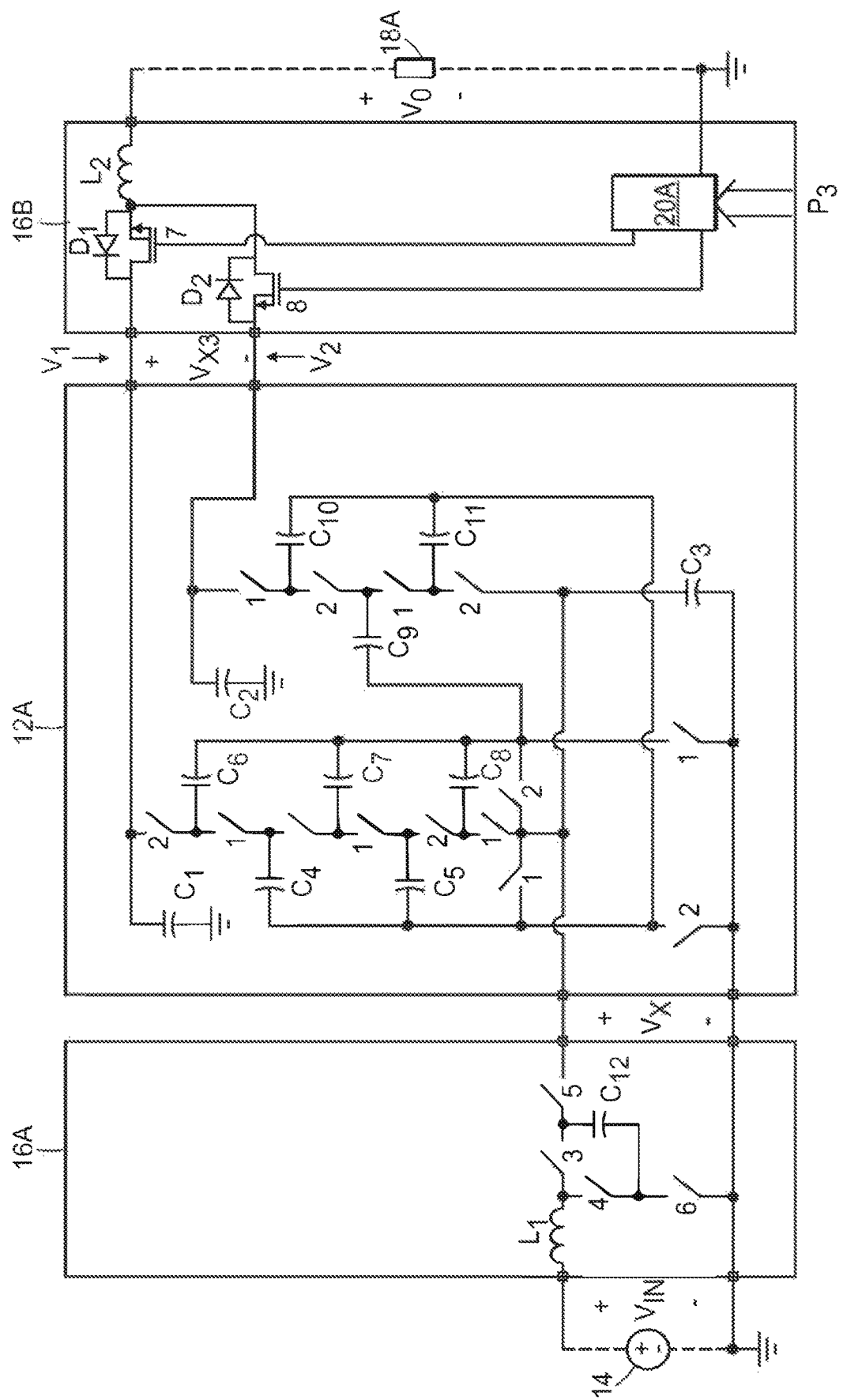
FIG. 41 shows a power converter in which two cascade multipliers with unequal numbers of stages implements the switching network.

In the embodiment shown in FIG. 41, the first regulating network 16A is a three-level boost converter and the second regulating network 16B is a buck converter. The boost converter has a boost-converter inductor L1, four switches 3, 4, 5, 6, and a capacitor C13. The buck converter has a buck-converter inductor L2 and first and second buck-converter switches 7, 8.

FIG. 41 shows a power converter similar to that shown in FIG. 40, but with the first regulating network 16A being a three-level boost converter. The three-level boost converter requires less inductance for the same amount of filtering compared to the boost converter shown in FIG. 40. In addition, it operates with a reduced voltage stress across its switches. However, it also has many more switches and an additional capacitor. The second regulating network 16B is again a buck converter like that shown in FIG. 40.

The switching network 12A includes first and second switch sets 1, 2, three dc capacitors C1-C3, and nine pump capacitors C4-C12 spread across two symmetric step-up cascade-multipliers. The two cascade multipliers share a common phase pump and operate 180 degrees out of phase. Unlike the switching network 12A shown in FIG. 40, the two cascade multipliers in FIG. 41 have different numbers of stages. Thus, asymmetry in the number of stages results in a third intermediate voltage $V_{X3}$ presented to the second regulating network 16B. In particular, the third intermediate voltage, which is $2V_X$, is a difference between a first voltage $V_1$, which is equal to $6V_X$, and a second voltage $V_2$, which is equal to $4V_X$.

In operation, the three-level boost converter operates in two modes. In each mode, the boost converter cycles through first, second, third, and fourth states at a particular frequency. Each state corresponds to a particular configuration of switches. Table 9A shows the four states in the first mode, and Table 9B shows the four states in the second mode.

TABLE 9A

| State | $V_{LX}$ | 3 | 4 | 5 | 6 |
|---|---|---|---|---|---|
| first | $V_X$ | ON | OFF | ON | OFF |
| second | $V_X/2$ | OFF | ON | ON | OFF |
| third | $V_X$ | ON | OFF | ON | OFF |
| fourth | $V_X/2$ | ON | OFF | OFF | ON |

TABLE 9B

| State | $V_{LX}$ | 3 | 4 | 5 | 6 |
|---|---|---|---|---|---|
| first | 0 V | OFF | ON | OFF | ON |
| second | $V_X/2$ | OFF | ON | ON | OFF |
| third | 0 V | OFF | ON | OFF | ON |
| fourth | $V_X/2$ | ON | OFF | OFF | ON |

Within each mode, the three-level boost converter regulates its output by controlling its generalized duty cycle. The generalized duty cycle is equal to a first time interval divided by a second time interval. The first time interval is equal to the amount of time the three-level boost converter spends in either the first state or the third state. The second time interval is the amount of time the three-level boost converter spends in either the second state or the fourth state.

When the three-level buck converter operates in the first mode, the intermediate voltage $V_X$ is greater than two times the input voltage $V_{IN}$. In contrast, when the three-level buck converter operates in the second mode, the intermediate voltage $V_X$ is less than two times the input voltage $V_{IN}$.

An advantage over the power converter shown in FIG. 41 over that shown in FIG. 40 is that it is less complex. In addition, losses resulting from charge redistribution within the switching network 12A will be reduced because the capacitors within the switching network 12A will enjoy the benefits of adiabatic charge transfer.

Figure 42:
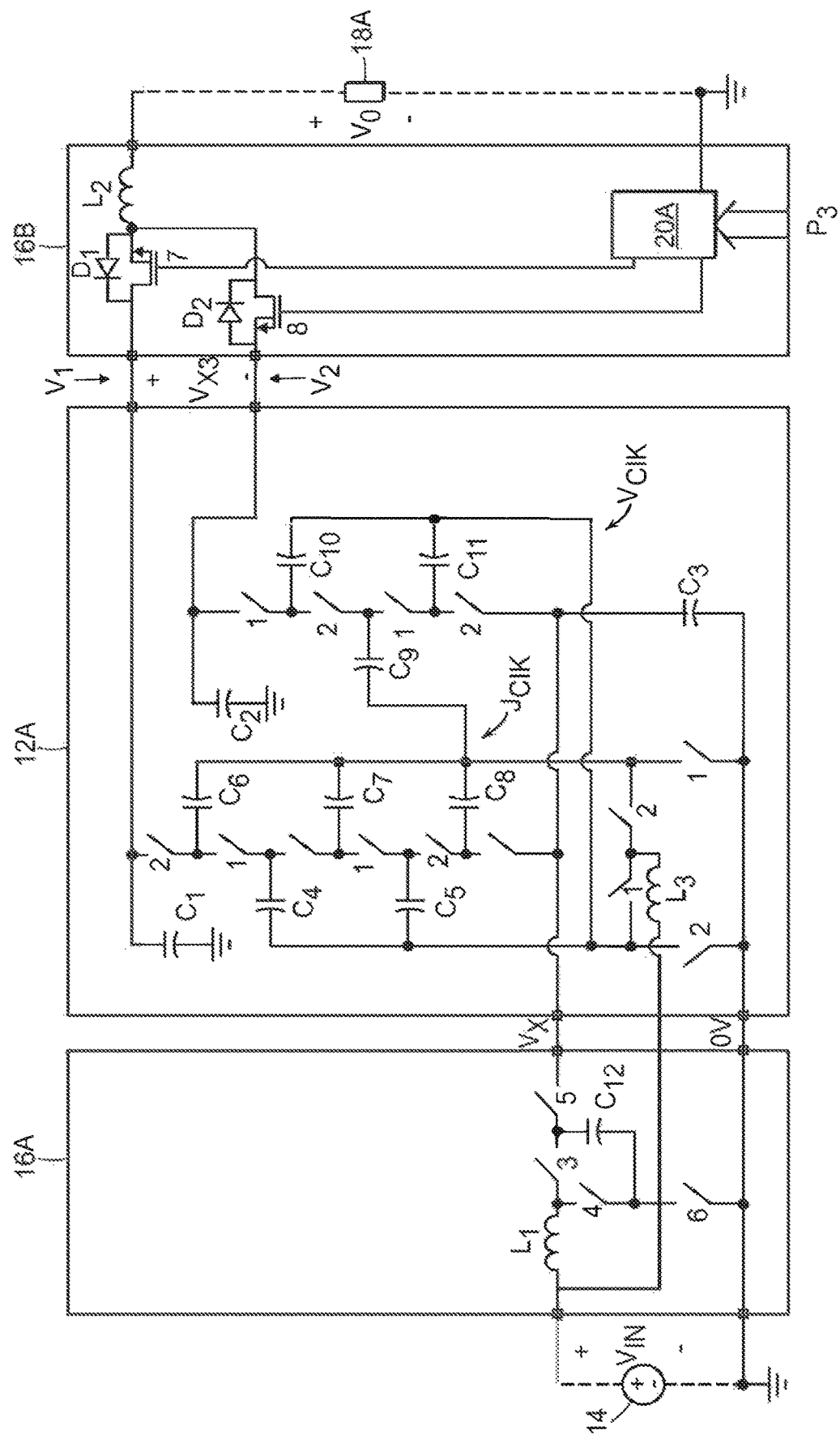
FIG. 42 shows a power converter in which the bulk of the current into the switching network bypasses the boost converter.

The power converter of FIG. 42 combines features of those shown in FIGS. 40-41. As was the case in the power converter shown in FIG. 40, the switching network 12A receives both the input voltage $V_{IN}$ and the first intermediate voltage $V_X$ to produce a third intermediate voltage $V_{X3}$. However, like FIG. 41, the number of stages is unequal, with the asymmetry producing the third intermediate voltage $V_{X3}$.

In the switching network 12A shown in FIG. 42, the first regulating network 16A no longer drives the phase pump, as was the case in FIGS. 40-41. Thus, the phase pump no longer enjoys the benefit of adiabatic charge transfer resulting from the intervention of the inductor L1 in the first regulating network 16A. To make up for this, the switching network 12A has an additional inductor L3 that promotes adiabatic charge transfer.

In operation, a first voltage $V_1$ is equal to $V_X + 5V_{IN}$, a second voltage $V_2$ is equal to $V_X + 3V_{IN}$, and a third intermediate voltage $V_{X3}$ is equal to $2V_{IN}$.

An advantage of the power converter shown in FIG. 42 over that shown in FIG. 41 is that only a fraction of the input current actually passes through the three-level boost converter. The bulk of the current instead bypasses the three-level boost converter and proceeds directly into the phase pump.

Additionally, since the additional inductor L3 only has to promote adiabatic charge transfer, it can have a smaller inductance that the inductor L1 in the boost converter. This, in turn, reduces resistive inductor losses.

However, a disadvantage of the power converter shown in FIG. 42 is that an additional inductor L3 is required. In addition, the cascade multiplier requires more stages to achieve the same voltage gain. For example, the first voltage $V_1$ is equal to $6V_X$ in FIG. 41 while it is equal to $V_X + 5V_{IN}$ in the circuit shown in FIG. 42.

Figure 43:
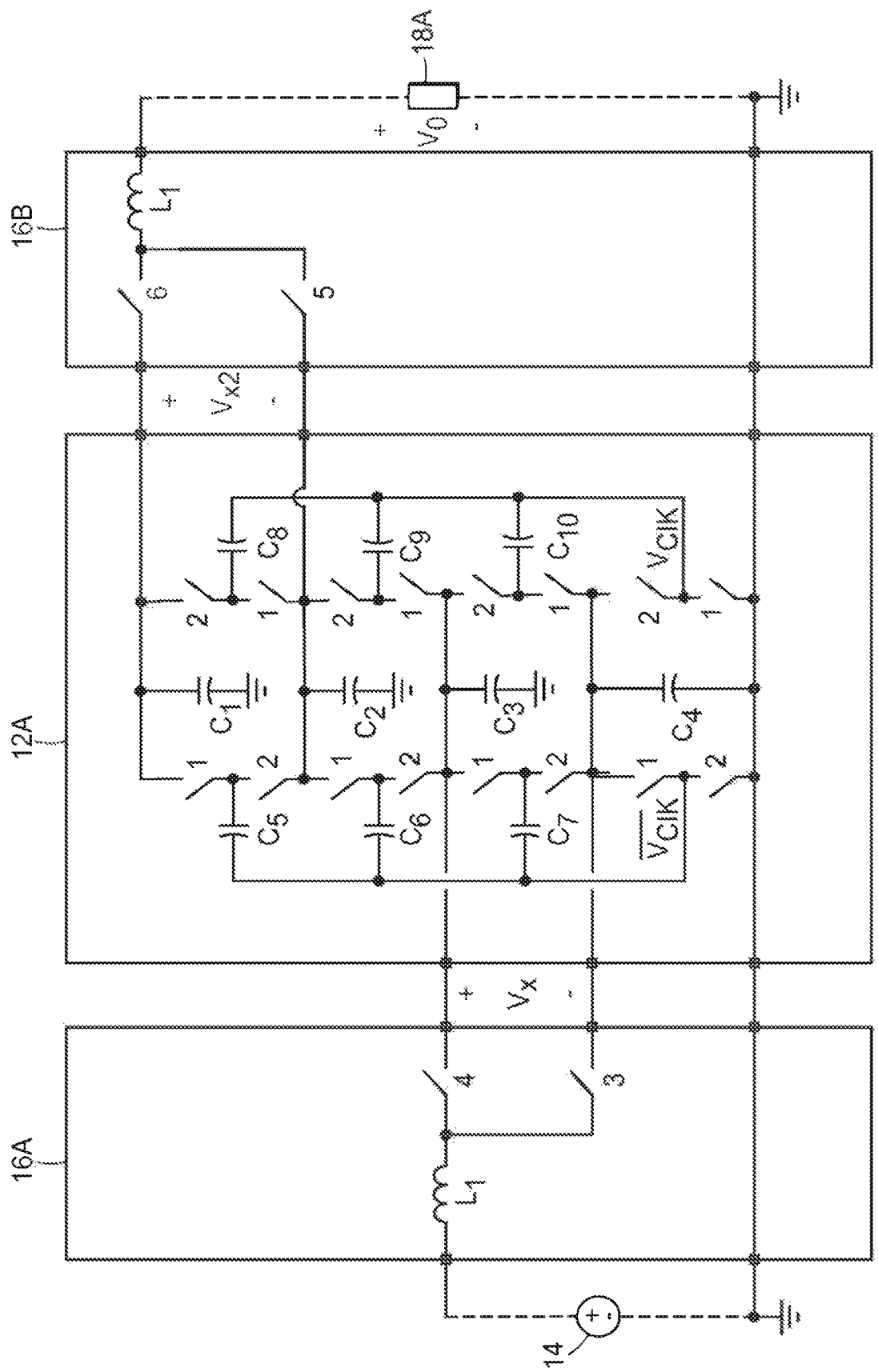
FIG. 43 shows a power converter having floating regulating networks and a grounded switching network.

FIG. 43 shows a power converter in which a boost converter implements the first regulating network 16A, a buck converter implements the second regulating network 16B, and a dual-phase asymmetric step-up cascade multiple implements the switching network 12A.

The first regulating network 16A includes a first switch 3, a second switch 4, and an inductor L1. The second regulating network 16B includes a first switch 5, a second switch 6, and an inductor L2. The switching network 12A includes a first switch set 1, a second switch set 2, four dc capacitors C1-C4, and six pump capacitors C5-C10.

In the power converter shown in FIG. 43, only the switching network 12A is connected to ground. The first and second regulating networks 16A, 16B both float. This reduces the voltage stress across the switches in the first and second regulating networks 16A, 16B. Unfortunately, this also narrows the acceptable input voltage $V_{IN}$ range and output voltage $V_O$ range. This disadvantage can be overcome by using a reconfigurable switching network 12A, but at the added cost of more switches.

Figure 44:
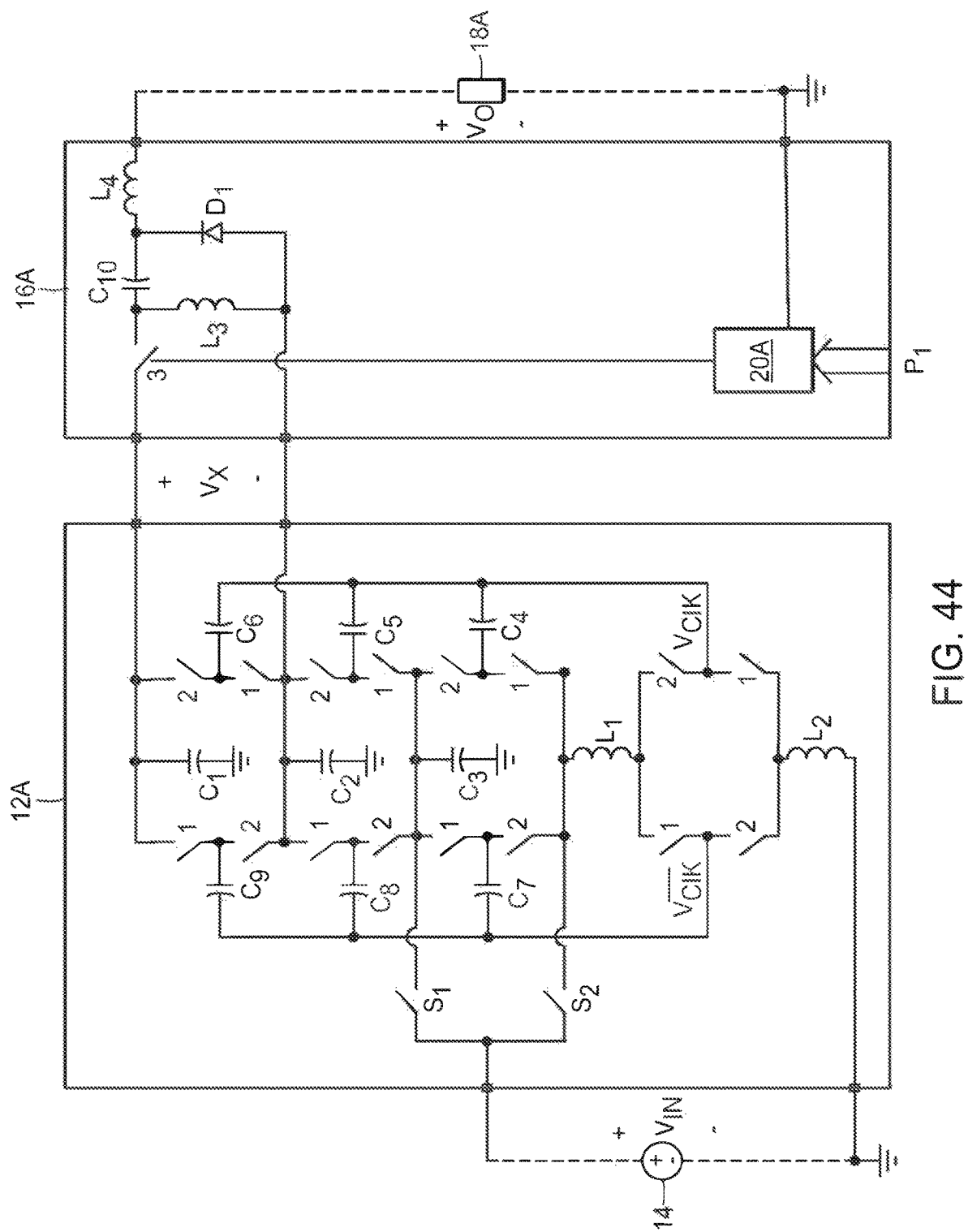
FIG. 44 shows an implementation of FIG. 2 in which inductors embedded in the switching network promote adiabatic charge transfer within the switching network.

FIG. 44 shows a particular implementation of the power converter in FIG. 2 in which a reconfigurable dual-phase symmetric step-up cascade multiplier implements the switching network 12A and a Zeta converter implements the regulating network 16A.

The regulating network 16A includes a first inductor L3, a second inductor L4, a capacitor C10, a first switch 3, and a second switch 4. Depending upon the duty cycle, a Zeta converter can step-up or step-down the voltage. However, a disadvantage of the Zeta converter is the requirement for more passive components. In addition, a Zeta converter is more difficult to stabilize because of the additional poles and zero introduced.

The switching network 12A includes first and second switch sets 1, 2; two selection switches S1-S2, three dc capacitors C1-C3, six pump capacitors C4-C9, a first inductor L1, and a second inductor L2.

In operation, the switching network 12A transitions between a first mode and a second mode. During the first mode, the first selections switch S1 is closed and the second selection switch S2 is open. The intermediate voltage $V_X$ is then $V_{IN}/2$. During the second mode, the first selection switch S1 is open and the second selection switch S2 is closed. In the second mode, the intermediate voltage $V_X$ becomes the input voltage $V_{1h}$.

One way to achieve adiabatic inter-capacitor charge transfer within the switching network 12A is to place a small inductor in series with the second switch S2. However, although this would promote adiabatic charge transfer during the first mode, it would not do so during the second mode.

Another way to achieve adiabatic inter-capacitor charge transfer within the switching network 12A is to embed the first inductor L1 within the charge pump and the second inductor L2 in series with the ground terminal of the charge pump.

Preferably the first inductor L1 is embedded at a location that carries a constant current and that connects to charging and discharging paths of as many pump capacitors C4-C9 as possible. A suitable location is therefore at the phase pump.

A charge pump typically has two nodes that carry constant current. As shown in FIG. 44, the first inductor L1 is at one of these nodes and the second inductor L2 is at the other. However, only one of these inductors is actually required to promote adiabatic charge transfer.

Having described the invention, and a preferred embodiment thereof, what is claimed as new, and secured by Letters Patent is:

1. An apparatus having an input port and an output port, the apparatus comprising:
   a controller to generate one or more control signals; and
   a switching network to include at least a first group of switches and a second group of switches interconnected with a plurality of capacitors to implement one or more switching patterns via one or more switch configurations based, at least in part, on the one or more control signals, the one or more switching patterns to be implemented to transition the switching network between at least two states to facilitate an adiabatic charge transfer within the switching network,
   wherein the apparatus to include a power path to couple the input port and the output port,
   wherein the switching network to be arranged in an electrical configuration with a regulator network to provide power to series-connected LEDs, the electrical configuration to include a first inductor to be disposed on the power path to cooperate with the switching network so as to draw a relatively constant current from the switching network, and
   wherein the adiabatic charge transfer within the switching network to be facilitated via a second inductor coupled to the input port.

2. The apparatus of claim 1, wherein the regulating network comprises at least one of the following: a buck converter; a boost converter; a buck-boost converter; a four-terminal non-inverting buck-boost converter; a multi-tap boost converter; a dual-inductor buck converter; or any combination thereof.

3. The apparatus of claim 1, wherein the switching network comprises a cascade multiplier.

4. The apparatus of claim 3, wherein the cascade multiplier comprises an asymmetric step-up full-wave cascade multiplier.

5. The apparatus of claim 3, wherein the cascade multiplier comprises a reconfigurable dual-phase asymmetric step-up cascade multiplier.

6. The apparatus of claim 1, wherein the particular state of the at least two states to correspond to a particular switch configuration of the one or more switch configurations.

7. The apparatus of claim 1, wherein the power to the series-connected LEDs to be provided via the output port.

8. The apparatus of claim 1, the electrical configuration to further include a third inductor to be disposed on the power path to cooperate with the switching network so as to draw a relatively constant current from the switching network, wherein the first and the third inductors are to be positively coupled to each other or to be negatively coupled to each other.

9. The apparatus of claim 1, wherein the switching network to include one or more selection switches controllable via the one or more control signals to facilitate outputting a voltage to be a fraction of an output voltage.

10. The apparatus of claim 1, wherein the switching network to include one or more DC capacitors to store charge from the regulating network during a dead time interval to be implemented via the controller.

11. The apparatus of claim 1, wherein the plurality of capacitors to include two or more pump capacitors to be arranged in series.

12. The apparatus of claim 1, wherein the one or more control signals to be generated based, at least in part, on a voltage to be provided by the switching network.

13. A power converter comprising:
   a set of capacitors to be interconnected via a plurality of switches to form a switched capacitor arrangement coupled to a voltage source, the plurality of switches to transition between a first and a second switch configurations, the first and the second switch configurations to comprise a full operating cycle of the switched capacitor arrangement and to facilitate an adiabatic charge transfer within the switched capacitor arrangement;
   a regulating network to receive a first voltage from the switched capacitor arrangement and to generate a regulated voltage to power a plurality of series-connected LEDs; and
   a current sink electrically coupled in series with the plurality of series-connected LEDs, the current sink to control a current flowing through the plurality of series-connected LEDs;

wherein the regulating network comprises coupled inductors that share a magnetic core,
wherein the adiabatic charge transfer within the switched capacitor arrangement to be facilitated via one or more of the coupled inductors,
wherein, during operation of the power converter, the first switch configuration to form a first switched capacitor network and the second switch configuration to form a second switch capacitor network, and
wherein the switched capacitor arrangement to facilitate a voltage transformation between a first node and a second node of the switched capacitor arrangement.

14. The power converter of claim 13, wherein the switched capacitor arrangement comprises one or more selection switches to be controllable to switch between a first and a second configuration so as to generate corresponding first and second offset voltages based, at least in part, on an input voltage from the voltage source.

15. The power converter of claim 13, wherein the regulating network comprises a first and a second inductors to provide current to the plurality of series-connected LEDs.

16. The power converter of claim 13, wherein the regulating network is to be implemented via a dual-inductor buck converter.

17. The power converter of claim 13, wherein the switched capacitor arrangement comprises a two-phase step-down switched capacitor arrangement and the regulating network comprises a step-down network.

18. The power converter of claim 13, wherein the switched capacitor arrangement comprises a full wave cascade multiplier.

19. The power converter of claim 13, wherein the regulating network is configured to facilitate the adiabatic charge transfer between two or more capacitors of the set of capacitors.

* * * * *